(12) United States Patent
Kim et al.

(10) Patent No.: US 11,967,753 B2
(45) Date of Patent: Apr. 23, 2024

(54) ELECTRONIC DEVICE INCLUDING ANTENNA

(71) Applicant: LG ELECTRONICS INC., Seoul (KR)

(72) Inventors: Dongjin Kim, Seoul (KR); Sungwon Kim, Seoul (KR); Jihun Ha, Seoul (KR); Youngbae Kwon, Seoul (KR); Byungwoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/555,964

(22) PCT Filed: Apr. 22, 2021

(86) PCT No.: PCT/KR2021/005092
§ 371 (c)(1),
(2) Date: Oct. 18, 2023

(87) PCT Pub. No.: WO2022/225083
PCT Pub. Date: Oct. 27, 2022

(65) Prior Publication Data
US 2024/0097315 A1   Mar. 21, 2024

(51) Int. Cl.
*H01Q 1/24* (2006.01)
*H01Q 1/52* (2006.01)
*H04M 1/02* (2006.01)

(52) U.S. Cl.
CPC .............. *H01Q 1/243* (2013.01); *H01Q 1/24* (2013.01); *H01Q 1/52* (2013.01); *H04M 1/0268* (2013.01); *H04M 1/0277* (2013.01)

(58) Field of Classification Search
CPC ............ H01Q 1/243; H01Q 1/52; H01Q 1/24; H04M 1/0277; H04M 1/0268
(Continued)

(56) References Cited

U.S. PATENT DOCUMENTS 9,608,314 B1 * 3/2017 Kwon ................... H01Q 1/521
11,561,576 B2 * 1/2023 Kang ................... G06F 1/1686
(Continued)

FOREIGN PATENT DOCUMENTS

JP   2011-135175   7/2011
KR   10-2006-0053064   5/2006
(Continued)

OTHER PUBLICATIONS

PCT International Application No. PCT/KR2021/005092, International Search Report dated Jan. 19, 2022, 4 pages.

*Primary Examiner* — Hai V Tran
(74) *Attorney, Agent, or Firm* — LEE, HONG, DEGERMAN, KANG & WAIMEY

(57) ABSTRACT

A mobile terminal including an antenna according to an embodiment is provided. The mobile terminal includes a slide metal part and a front metal part, and a contact member configured to contact the slide metal part and the front metal part is provided on a side of the front metal part. In a first state in which a display area of the mobile terminal is contracted, the contact member may remove parasitic resonance caused by a slot area, as the slide metal part and the front metal part contact are contacted by the contact member at a first position which is a lower end of the slot area, and in a second state in which the display area is expanded, the contact member may remove parasitic resonance caused by the slot area, as the slide metal part and the front metal part are contacted by the contact member at a second position which is an upper end of the slot area.

20 Claims, 36 Drawing Sheets

(58) Field of Classification Search
USPC ......................................................... 343/702
See application file for complete search history.

(56) References Cited

U.S. PATENT DOCUMENTS

| | | | | |
|---|---|---|---|---|
| 11,693,452 B2* | 7/2023 | Kwak | ................... | G06F 1/1652 |
| | | | | 361/679.01 |
| 2019/0214706 A1* | 7/2019 | Kim | ...................... | G06F 1/1698 |
| 2021/0359392 A1* | 11/2021 | Won | ...................... | H01Q 5/307 |

FOREIGN PATENT DOCUMENTS

| KR | 10-2014-0105886 | 9/2014 |
|---|---|---|
| KR | 10-2017-0037464 | 4/2017 |
| KR | 10-2019-0143029 | 12/2019 |

* cited by examiner

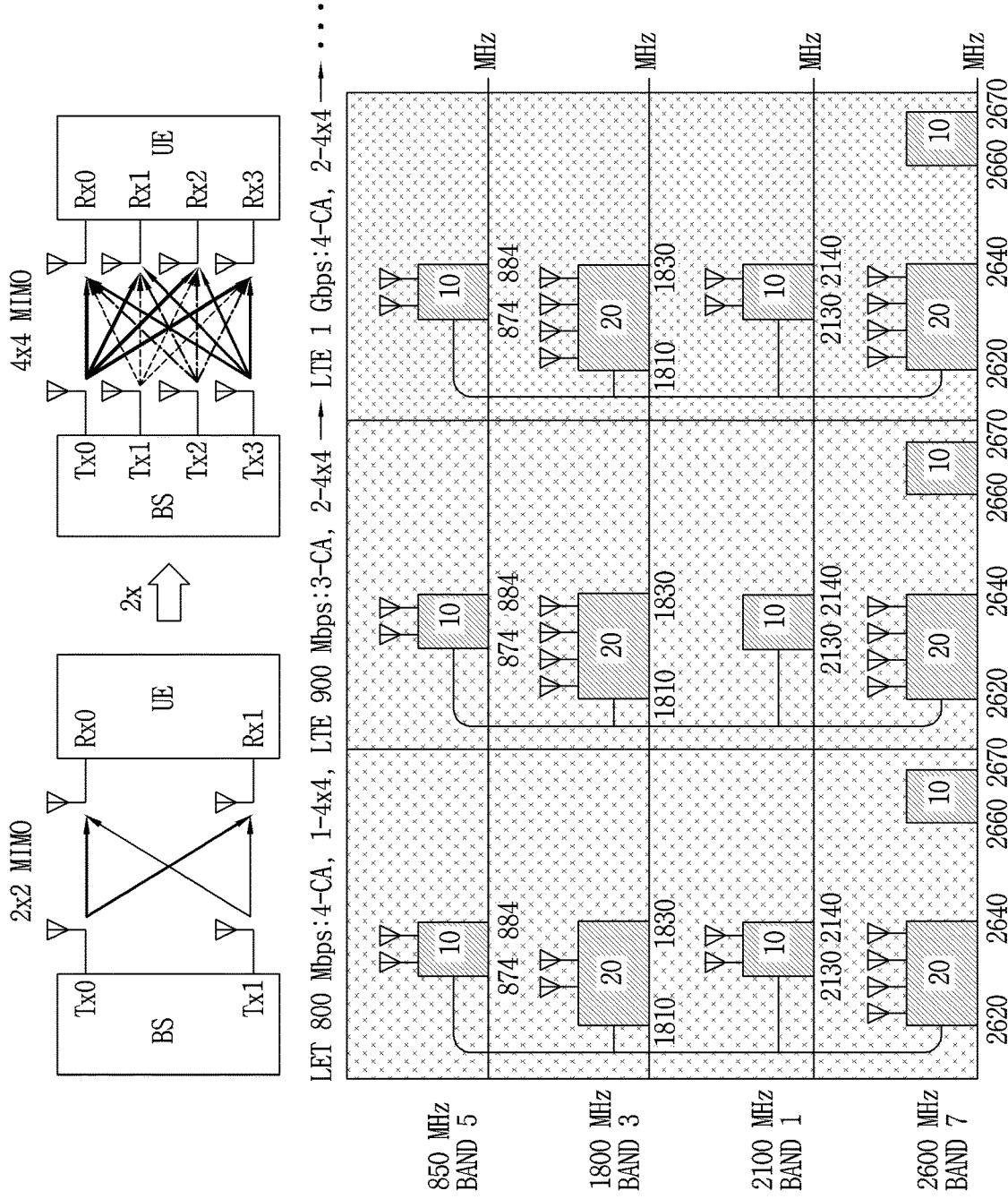

| SUBCARRIER SPACING: $f_o \times 2^\mu$, $f_o$ = 15kMz AND SCALING VALUE $2^\mu, \in \{-2, 0, 1, 2,..., 5\}$ | | | | | | | |
|---|---|---|---|---|---|---|---|
| $\mu$ | -2 | 0 | 1 | 2 | 3 | 4 | 5 |
| SUBCARRIER SPACING [kHz] | 3.75 | 15 | 30 | 60 | 120 | 240 | 480 |
| LENGTH OF OFDM SYMBOL [$\mu$s] | 266.67 | 66.67 | 33.33 | 16.67 | 8.333 | 4.17 | 2.08 |

15kHz 1 SLOT(14 SYMBOLS) : 1ms SUBFRAME

| 0 | 1 | 2 | 3 | 4 | 5 | 6 | 7 | 8 | 9 | 10 | 11 | 12 | 13 |

| 0 | 1 | 2 | 3 | 4 | 5 | 6 | 7 | 8 | 9 | 10 | 11 | 12 | 13 |  30kHz 1 SLOT(14 SYMBOLS) : 0.5ms

| 0 | 1 |  15kHz 1 SLOT(2 SYMBOLS) : 0.2ms

| 0 | 1 | 2 | 3 |  30kHz MINI SLOT(4 SYMBOLS) : 0.2ms

| 0 | 1 | 2 | 3 | 4 | 5 | 6 |  60kHz MINI SLOT(7 SYMBOLS) : 0.125ms (a)

(b)

(a)

(b)

(a)

(b)

(a)

(b)

(a)

(b)

(a)

(b)

ELECTRONIC DEVICE INCLUDING ANTENNA

CROSS-REFERENCE TO RELATED APPLICATION(S)

This application is the National Stage filing under 35 U.S.C. 371 of International Application No. PCT/KR2021/005092, filed on Apr. 22, 2021, the contents of which are all hereby incorporated by reference herein in its entirety.

TECHNICAL FIELD

The present disclosure relates to an electronic device having antennas. One particular implementation relates to an electronic device having antennas in an electronic device that changes in size.

BACKGROUND ART

Electronic devices may be divided into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive multicast signals to allow viewing of video or television programs.

As it becomes multifunctional, an electronic device can be allowed to capture still images or moving images, play music or video files, play games, and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated for 5G communication services.

In this regard, electronic devices may be configured to provide 5G communication services in various frequency bands. Recently, attempts have been made to provide 5G communication services using a Sub6 band that is a band of 6 GHz or less. In the future, however, it is also expected to provide 5G communication services by using a millimeter-wave (mmWave) band in addition to the Sub6 band for a faster data rate.

Meanwhile, electronic devices supporting 4G and 5G communication services may be provided in various form factors. As an example of the form factor for the electronic device, a rollable device may be considered. Metal rim frames of electronic devices having various form factors may have an integral structure or a variable structure. In this regard, a rollable device having an integral frame structure has a difficulty in implementing a rollable display.

The rollable display may be configured to have a display region which is decreased or increased by a variable mechanism structure. When metal frames of a rollable device having a variable mechanism structure is used as antennas, it is difficult to secure antenna performance owing to the metal frames separately provided from each other.

Especially, antennas disposed on a variable part of a rollable device exhibit different antenna performances as the device changes in size.

DISCLOSURE OF INVENTION

Technical Problem

The present disclosure is directed to solving the aforementioned problems and other drawbacks. One aspect of the present disclosure is to provide a disposition of antennas in rim regions of an electronic device even when a form factor changes.

Another aspect of the present disclosure is to provide a disposition of antennas in rim regions in a rollable device which has a display rollable to one side.

Still another aspect of the present disclosure is to provide a disposition of antennas in rim regions in a vertical rollable device.

Still another aspect of the present disclosure is to secure antenna performance of a predetermined level or higher while overcoming an antenna design space limitation.

Still another aspect of the present disclosure is to provide an antenna structure in which a change in antenna characteristics is insensitive to a change in size of a mobile terminal.

Still another aspect of the present disclosure is to provide a ground connection structure in which an antenna characteristic variation is insensitive to a change in size of a mobile terminal.

Solution to Problem

To achieve the above or other aspects, a mobile terminal a mobile terminal having antennas according to one embodiment is provided. The mobile terminal includes a slide metal part and a front metal part, and a contact member through which the slide metal part and the front metal part are in contact with each other is provided on a side surface of the front metal part. In a first state in which a display region of the mobile terminal is retracted, the slide metal part and the front metal part are in contact with each other by the contact member at a first position, which is a lower end of a slot region, so as to remove parasitic resonance due to the slot region. In a second state in which the display region is expanded, the slide metal part and the front metal part are in contact with each other by the contact member at a second position, which is an upper end of the slot region, so as to remove the parasitic resonance due to the slot region.

According to an embodiment, the slide metal part may include a left side surface, a right side surface, and a bottom side surface defining appearance of the mobile terminal, and the front metal part may include an upper side surface and a front portion defining the appearance of the mobile terminal and coupled to the slide metal part.

According to an embodiment, antennas may be disposed on the left side surface and the right side surface of the slide metal part, and the slot region may be defined in a portion of a side surface the front metal part, which overlaps the front metal part.

According to an embodiment, parasitic resonance between the antenna and the slot region, which occurs due to a current generated along both sides of the slot region, may be removed as a path of the current is generated along one side by the contact member of the first position, and the contact member may be in ground-contact with a side portion of the slide metal part at the first position as the lower end of the slot region.

According to an embodiment, a path of the current generated along the both sides may have a length corresponding to a half wavelength of a specific operating band of the antenna, such that the parasitic resonance is generated at the specific operating band of the antenna by the current generated along the both sides. The path of the current generated along the one side by the contact member of the first position as the lower end of the slot region may have a length corresponding to a quarter ($\frac{1}{4}$) wavelength of the specific operating band, such that parasitic resonance is removed at the specific operating band of the antenna by the current generated long the one side.

According to an embodiment, parasitic resonance between the antenna and the slot region, which occurs due to a current generated along both sides of the slot region, may be removed as a path of the current is generated along one side by the contact member of the second position, and the contact member may be in ground-contact with a side portion of the slide metal part at the second position as the upper end of the slot region.

According to an embodiment, a path of the current generated along the both sides may have a length corresponding to a half wavelength of a specific operating band of the antenna, such that the parasitic resonance is generated at the specific operating band of the antenna by the current generated along the both sides. The path of the current generated along the one side by the contact member of the second position as the upper end of the slot region may have a length corresponding to a quarter ($\frac{1}{4}$) wavelength of the specific operating band, such that the parasitic resonance is removed at the specific operating band of the antenna by the current generated long the one side.

According to an embodiment, a second slot region defined on a front portion of the slide metal part in the antennas of the left side surface and the right side surface of the slide metal part may have a length corresponding to a quarter wavelength of a specific operating band of the antennas. Lengths of the antennas may be longer than the length of the second slot region, and the length of the second slot region may be determined as a length from one end portion of the second slot region to one end portion of a slit formed in the slide metal part.

According to an embodiment, the slide metal part and the front metal part may be in contact with each other through the contact member at the first position as the lower end of the slot region, in a first state in which the slide metal part moves in a first direction as an upward direction, so as to remove parasitic resonance due to the slot region. The slide metal part and the front metal part may be in contact with each other through the contact member at the second position as the upper end of the slot region, in a second state in which the slide metal part moves in a second direction as a downward direction, so as to remove parasitic resonance due to the slot region.

According to an embodiment, the mobile terminal may further include a display including a first region that is exposed to a front surface in a retracted state of the mobile terminal, and a second region that is an expanded region exposed to the front surface in an expanded state of the mobile terminal. The slide metal part and the front metal part may be in contact with each other through the contact member at the first position as the lower end of the slot region, in a first state in which the first region of the display is exposed, so as to remove parasitic resonance due to the slot region. The slide metal part and the front metal part may be in contact with each other through the contact member at the second position as the upper end of the slot region, in a second state in which the first region and the second region of the display are exposed, so as to remove parasitic resonance due to the slot region.

According to an embodiment, the slide metal part may include a first metal housing including a left side surface and a right side surface defining the appearance of the mobile terminal, and a second metal housing including a left side surface, a right side surface, and a bottom side surface defining the appearance, and the antennas may be disposed on the left side surface and the right side surface of the first metal housing.

According to an embodiment, each of a first conductive member and a second conductive member of the second metal housing may include a first sub member disposed on the bottom side surface, a second sub member disposed on the left side surface or the right side surface, and a corner region defined between the first sub member and the second sub member. The left side surface and the right side surface of the first metal housing and the second sub member of the second metal housing may overlap each other, and the overlapped first metal housing may not be exposed to the appearance while the second sub member is exposed to the appearance.

According to an embodiment, the first conductive member and the overlapped first metal housing may operate as a first antenna, the second conductive member and the overlapped second metal housing may operate as a second antenna, and a third conductive member may be disposed between the first conductive member and the second conductive member. The antennas corresponding to a fourth conductive member and a fifth conductive member disposed on the left side surface and the right side surface of the first metal housing may operate as a third antenna and a fourth antenna, respectively. Lower end antennas including the first antenna to the fourth antenna may be disposed on the side surfaces of the slide metal part.

According to an embodiment, a fifth conductive member to a seventh conductive member disposed on the upper side surface of the front metal part and separated by slits may operate as a fifth antenna to a seventh antenna. Each of the fifth antenna and the seventh antenna may include a first sub member disposed on the upper side surface, a second sub member disposed on the left side surface or the right side surface, and a corner region defined between the first sub member and the second sub member. Upper end antennas including the fifth antenna to the seventh antenna may be disposed on the upper side surface of the front metal part.

According to an embodiment, the fifth antenna may be electrically connected to an upper printed circuit board (PCB) received in the front metal part through a feed part at a first point of the first sub member, and electrically connected to the upper PCB through an inductor at a second point. An operating band of the fifth antenna is adjusted as the fifth antenna is electrically connected to the upper PCB through a switch at one point of a right side surface thereof.

According to an embodiment, the sixth antenna may be electrically connected to the upper PCB received in the front metal part through a feed part and a ground part at both end portions of the sixth conductive member.

According to an embodiment, the seventh antenna may be electrically connected to the upper PCB received in the front metal part through a feed part at one point of the first sub member and electrically connected to a ground part at a second point of the corner region.

According to an embodiment, the upper end antenna may further include an eighth antenna disposed on the left side surface of the front metal part to be adjacent to the seventh antenna. The eighth antenna may be electrically connected to the upper PCB through a feed part at one point of the second sub member. and electrically connected to the ground part at the second point of the corner region. The seventh antenna and the eighth antenna may have a common ground structure of being electrically connected to a ground at the same second point of the corner region.

According to an embodiment, the mobile terminal may further include a first printed circuit board (PCB) having a wireless communication unit, a second PCB electrically connected to the first PCB and received in one side of the slide metal part, a third PCB electrically connected to the second PCB and received in another side of the slide metal part, and a processor operably coupled to the wireless communication unit. The processor may determine whether the slide metal part is electrically connected to the front metal part through the contact member, in a third state other than the first state or the second state, and control the wireless communication unit to measure quality of a signal received through the antenna when it is determined that the slide metal part is coupled in the third state. The third state may be a state in which the slide metal part is coupled to the front metal part at an arbitrary point between an upper end portion and a lower end portion of the slot region.

According to an embodiment, the processor may control the wireless communication unit to receive a signal not by using the antenna but by using an upper end antenna disposed on the upper side surface of the front metal part when the quality of the signal received through the antenna is less than a threshold value.

According to an embodiment, the processor may control the wireless communication unit to operate one of the fifth antenna and the sixth antenna disposed on an upper portion of the front metal part in the third state, and control the wireless communication unit to operate one of the third antenna and the fourth antenna disposed on the left side surface and the right side surface of the slide metal part after switching to the second state when it is determined that the qualities of signals received by the fifth antenna and the sixth antenna are less than the threshold value.

According to an embodiment, the processor may control the wireless communication unit to operate one of the first antenna and the second antenna disposed on a lower portion of the slide metal part in the first third state.

Advantageous Effects of Invention

According to the present disclosure, in an electronic device whose form factor varies, an antenna design space limitation can be overcome.

According to the present disclosure, in a rollable device in which a display rolls to one side, an antenna design space limitation can be overcome.

According to the present disclosure, in a vertical rollable device, a wireless platform design structure including an antenna disposition can be provided.

According to the present disclosure, separated metal rims can be used for implementing a display sliding part, thereby overcoming an antenna design space limitation and securing antenna performance of a predetermined level or higher.

According to the present disclosure, an antenna structure in which an antenna characteristic variation is insensitive to a change in size of a mobile terminal can be provided.

According to the present disclosure, a ground connection structure between different metal frames can be provided, such that the antenna characteristic variation is insensitive to the change of the size of the mobile terminal.

According to the present disclosure, the ground connection structure between different frames can be provided, to suppress deterioration of antenna performance due to parasitic resonance.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

BRIEF DESCRIPTION OF DRAWINGS

FIG. 2C is a view illustrating a MIMO configuration and a MIMO+carrier aggregation (CA) configuration between a UE and a base station (BS) in accordance with one embodiment.

FIG. 5B shows a change in a slot length according to a change in a subcarrier spacing in the NR.

MODE FOR THE INVENTION

Figure 1A:
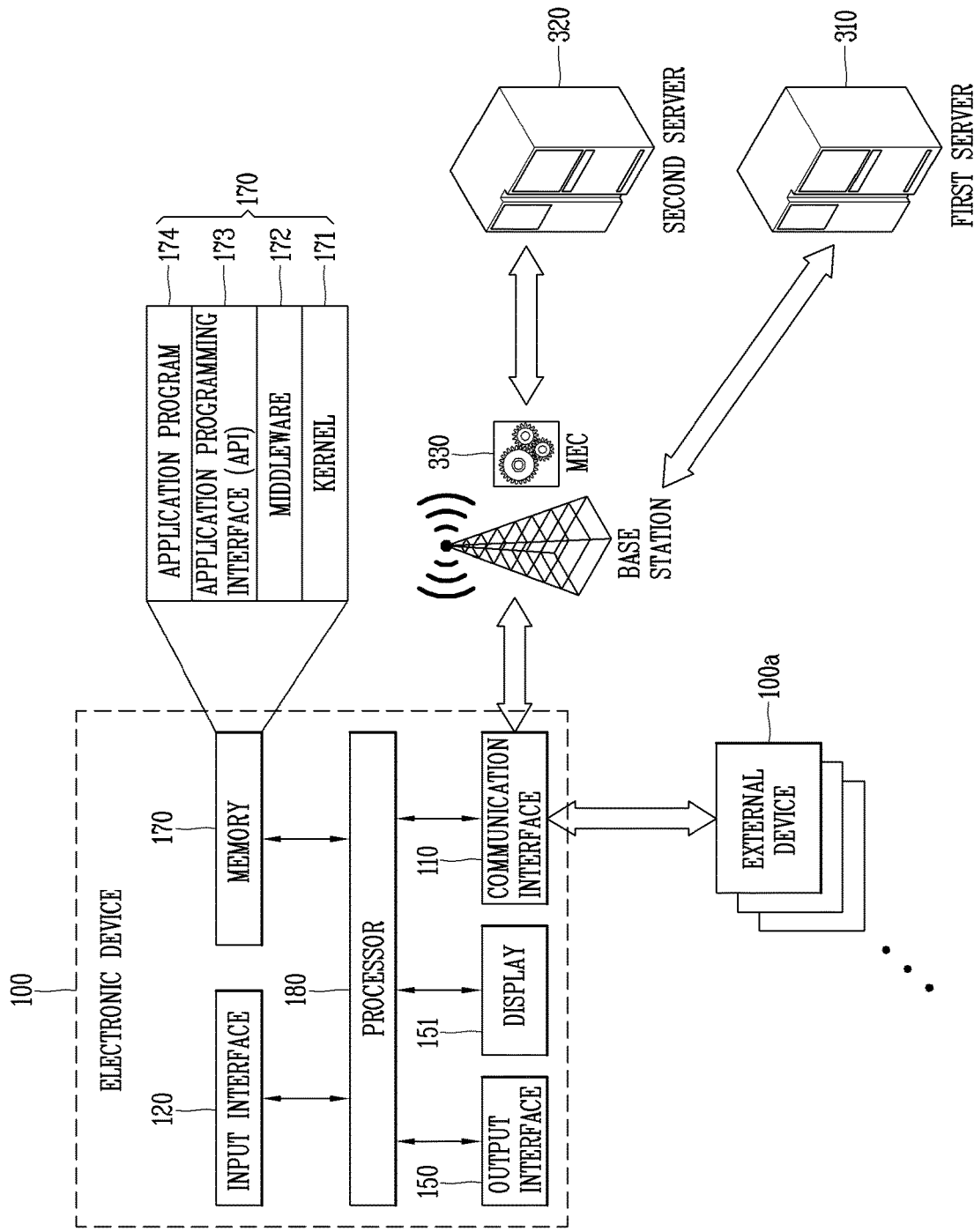
FIG. 1A is a view illustrating a configuration for describing an electronic device in accordance with one embodiment, and an interface between the electronic device and an external device or server.

Description will now be given in detail according to one or more embodiments disclosed herein, with reference to the accompanying drawings. For the sake of brief description with reference to the drawings, the same or equivalent components may be provided with the same or similar reference numbers, and description thereof will not be repeated. A suffix "module" or "unit" used for elements disclosed in the following description is merely intended for easy description of the specification, and the suffix itself is not intended to give any special meaning or function. In describing the embodiments disclosed herein, moreover, the detailed description will be omitted when specific description for publicly known technologies to which the invention pertains is judged to obscure the gist of the present disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

Figure 1B:
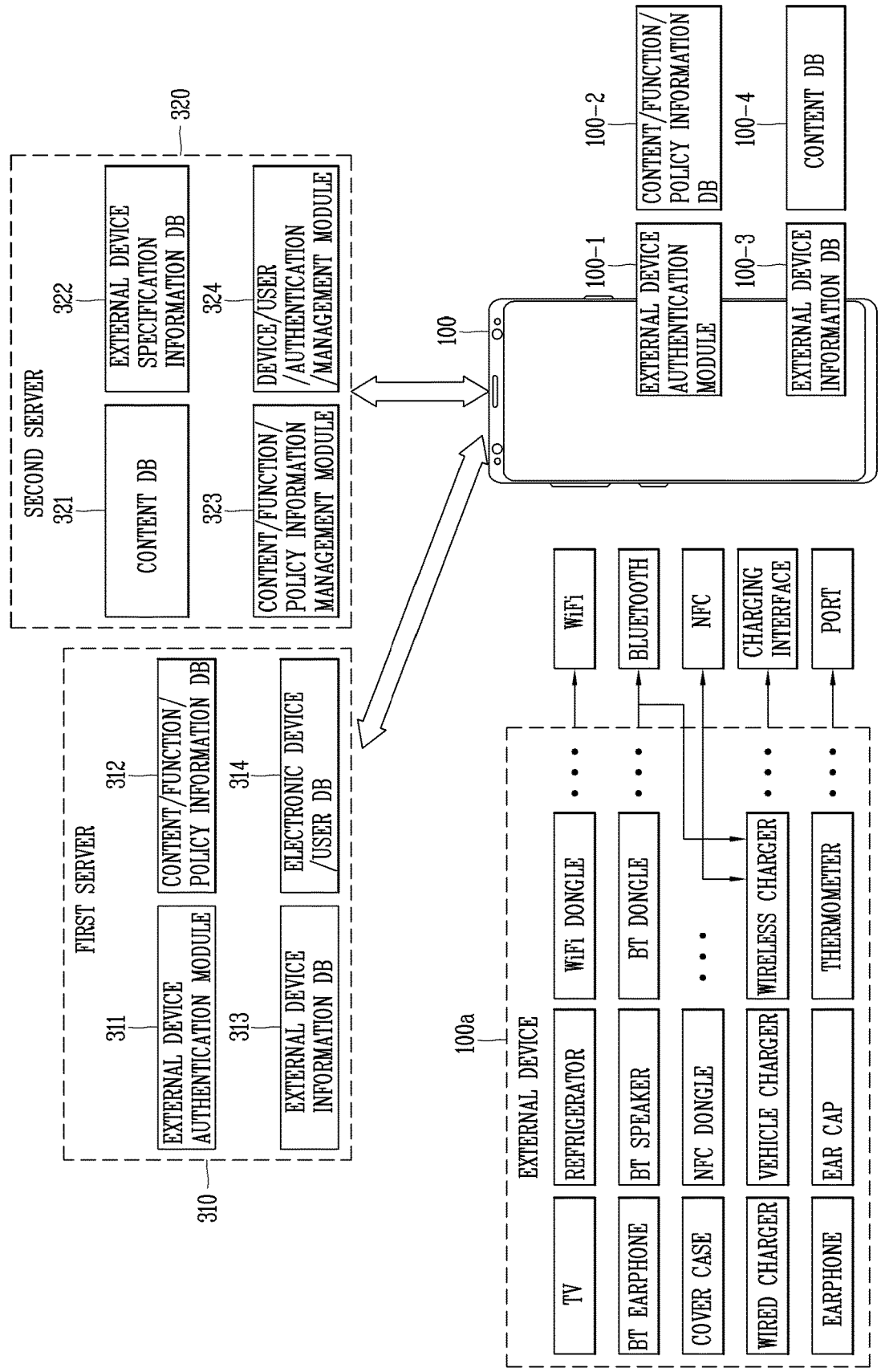
FIG. 1B is a view illustrating a detailed configuration in which the electronic device according to the one embodiment is interfaced with an external device or a server.
Figure 1C:
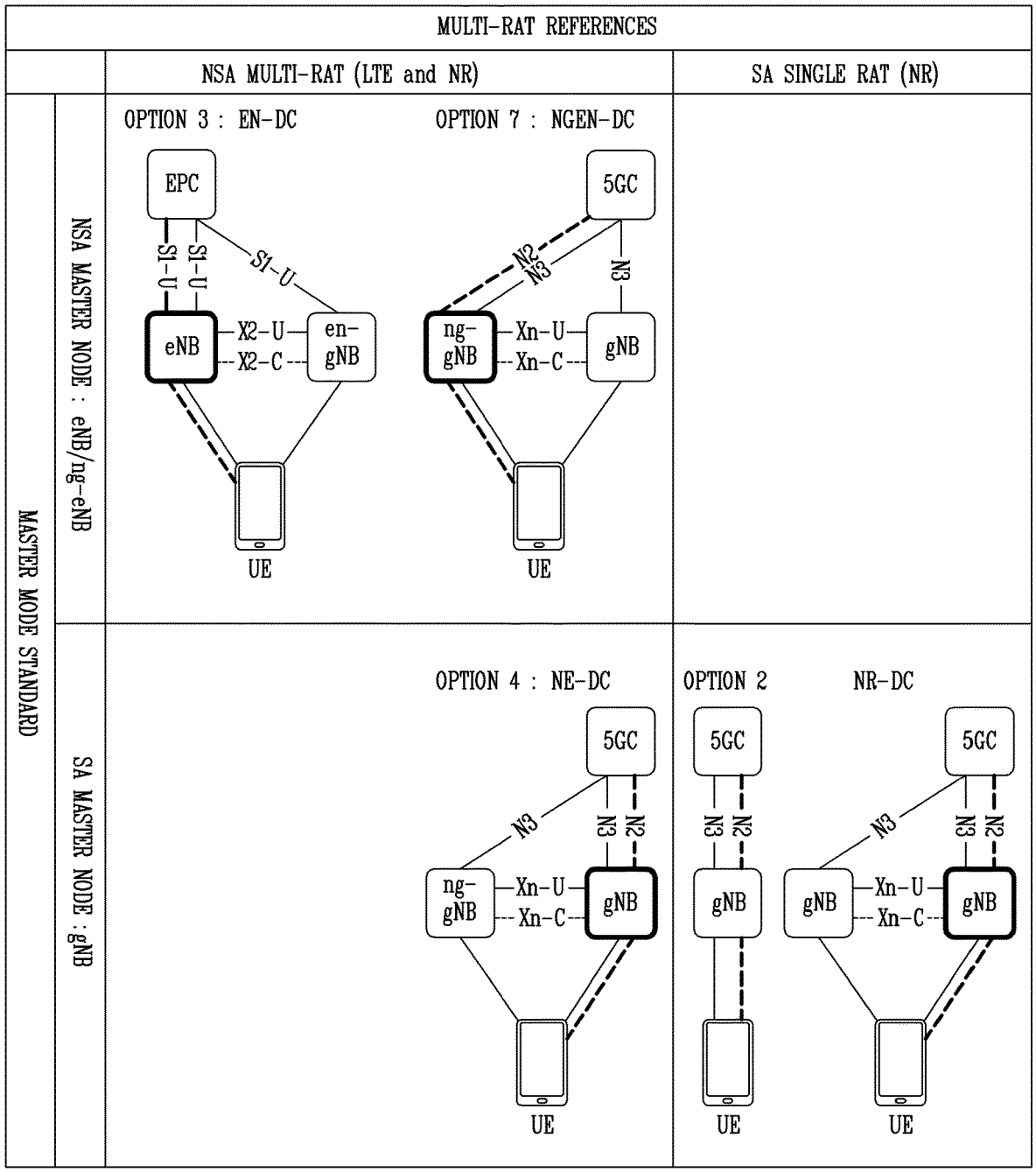
FIG. 1C is a view illustrating a configuration in which the electronic device according to the one embodiment is interfaced with a plurality of base stations or network entities.

Referring to FIGS. 1A to 1C, FIG. 1A is a view illustrating a configuration for describing an electronic device in accordance with one embodiment, and an interface between the electronic device and an external device or server. FIG. 1B is a view illustrating a detailed configuration in which the electronic device according to the one embodiment is interfaced with an external device or a server. FIG. 1C is a view illustrating a configuration in which the electronic device according to the one embodiment is interfaced with a plurality of base stations or network entities.

Figure 2A:
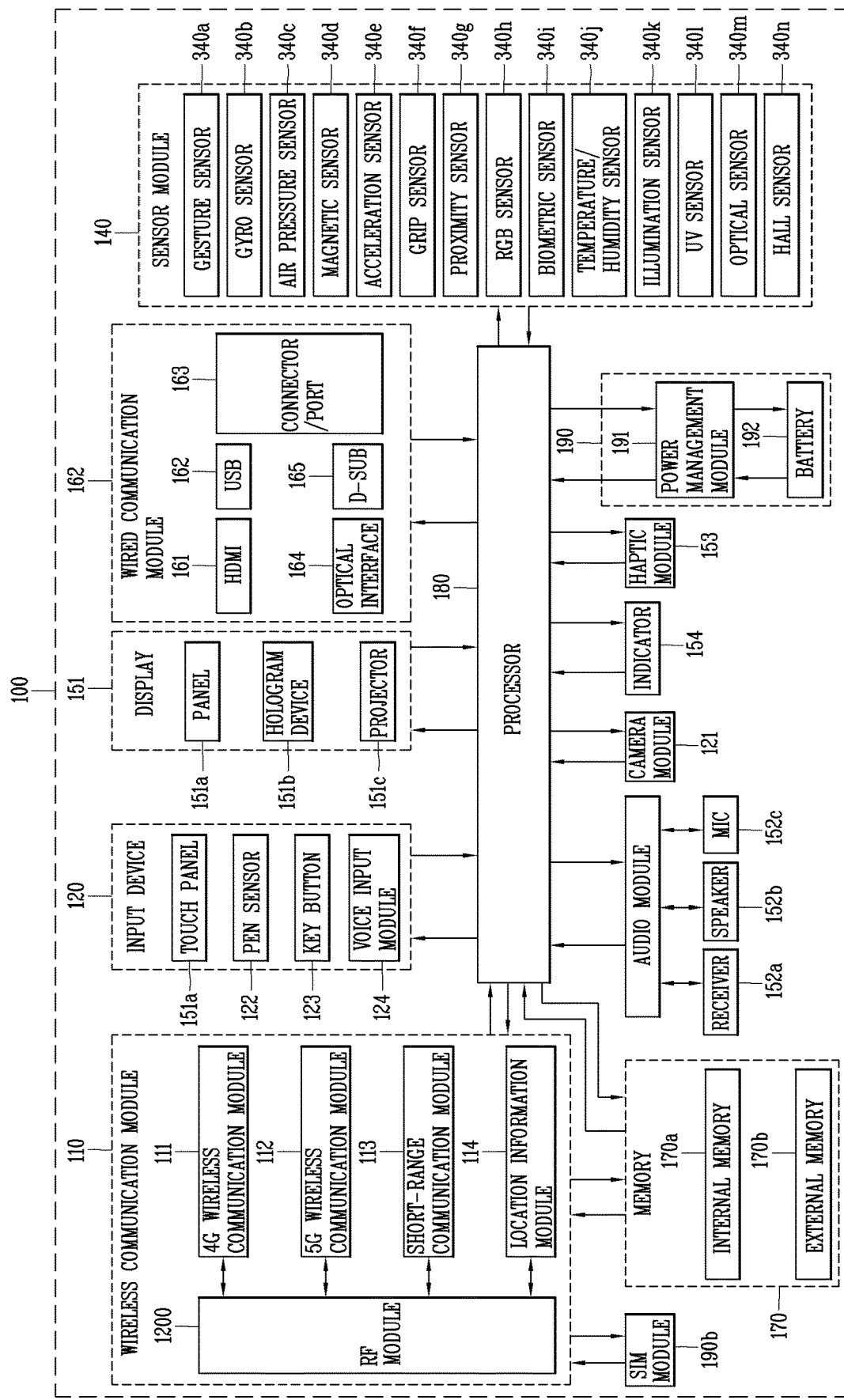
FIG. 2A is a view illustrating a detailed configuration of the electronic device of FIG. 1A.
Figure 2B:
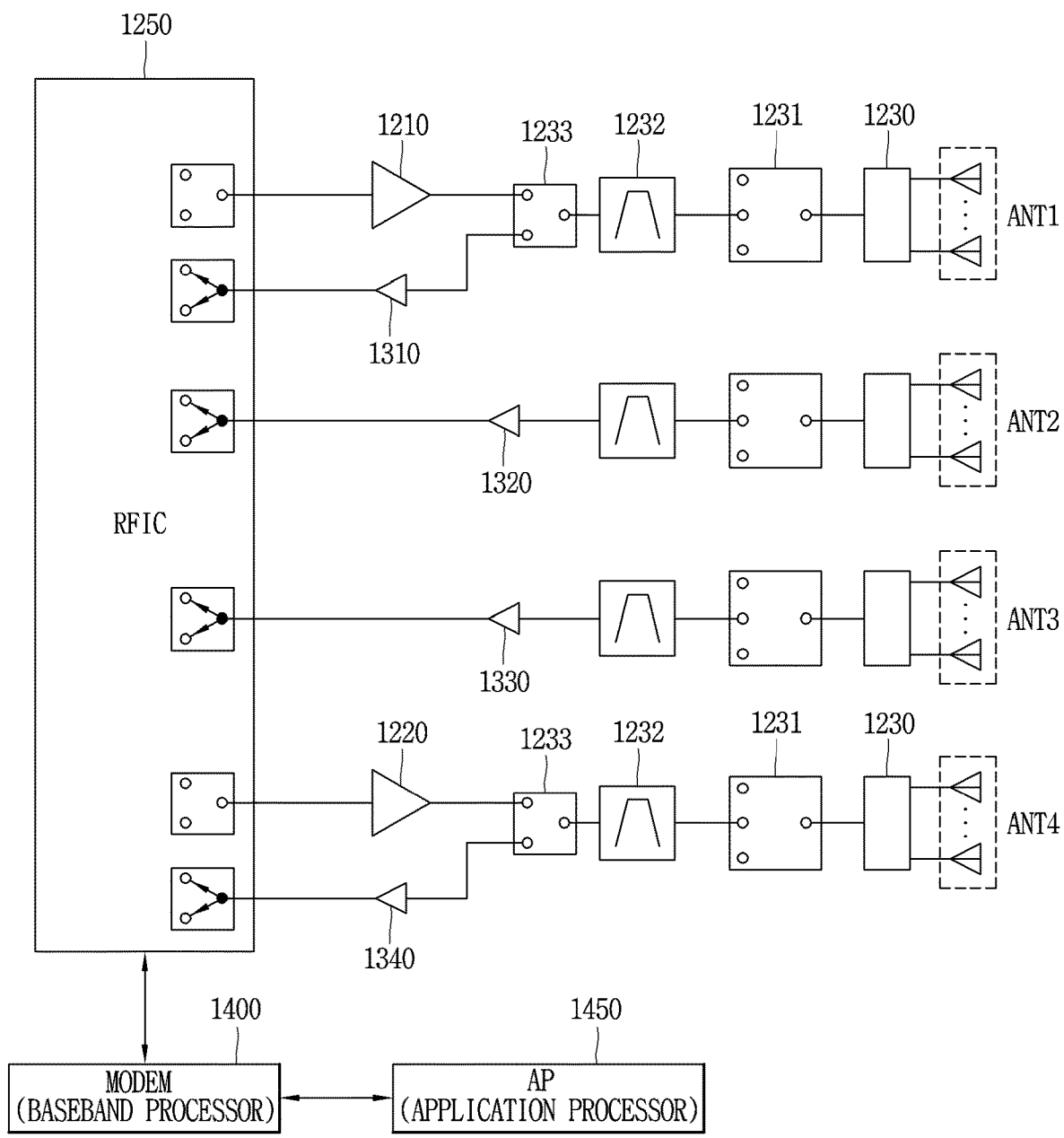
FIG. 2B is a view illustrating a configuration of a wireless communication unit of the electronic device operable in a plurality of wireless communication systems according to an embodiment.

Meanwhile, referring to FIGS. 2A to 2B, FIG. 2A is a view illustrating a detailed configuration of the electronic device of FIG. 1A. FIGS. 2B and 2C are conceptual views illustrating one example of an electronic device according to the present disclosure, viewed from different directions.

Referring to FIG. 1A, the electronic device 100 may include a communication interface 110, an input interface (or an input device) 120, an output interface (or an output device) 150, and a processor 180. Here, the communication interface 110 may refer to the wireless communication module 110. The electronic device 100 may further include a display 151 and a memory 170. It is understood that implementing all of the illustrated components illustrated in FIG. 1A is not a requirement, and that greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be, for example, a 4G communication network and a 5G communication network.

Referring to FIGS. 1A and 2A, the wireless communication module 110 may include at least one of a 4G wireless communication module 111, a 5G wireless communication module 112, a short-range communication module 113, and a location information module 114. The 4G wireless communication module 111, the 5G wireless communication module 112, the short-range communication module 113, and the location information module 114 may be implemented as a baseband processor such as a modem. In one example, the 4G wireless communication module 111, the 5G wireless communication module 112, the short-range communication module 113, and the location information module 114 may be implemented as a transceiver circuit operating in an IF band and a baseband processor. The RF module 1200 may be implemented as an RF transceiver circuit operating in an RF frequency band of each communication system. However, the present disclosure may not be limited thereto. Each of the 4G wireless communication module 111, the 5G wireless communication module 112, the short-range communication module 113, and the location information module 114 may include an RF module.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) architecture. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication module 110 may be in a Dual Connectivity (DC) state with the 4G base station and the 5G base station through the 4G wireless communication module 111 and the 5G wireless communication module 112. As such, the dual connectivity to the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

When the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive, or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication module 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151a, and the like. The input device 120 may include a camera module 121 or an image input unit for obtaining images or video, a microphone 152c or an audio input unit for inputting an audio signal, and a user input unit 123 (for example, a touch key, a mechanical key, and the like) for allowing a user to input information. Data (for example, audio, video, image, and the like) may be obtained by the input device 120 and may be analyzed and processed according to user commands.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 includes at least one of a gesture sensor 340a, a gyro sensor 340b, an air pressure sensor 340c, a magnetic sensor 340d, an acceleration sensor 340e, a grip sensor 340f, and a proximity sensor 340g, a color sensor 340h (e.g., RGB (red, green, blue) sensor), a bio-sensor 340i, a temperature/humidity sensor 340j, an illuminance sensor 340k, an ultra violet (UV) sensor 340l, a light sensor 340m, and a hall sensor 340n. The sensor module 140 may also include at least one of a finger scan sensor, an ultrasonic sensor, an optical sensor (for example, camera 121), a microphone (see 152c), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output interface 150 may typically be configured to output various types of information, such as audio, video, tactile output, and the like. The output interface 150 may be shown having at least one of a display 151, an audio module 152, a haptic module 153, and an indicator 154.

The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user. For example, the display 151 may include a liquid crystal display (LCD), a light emitting diode (LED) display, an organic light emitting diode (OLED) display, a micro electromechanical systems (MEMS) display, or an electronic paper. For example, the display 151 may display various contents (e.g., text, images, videos, icons, and/or symbols, etc.). The display 151 may include a touch screen, and may receive, for example, a touch, gesture, proximity, or hovering input using an electronic pen or a part of the user's body.

Meanwhile, the display 151 may include a touch panel 151a, a hologram device 151b, a projector 151c, and/or a control circuit for controlling them. In this regard, the panel may be implemented to be flexible, transparent, or wearable. The panel may include the touch panel 151a and one or more modules. The hologram device 151b may display a stereoscopic image in the air by using light interference. The projector 151c may display an image by projecting light onto a screen. The screen may be located inside or outside the electronic device 100, for example.

The audio module 152 may interwork with the receiver 152a, the speaker 152b, and the microphone 152c. Meanwhile, the haptic module 153 may convert an electrical signal into a mechanical vibration, and generate a vibration or a haptic effect (e.g., pressure, texture). The electronic device may include a mobile TV supporting device (e.g., a GPU) that may process media data as per, e.g., digital multimedia broadcasting (DMB), digital video broadcasting (DVB), or mediaFlo™ standards. The indicator 154 may indicate a particular state of the electronic device 100 or a part (e.g., the processor 310) of the electronic device, including, e.g., a booting state, a message state, or a recharging state.

The wired communication module 160 which may be implemented as an interface unit may serve as a passage with various types of external devices connected to the electronic device 100. The wired communication module 160 may include an HDMI 162, a USB 162, a connector/port 163, an optical interface 164, or a D-subminiature (D-sub) 165. can do. The wired communication module 160, for example, may include any of wired or wireless ports, external power supply ports, wired or wireless data ports, memory card ports, ports for connecting a device having an identification module, audio input/output (I/O) ports, video I/O ports, earphone ports, and the like. The electronic device 100 may perform assorted control functions associated with a connected external device, in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). Application programs may be stored in the memory 170, installed in the electronic device 100, and executed by the processor 180 to perform an operation (or function) for the electronic device 100.

In this regard, the first server 310 may be referred to as an authentication server, and the second server 320 may be referred to as a content server. The first server 310 and/or the second server 320 may be interfaced with the electronic device through a base station. Meanwhile, a part of the second server 320 corresponding to the content server may be implemented as a mobile edge cloud (MEC) 330 in units of base stations. This can implement a distributed network through the second server 320 implemented as the mobile edge cloud (MEC) 330, and shorten content transmission delay.

The memory Memory 170 may include a volatile memory and/or a non-volatile memory. The memory 170 may also include an internal memory 170a and an external memory 170b. The memory 170 may store, for example, commands or data related to at least one of other components of the electronic device 100. According to an implementation, the memory 170 may store software and/or a program 240. For example, the program 240 may include a kernel 171, middleware 172, an application programming interface (API) 173, or an application program (or "application") 174, and the like. At least some of the kernel 171, the middleware 172, and the API 174 may be referred to as an operating system (OS).

The kernel 171 may control or manage system resources (e.g., the bus, the memory 170, or the processor 180) that are used for executing operations or functions implemented in other programs (e.g., the middleware 172, the API 173, or the application program 174). In addition, the kernel 171 may provide an interface to control or manage system resources by accessing individual components of the electronic device 100 in the middleware 172, the API 173, or the application program 174.

The middleware 172 may play an intermediary so that the API 173 or the application program 174 communicates with the kernel 171 to exchange data. Also, the middleware 172 may process one or more task requests received from the application program 247 according to priorities. In one embodiment, the middleware 172 may give at least one of the application programs 174 a priority to use the system resources (e.g., the bus, the memory 170, or the processor 180) of the electronic device 100, and process one or more task requests. The API 173 is an interface for the application program 174 to control functions provided by the kernel 171 or the middleware 1723, and for example, may include at least one interface or function (e.g., command) for file control, window control, image processing, or text control.

The processor 180 may typically function to control an overall operation of the electronic device 100, in addition to the operations associated with the application programs. The processor 180 may provide or process information or functions appropriate for a user by processing signals, data, information, and the like, which are input or output by the aforementioned various components, or activating application programs stored in the memory 170. Furthermore, the processor 180 may control at least part of the components illustrated in FIGS. 1A and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low power processor (e.g., sensor hub). For example, the processor 180 may execute a control of at least one of other components of the electronic device 100 and/or an operation or data processing related to communication.

The power supply unit 190 may be configured to receive external power or provide internal power in order to supply appropriate power required for operating elements and components included in the electronic device 100. The power supply unit 190 may include a power management module 191 and a battery 192, and the battery 192 may be a built-in battery or a replaceable battery. The power management module 191 may include a power management integrated circuit (PMIC), a charger IC, or a battery or fuel gauge. The PMIC may employ a wired and/or wireless charging method. The wireless charging method may include, for example, a magnetic resonance method, a magnetic induction method or an electromagnetic wave method, and may further include an additional circuit for wireless charging, for example, a coil loop, a resonance circuit, or a rectifier. The battery gauge may measure, for example, a remaining battery level, and voltage, current, or temperature during charging. For example, the battery 192 may include a rechargeable cell and/or a solar cell.

Each of the external device 100a, the first server 310, and the second server 320 may be the same or different type of device (e.g., external device or server) as or from the electronic device 100. According to an embodiment, all or some of operations executed on the electronic device 100 may be executed on another or multiple other electronic devices (e.g., the external device 100a, the first server 310 and the second server 320. According to an implementation, when the electronic device 100 should perform a specific function or service automatically or at a request, the electronic device 100 may request another device (e.g., the external device 100a, the first server 310, and the second server 320) to perform at least some functions associated therewith, instead of executing the function or service on its own or additionally. The another electronic device (e.g., the external device 100a, the first server 310, and the second server 320) may execute the requested function or additional function and transfer a result of the execution to the electronic device 100. The electronic device 100 may provide the requested function or service by processing the received result as it is or additionally. For this purpose, for example, cloud computing, distributed computing, client-server computing, or mobile edge cloud (MEC) technology may be used.

At least some of the components may cooperably operate to implement an operation, a control or a control method of an electronic device according to various embodiments disclosed herein. Also, the operation, the control or the control method of the electronic device may be implemented on the electronic device by an activation of at least one application program stored in the memory 170.

Referring to FIGS. 1A and 1B, a wireless communication system may include an electronic device 100, at least one external device 100a, a first server 310, and a second server 320. The electronic device 100 may be functionally connected to at least one external device 100a, and may control contents or functions of the electronic device 100 based on information received from the at least one external device 100a. According to an embodiment, the electronic device 100 may use the servers 310 and 320 to perform authentication for determining whether the at least one external device 100 includes or generates information conforming to a predetermined rule. Also, the electronic device 100 may display contents or control functions differently by controlling the electronic device 100 based on the authentication result. According to an embodiment, the electronic device 100 may be connected to at least one external device 100a through a wired or wireless communication interface to receive or transmit information. For example, the electronic device 100 and the at least one external device 100a may transmit or receive information through near field communication (NFC), a charger (e.g., universal serial bus (USB)-C), ear jack, Bluetooth (BT), wireless fidelity (WiFi), or the like.

The electronic device 100 may include at least one of an external device authentication module 100-1, a content/function/policy information DB 100-2, an external device information DB 100-3, or a content DB 104. The at least one external device 100a, which is an assistant device linked with the electronic device 100, may be a device designed for various purposes, such as convenience of use, more attractive appearance, enhancement of usability, etc. of the electronic device 100. At least one external device 100a may or may not be in physical contact with the electronic device 100. According to one embodiment, the at least one external device 100a may be functionally connected to the electronic device 100 using a wired/wireless communication module to control information for controlling content or a function in the electronic device 100.

According to one embodiment, the at least one external device 100a may include an authentication module for encrypting or decrypting at least one of various types of information included in external device information or storage and manage such information in a physical/virtual memory area which is not accessible directly from outside. According to one embodiment, the at least one external device 100a may perform communication with the electronic device 100 or may provide information through communication between the external devices. According to one embodiment, the at least one external device may be functionally connected to the server 410 or 320. In various embodiments, the at least one external device 100a may be various types of products such as a cover case, an NFC dongle, a car charger, an earphone, an ear cap (e.g., an accessory device mounted on a mobile phone audio connector), a thermometer, an electronic pen, a BT earphone, a BT speaker, a BT dongle, a TV, a refrigerator, and a WiFi dongle.

In this regard, for example, the external device 100a such as a wireless charger may supply power to the electronic device 100 using a charging interface such as a coil. In this case, control information may be exchanged between the external device 100a and the electronic device 100 through in-band communication through a charging interface such as a coil. Meanwhile, control information may be exchanged between the external device 100a and the electronic device 100 through out-of-band communication such as Bluetooth or NFC.

Meanwhile, the first server 310 may include a server or a cloud device for services related to the at least one external device 100a or a hub device for controlling services in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication-related server. The second server 320 may include a server or a cloud device for providing a service or content, or a hub device for providing a service in a smart home environment. The second server 320 may include at least one of a content DB 321, an external device specification information DB 322, a content/function/policy information management module 323, or a device/user authentication/management module 324. The second server 130 may be referred to as a content management server, a content server, or a content-related server.

On the other hand, the electronic device 100 described herein may maintain a connection state between a 4G base station (eNB) and a 5G base station (eNB) through the 4G wireless communication module 111 and/or the 5G wireless communication module 112. In this regard, as described above, FIG. 1C illustrates a configuration in which the electronic device 100 is interfaced with a plurality of base stations or network entities.

Referring to FIG. 1C, 4G/5G deployment options are shown. With regard to 4G/5G deployment, when multi-RAT of 4G LTE and 5G NR is supported in a non-standalone (NSA) mode, it may be implemented as EN-DC in option 3 or NGEN-DC in option 5. On the other hand, when multi-RAT is supported in a standalone (SA) mode, it may be implemented as NE-DC in option 4. In addition, when single RAT is supported in a standalone (SA) mode, it may be implemented as NR-DC in option 2.

The NR frequency band is defined as a frequency range of two types (FR1, FR2). The FR1 is a sub-6 GHz range, and the FR2 is a range of above 6 GHz, which may denote millimeter waves (mmWs).

Operating bands for dual connectivity may be specified to operate in EN-DC, NGEN-DC, or NR-DC configuration. EN-DC or NGEN-DC band combinations may include at least one E-UTRA operating band. Specifically, operating bands for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

A UE channel bandwidth for EN-DC may be defined. In this regard, a UE channel bandwidth for intra-band EN-DC in FR1 may be defined. Channel arrangements for DC may be defined. In this regard, channel spacing for intra-band EN-DC carriers may be defined.

The configuration for EN-DC may be defined. Specifically, configurations for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

As an example, UL EN-DC configuration may be defined for 2, 3, 4, 5, or 6 bands in FR1. In this regard, the UL EN-DC configuration for 2, 3, 4, 5, or 6 bands in FR1 may be made of a combination of EUTRA and NR configurations. This EN-DC, NGEN-DC, or NR-DC configuration may also be defined for downlink (DL) as well as uplink (UL).

Transmitter power may be defined in relation to EN-DC. UE maximum output power and UE maximum output power reduction may be defined for each configuration of the above-described EN-DCs. UE additional maximum output power reduction may be defined in relation to EN-DC. Configured output power for EN-DC and configured output power for NR-DC may be defined.

With regard to the base station type, the eNB is a 4G base station, which is also called an LTE eNB, and is based on the Rel-8-Rel-14 standard. On the other hand, ng-eNB is an eNB capable of interworking with a 5GC and gNB, which is also called an eLTE eNB, and is based on the Rel-15 standard. Furthermore, the gNB is a 5G base station interworking with a 5G NR and 5GC, which is also called an NR gNB, and is based on the Rel-15 standard. In addition, the en-gNB is a gNB capable of interworking with an EPC and an eNB, also called an NR gNB, and is based on the Rel-15 standard. With regard to the Dual Connectivity (DC) type, option 3 represents E-UTRA-NR Dual Connectivity (EN-DC). Option 7 represents NG-RAN E-UTRA-NR Dual Connectivity (NGEN-DC). Option 4 represents NR-E-UTRA Dual Connectivity (NE-DC). Option 2 represents NR-NR Dual Connectivity (NR-DC). In this regard, the technical features of double connection according to option 2 through option 7 are as follows.

Option 2: Independent 5G services may be provided with only a 5G system (5GC, gNB). In addition to enhanced Mobile Broadband (eMBB), Ultra-Reliable Low-Latency Communication (URLLC) and Massive Machine Type Communication (mMTC) may be possible, and 5GC features such as network slicing, MEC support, mobility on demand, and access-agnostic may be available to provide a full 5G service. Initially, due to coverage limitations, it may be used as a hot spot, an enterprise or overlay network, and when it is out of a 5G NR coverage, EPC-5GC interworking is required. A 5G NR full coverage may be provided, and dual connectivity (NR-DC) may be supported between gNBs using a plurality of 5G frequencies.

Option 3: This is a case where only a gNB is introduced into the existing LTE infrastructure. The core is an EPC and the gNB is an en-gNB that can interwork with the EPC and the eNB. The dual connectivity (EN-DC) is supported between the eNB and the en-gNB, and the master node is an eNB. An eNB, which is a control anchor of an en-gNB, processes control signaling for network access, connection configuration, handover, etc. of a UE, and user traffic may be transmitted through the eNB and/or the en-gNB. It is an option that is mainly applied to a first stage of 5G migration, as an operator operating an LTE nationwide network is able to quickly build a 5G network with the introduction of the en-gNB and minimal LTE upgrade without 5GC.

There are three types of option 3, which are options 3/3a/3x, depending on the user traffic split schemes. Bearer split is applied to options 3/3x, but is not applied to option 3a. The main scheme is option 3x.

Option 3: Only an eNB is connected to an EPC and an en-gNB is connected only to the eNB. User traffic may be split at a master node (eNB) and transmitted simultaneously to LTE and NR.

Option 3a: Both the eNB and the gNB are connected to the EPC, and thus user traffic is directly transferred from the EPC to the gNB. User traffic is transmitted to LTE or NR.

Option 3x: It is a combination of option 3 and option 3a, which differs from Option 3 in that user traffic is split at the secondary node (gNB).

The advantages of option 3 are i) that LTE can be used as a capacity booster for eMBB services, and ii) the terminal is always connected to LTE to provide service continuity through LTE even if it is out of 5G coverage or NR quality deteriorates so as to provide stable communication.

Option 4: 5GC is introduced, and still interworking with LTE, but independent 5G communication is possible. Core is 5GC, and the eNB is an ng-eNB capable of interworking with 5GC and a gNB. Dual connectivity (NE-DC) is supported between an ng-eNB and a gNB, and the master node is the gNB. LTE may be used as a capacity booster when 5G NR coverage is fully extended. There are two types of option 4, which are option 4/4a. The main scheme is option 4a. The main scheme is option 4a.

Option 7: 5GC is introduced, and still interworking with LTE, and 5G communication relies on LTE. Core is 5GC, and the eNB is an ng-eNB capable of interworking with 5GC and a gNB. Dual connectivity (NGEN-DC) is supported between an ng-eNB and a gNB, and the master node is the eNB. 5GC features may be used, and when 5G coverage is insufficient yet, service continuity may be provided using an eNB as the master node similar to option 3. There are three types of option 7, which are options 7/7a/7x, depending on the user traffic split schemes. Bearer split is applied to options 7/7x, but is not applied to option 7a. The main scheme is option 7x.

Hereinafter, description will be given of embodiments of a multi-communication system and an electronic device having the same, specifically, an antenna in a heterogeneous radio system and an electronic device having the same according to the present disclosure, with reference to the accompanying drawings. It will be apparent to those skilled in the art that the present disclosure may be embodied in other specific forms without departing from the idea or essential characteristics thereof.

Hereinafter, detailed operations and functions of an electronic device having a plurality of antennas according to one implementation that includes the 4G/5G communication modules as illustrated in FIG. 2A will be discussed.

In a 5G communication system according to an embodiment, a 5G frequency band may be a higher frequency band than a sub-6 band. For example, the 5G frequency band may be an mmWave band but is not limited thereto, and may be changed depending on applications.

FIG. 2B is a view illustrating a configuration of a wireless communication unit of an electronic device operable in a plurality of wireless communication systems according to an embodiment. Referring to FIG. 2B, the electronic device may include a first power amplifier 1210, a second power amplifier 1220, and an RFIC 1250. In addition, the electronic device may further include a modem 400 and an application processor (AP) 500. Here, the modem 400 and the application processor (AP) 500 may be physically implemented on a single chip, and may be implemented in a logically and functionally separated form. However, the present disclosure may not be limited thereto and may be implemented in the form of a chip that is physically separated according to an application.

Meanwhile, the electronic device includes a plurality of low noise amplifiers (LNAs) 1310 to 1340 in the receiver. Here, the first power amplifier 1210, the second power amplifier 1220, the RFIC 1250, and the plurality of low noise amplifiers 310 to 340 are all operable in a first communication system and a second communication system. In this case, the first communication system and the second communication system may be a 4G communication system and a 5G communication system, respectively.

As illustrated in FIG. 2B, the RFIC 1250 may be configured as a 4G/5G integrated type, but the present disclosure may not be limited thereto. The RFIC 250 may be configured as a 4G/5G separate type according to an application. When the RFIC 1250 is integrally configured to serve for 4G and 5G, this configuration may be advantageous in terms of synchronization between 4G and 5G circuits as well as simplification of control signaling by the modem 1400.

On the other hand, when the RFIC 1250 is separable into two parts for 4G and 5G, respectively, these two parts may be referred to as a 4G RFIC and a 5G RFIC, respectively. In particular, when there is a great difference between the 5G band and the 4G band, such as when the 5G band is configured as a millimeter wave band, the RFIC 1250 may be configured to be separable into two parts for 4G and 5G, respectively. As such, when the RFIC 1250 is configured as the 4G/5G separate type, there may be an advantage that the RF characteristics can be optimized for each of the 4G band and the 5G band.

Meanwhile, even when the RFIC 1250 is configured as a 4G/5G separation type, the 4G RFIC and the 5G RFIC may be logically and functionally separated but physically implemented on a single chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate power circuits of a transmitter and a receiver through the RFIC 1250 in a low power mode.

In this regard, when it is determined that the electronic device is in an idle mode, the application processor (AP) 500 may control the RFIC 1250 through the modem 300 as follows. For example, when the electronic device is in an idle mode, the application processor 280 may control the RFIC 1250 through the modem 400, such that at least one of the first and second power amplifiers 110 and 120 operates in the low power mode or is turned off.

According to another embodiment, the application processor (AP) 500 may control the modem 400 to provide wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 500 may control the modem 1400 and the RFIC 1250 to perform short-range communication using only the short-range communication module 113.

According to another embodiment, when a remaining battery capacity of the electronic device is equal to or greater than a threshold value, the application processor 1450 may control the modem 300 to select an optimal wireless interface. For example, the application processor (AP) 1450 may control the modem 1400 to receive data through both the 4G base station and the 5G base station according to the remaining battery level and the available radio resource information. In this case, the application processor (AP) 1450 may receive the remaining battery capacity information from the PMIC, and the available radio resource information from the modem 1400. Accordingly, when the remaining battery capacity and the available radio resources are sufficient, the application processor (AP) 500 may control the modem 1400 and the RFIC 1250 to receive data through both the 4G base station and 5G base station.

Meanwhile, in a multi-transceiving system of FIG. 2B, a transmitter and a receiver of each radio system may be integrated into a single transceiver. This has an advantage of eliminating a circuitry part where two types of system signals are integrated with each other at an RF front-end.

In addition, since the front-end component can be controlled by the integrated transceiver, the front-end component can be more efficiently integrated than that in a case where the transceiving system is separated for each communication system.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 1210 and the second power amplifier 1220 may operate in at least one of the first and second communication systems. In this regard, when the 5G communication system operates in the 4G band or the Sub-6 band, the first and second power amplifiers 1210 and 1220 can operate in both the first and second communication systems.

On the other hand, when the 5G communication system operates in a millimeter wave (mmWave) band, one of the first and second power amplifiers 1210 and 1220 may operate in the 4G band and the other in the millimeter-wave band.

On the other hand, two different wireless communication systems may be implemented with one antenna using an antenna that serves for both transmission and reception by integrating a transmission unit and a reception unit. In this case, 4×4 MIMO may be implemented using four antennas as illustrated in FIG. 2B. At this time, 4×4 DL MIMO may be performed through downlink (DL).

In this regard, MIMO is a key technology to improve the throughput. It uses multiple antennas both on the transmitter and receiver sides, so as to enable multi-layer data transmission. NR supports multi-layer data transmission for a single UE (single-user MIMO) with a maximum of eight transmission layers for DL and four for UL. NR also supports multi-layer data transmission to multiple UEs on different layers (multi-user MIMO) using a maximum of twelve transmission layers for DL and UL transmissions.

Reference Signals (RSs) are specified by assuming multi-layer transmissions. For demodulation of date/control information for both uplink and downlink, demodulation RS (DM-RS) is supported. For measurement of channel state information of downlink, channel state information RS (CSI-RS) is supported. CSI-RS is also used for mobility measurement, measurement of gNB transmission beamforming, and frequency/time tracking. The CSI-RS used for the frequency/time tracking is named as tracking RS (TRS). In a high frequency range, phase noise is a problem that degrades the transmission performance. A phase tracking reference signal (PT-RS) is applied with respect to PDSCH and PUSCH to enable a receiver to track the phase and mitigate performance loss due to the phase noise. For uplink channel sounding, sounding RS (SRS) is supported.

For UL multi-layer data transmission, both codebook based precoding and non-codebook based precoding are supported. In codebook based UL transmission, precoding matrix applied for PUSCH transmission is selected by gNB. In non-codebook based UL transmission, precoded multiple SRS are transmitted and then the gNB selects a desired transmission layer for PUSCH based on the reception of the SRS.

Since NR supports a multi-beam operation where every signal/channel is transmitted on directional beam, beamforming is an important technique for achieving higher throughput and sufficient coverage especially in a high frequency range. For DL transmission beamforming, a gNB applies transmission beamforming to SS/PBCH block and/or CSI-RS transmissions, and a UE measures reference signal received power on a physical layer (L1-RSRP) on the configured SS/PBCH block and/or CSI-RS resource. The UE reports an SS/PBCH block or CSI-RS resource with a maximum L1-RSRP value as L1-RSRP beam reporting. The gNB may decide gNB transmission beamforming for the UE based on the reported L1-RSRP. For PDCCH/PDSCH transmission, the gNB informs the UE that the gNB transmission beamforming applied to a certain SS/PBCH block or CSI-RS resource is applied to the PDCCH/PDSCH transmission so that the UE can apply reception beamforming which fits into the gNB transmission beamforming. For UL transmission beamforming, two mechanisms are supported. In one of the mechanisms, the UE transmits multiple SRS symbols with different UE transmission beamforming so that the gNB can measure them and identify the best UE transmission beamforming. In another mechanism, the UE generates UL transmission beamforming which is the same as DL reception beamforming used for SS/PBCH block or CSI-RS resource reception. In addition, beam failure recovery (BFR) is supported to achieve quick recovery from the beam failure. The UE can identify the beam failure and informs the gNB of the index of SS/PBCH block or CSI-RS resource as new candidate beam.

For DL channel state information (CSI) acquisition, NR supports two precoding matrix indicator (PMI) definitions, type I and II codebooks that provide different levels of CSI granularity.

Meanwhile, when the 5G band is a Sub6 band, first to fourth antennas ANT1 to ANT4 may be configured to operate in both the 4G band and the 5G band. In this regard, UL-MIMO and/or DL-MIMO may be performed through the first to fourth antennas ANT1 to ANT4.

In the case of PC2 UE having two transmitting antennas in a closed-loop spatial multiplexing scheme, maximum output power for all transmission bandwidths in a channel bandwidth may be specified. These maximum output power requirements may comply with the specified UL-MIMO configuration. For UE supporting UL-MIMO, the maximum output power may be measured as the sum of maximum output power at each UE antenna connector. A measurement period may be defined as at least one subframe (1 ms), but is not limited thereto. In the case of UE having two transmitting antennas in a closed-loop spatial multiplexing scheme, the maximum power reduction (MPR) allowable for maximum output power may be specified. In the case of UE having two transmitting antennas in a closed loop spatial multiplexing scheme, a specific additional maximum output power reduction (A-MPR) value may be applied to specific maximum output power. In the case of UE supporting UL-MIMO, transmission power may be configured for each UE. Definitions of the configured maximum output power $P_{CMAX,c}$, a lower limit $P_{CMAX\_L,c}$ and an upper limit $P_{CMAX\_H,c}$ may be applied to the UE supporting UL-MIMO.

Regarding the output power adjustment (dynamics) for UL-MIMO, the minimum output power for the UL-MIMO, transmission OFF power, transmission ON/OFF time mask, and power control may be applied. For UE having two transmitting antennas in a closed-loop spatial multiplexing scheme, the minimum output power is defined as the sum of an average power of each transmitting antenna in one subframe (1 ms). It may be controlled so that the minimum output power does not exceed a specific value.

If a 5G band is a mmWave band, UL-MIMO and/or DL-MIMO may be performed in the mmWave band through the first to fourth antennas ANT1 to ANT4. The operating band for UL-MIMO may be at least one of n257, n258, n260, and n261 bands. Transmission power for UL-MIMO may be defined. UE maximum power for UL-MIMO may be defined for each power class (PC). For PC1 UE, the UE maximum power may be defined as the maximum output power radiated by the UE using UL-MIMO for all transmission bandwidths within a channel bandwidth for non-CA configuration.

For each of PC1 UE to PC4 UE, the UE minimum peak EIRP (dBm) for UL-MIMO, UE maximum power limit, and UE spherical coverage may be defined for each band. In relation to these requirements, a measurement period may be at least one subframe (1 ms).

Meanwhile, a channel bandwidth for UL-MIMO and UE maximum power for modulation may be defined for each power class (PC). Regarding the output power adjustment (dynamics) for UL-MIMO, the minimum output power for the UL-MIMO, transmission OFF power, transmission ON/OFF time mask, and power control may be applied.

Each of the first to fourth antennas ANT1 to ANT4 may be configured as an array antenna. Meanwhile, 2×2 MIMO may be implemented using two antennas connected to the first power amplifier 1210 and the second power amplifier 1220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 1210, 1220 may operate in the 5G band. Meanwhile, when the 5G communication system is implemented with 4Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller 1250.

In addition, the electronic device that is operable in the plurality of wireless communication systems according to an embodiment may further include a duplexer 1231, a filter 1232, and a switch 1233.

The duplexer 1231 may be configured to separate signals into a signal in a transmission band and a signal in a reception band. In this case, the signals in the transmission band that are transmitted through the first and second power amplifiers 1210 and 1220 are applied to the first and fourth antennas ANT1 and ANT4, respectively, through a first output port of the duplexer 1231. On the contrary, signals in a reception band received through the antennas ANT1 and ANT4 are received by the low noise amplifiers 310 and 340 through a second output port of the duplexer 1231.

The filter 1232 may be configured to allow a signal in the transmission band or the reception band to pass through and to block a signal in a band other than the transmission band and the reception band. In this case, the filter 1232 may include a transmission filter connected to the first output port of the duplexer 1231 and a reception filter connected to the second output port of the duplexer 1231. Alternatively, the filter 1232 may be configured to pass only the signal in the transmission band or only the signal in the reception band according to a control signal.

The switch 1233 may be configured to transmit only one of a transmission signal and a reception signal. In an embodiment of the present disclosure, the switch 1233 may be configured in a single-pole double-throw (SPDT) type to separate a transmission signal and a reception signal in a time division duplex (TDD) scheme. In this case, the transmission signal and the reception signal are signals of the same frequency band, and thus the duplexer 1231 may be implemented as a type of circulator.

Meanwhile, in another implementation of the present invention, the switch 1233 may also be applied to a frequency division multiplex (FDD) scheme. In this case, the switch 1233 may be configured in the form of a double-pole double-throw (DPDT) to connect or block a transmission signal and a reception signal, respectively. On the other hand, the transmission signal and the reception signal may be separated by the duplexer 1231, and thus the switch 1233 is not necessarily required.

Meanwhile, the electronic device according to the implementation may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform controlling of signal transmission and reception and processing of signals through different communication systems using the RFID 1250. The modem 1400 may acquire control information from the 4G base station and/or the 5G base station. Here, the control information may be received through a physical downlink control channel (PDCCH), but may not be limited thereto.

The modem 1400 may control the RFIC 1250 to transmit and/or receive signals through the first communication system and/or the second communication system at a specific time and frequency resources. Accordingly, the RFIC 1250 may control transmission circuits including the first and second power amplifiers 1210 and 1220 to transmit a 4G signal or a 5G signal at a specific time interval. In addition, the RFIC 1250 may control reception circuits including the first to fourth low noise amplifiers 1310 to 1340 to receive a 4G signal or a 5G signal at a specific time interval.

Meanwhile, in a multi-transceiving system of FIG. 2B, a transmitter and a receiver of each radio system may be integrated into a single transceiver. This has an advantage of eliminating a circuitry part where two types of system signals are integrated with each other at an RF front-end.

In addition, since the front-end component can be controlled by the integrated transceiver, the front-end component can be more efficiently integrated than that in a case where the transceiving system is separated for each communication system. The multi-transceiving system as shown in FIG. 2B may control other communication systems as needed, thereby minimizing system delay due to this, and thus there is an advantage in that efficient resource allocation is possible.

Meanwhile, the first power amplifier 1210 and the second power amplifier 1220 may operate in at least one of the first and second communication systems. In this regard, when the 5G communication system operates in the 4G band or the Sub-6 band, the first and second power amplifiers 1210 and 1220 can operate in both the first and second communication systems.

On the other hand, when the 5G communication system operates in a millimeter wave (mmWave) band, one of the first and second power amplifiers 1210 and 1220 may operate in the 4G band and the other in the millimeter-wave band.

Figure 5A:
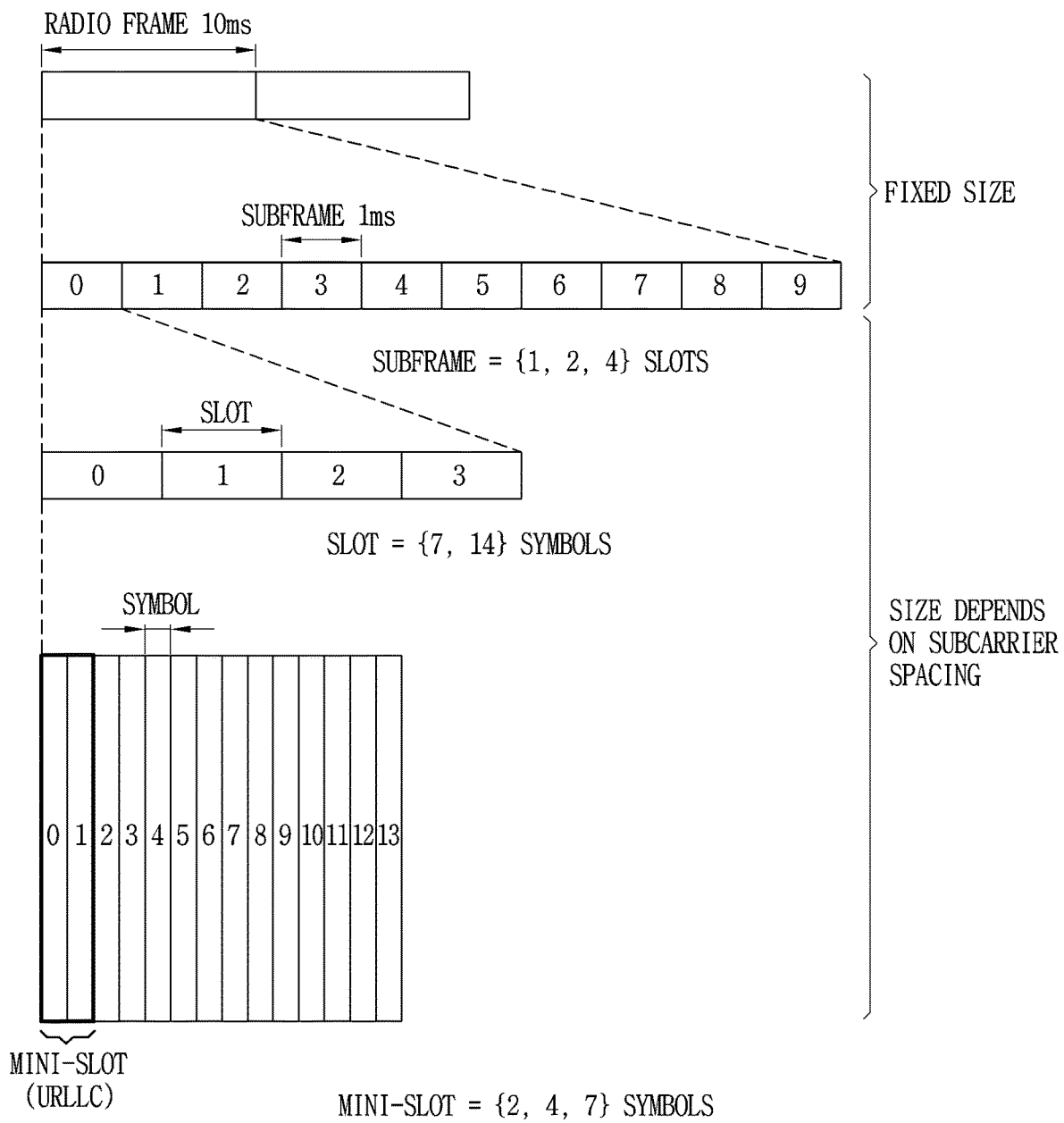
FIG. 5A is a view illustrating an example of a frame structure in NR.

On the other hand, two different wireless communication systems may be implemented with one antenna using an antenna that serves for both transmission and reception by integrating a transmission unit and a reception unit. Here, 4×4 MIMO may be implemented using four antennas as shown in FIG. 5A. In this case, 4×4 DL MIMO may be performed through downlink (DL).

In this regard, MIMO is a key technology to improve the throughput. In this regard, FIG. 2C is a diagram illustrating a MIMO configuration and a MIMO+carrier aggregation (CA) configuration between a UE and a base station (BS) in accordance with one embodiment. Referring to FIG. 2C, 4×4 MIMO requires four Tx antennas at the base station and four Rx antennas at the UE. In addition, if the four antennas of the base station operate as Rx antennas, the four antennas of the UE operate as Tx antennas. Thus, 4×4 MIMO can double a data rate (or capacity) compared to 2×2 MIMO.

It uses multiple antennas both on the transmitter and receiver sides, so as to enable multi-layer data transmission. NR supports multi-layer data transmission for a single UE (single-user MIMO) with a maximum of eight transmission layers for DL and four for UL. NR also supports multi-layer data transmission to multiple UEs on different layers (multi-user MIMO) using a maximum of twelve transmission layers for DL and UL transmissions.

Reference Signals (RS s) are specified by assuming multi-layer transmissions. For demodulation of date/control information for both uplink and downlink, demodulation RS (DM-RS) is supported. For measurement of channel state information of downlink, channel state information RS (CSI-RS) is supported. CSI-RS is also used for mobility measurement, measurement of gNB transmission beamforming, and frequency/time tracking. The CSI-RS used for the frequency/time tracking is named as tracking RS (TRS). In a high frequency range, phase noise is a problem that degrades the transmission performance. A phase tracking reference signal (PT-RS) is applied with respect to PDSCH and PUSCH to enable a receiver to track the phase and mitigate performance loss due to the phase noise. For uplink channel sounding, sounding RS (SRS) is supported.

For UL multi-layer data transmission, both codebook based precoding and non-codebook based precoding are supported. In codebook based UL transmission, precoding matrix applied for PUSCH transmission is selected by gNB. In non-codebook based UL transmission, precoded multiple SRS are transmitted and then the gNB selects a desired transmission layer for PUSCH based on the reception of the SRS.

Since NR supports a multi-beam operation where every signal/channel is transmitted on directional beam, beamforming is an important technique for achieving higher throughput and sufficient coverage especially in a high frequency range. For DL transmission beamforming, a gNB applies transmission beamforming to SS/PBCH block and/or CSI-RS transmissions, and a UE measures reference signal received power on a physical layer (L1-RSRP) on the configured SS/PBCH block and/or CSI-RS resource. The UE reports an SS/PBCH block or CSI-RS resource with a maximum L1-RSRP value as L1-RSRP beam reporting. The gNB may decide gNB transmission beamforming for the UE based on the reported L1-RSRP. For PDCCH/PDSCH transmission, the gNB informs the UE that the gNB transmission beamforming applied to a certain SS/PBCH block or CSI-RS resource is applied to the PDCCH/PDSCH transmission so that the UE can apply reception beamforming which fits into the gNB transmission beamforming. For UL transmission beamforming, two mechanisms are supported. In one of the mechanisms, the UE transmits multiple SRS symbols with different UE transmission beamforming so that the gNB can measure them and identify the best UE transmission beamforming. In another mechanism, the UE generates UL transmission beamforming which is the same as DL reception beamforming used for SS/PBCH block or CSI-RS resource reception. In addition, beam failure recovery (BFR) is supported to achieve quick recovery from the beam failure. The UE can identify the beam failure and informs the gNB of the index of SS/PBCH block or CSI-RS resource as new candidate beam.

For DL channel state information (CSI) acquisition, NR supports two precoding matrix indicator (PMI) definitions, type I and II codebooks that provide different levels of CSI granularity.

With respect to carrier aggregation (CA), 5-CA that aggregates up to 5 bands may be applied. The CA may be applied in combination with MIMO. Referring to FIG. 2C, 4-CA and 1-4×4 MIMO (2.6 GHz) may support up to 800 Mbps. In this regard, 4-CA may be supported for Bands 1, 3, 5, and 7. Bands 1, 3, 5, and 7 may have bandwidths of 10, 20, 10, and 20 MHz, respectively. 4×4 MIMO may be applied to Band 7.

Meanwhile, 3-CA and 2-4×4 MIMO (2.6 GHz and 1.8 GHz) may support up to 900 Mbps. 3-CA may be supported for Bands 3, 5, and 7. 4×4 MIMO may be applied to Band 7.

Meanwhile, 4-CA and 2-4×4 MIMO supporting 1 Gbps may be supported. 4-CA may be supported for Bands 1, 3, 5, and 7. Bands 1, 3, 5, and 7 may have bandwidths of 10, 20, 10, and 20 MHz, respectively. 4×4 MIMO may be applied to Bands 3 and 7. In addition, 5-CA and 3-4×4 MIMO supporting 1.2 Gbps may be supported.

By aggregating 5 carriers and applying 256 QAM and 4×4 MIMO in all bands, a data rate can be improved up to 1.4 Gbps. However, a 4.5G or 5G data rate may be gradually improved depending on processing performance of a UE in use (e.g., the number of data streams that can be simultaneously processed).

The combination of CA and MIMO may be applied to 5G NR in addition to 4G LTE. CA and MIMO for 4G LTE or 5G NR may be referred to as intra-CA+MIMO. On the other hand, CA and MIMO for both 4G LTE and 5G NR may be referred to as inter-CA+MIMO.

Meanwhile, when the 5G band is a Sub 6 band, first to fourth antennas ANT1 to ANT4 may be configured to operate in both the 4G band and the 5G band. In this regard, UL-MIMO and/or DL-MIMO may be performed through the first to fourth antennas ANT1 to ANT4.

In the case of PC2 UE having two transmitting antennas in a closed-loop spatial multiplexing scheme, maximum output power for all transmission bandwidths in a channel bandwidth may be specified. These maximum output power requirements may comply with the specified UL-MIMO configuration. For UE supporting UL-MIMO, the maximum output power may be measured as the sum of maximum output power at each UE antenna connector. A measurement period may be defined as at least one subframe (1 ms), but is not limited thereto. In the case of UE having two transmitting antennas in a closed-loop spatial multiplexing scheme, the maximum power reduction (MPR) allowable for maximum output power may be specified. In the case of UE having two transmitting antennas in a closed loop spatial multiplexing scheme, a specific additional maximum output power reduction (A-MPR) value may be applied to specific maximum output power. In the case of UE supporting UL-MIMO, transmission power may be configured for each UE. Definitions of the configured maximum output power $P_{CMAX,c}$, a lower limit $P_{CMAX\_L,c}$ and an upper limit $P_{CMAX\_H,c}$ may be applied to the UE supporting UL-MIMO.

Regarding the output power adjustment (dynamics) for UL-MIMO, the minimum output power for the UL-MIMO, transmission OFF power, transmission ON/OFF time mask, and power control may be applied. For UE having two transmitting antennas in a closed-loop spatial multiplexing scheme, the minimum output power is defined as the sum of an average power of each transmitting antenna in one subframe (1 ms). It may be controlled so that the minimum output power does not exceed a specific value.

If a 5G band is a mmWave band, UL-MIMO and/or DL-MIMO may be performed in the mmWave band through the first to fourth antennas ANT1 to ANT4. The operating band for UL-MIMO may be at least one of n257, n258, n260, and n261 bands. Transmission power for UL-MIMO may be defined. UE maximum power for UL-MIMO may be defined for each power class (PC). For PC1 UE, the UE maximum power may be defined as the maximum output power radiated by the UE using UL-MIMO for all transmission bandwidths within a channel bandwidth for non-CA configuration.

For each of PC1 UE to PC4 UE, the UE minimum peak EIRP (dBm) for UL-MIMO, UE maximum power limit, and UE spherical coverage may be defined for each band. In relation to these requirements, a measurement period may be at least one subframe (1 ms).

Meanwhile, a channel bandwidth for UL-MIMO and UE maximum power for modulation may be defined for each power class (PC). Regarding the output power adjustment (dynamics) for UL-MIMO, the minimum output power for the UL-MIMO, transmission OFF power, transmission ON/OFF time mask, and power control may be applied.

Each of the first to fourth antennas ANT1 to ANT4 may be configured as an array antenna. Meanwhile, 2×2 MIMO may be implemented using two antennas connected to the first power amplifier 1210 and the second power amplifier 1220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 1210, 1220 may operate in the 5G band. Meanwhile, when the 5G communication system is implemented with 4Tx, an additional power amplifier operating in the 5G band may be further provided. Alternatively, a transmission signal may be branched in each of one or two transmission paths, and the branched transmission signal may be connected to a plurality of antennas.

Figure 3A:
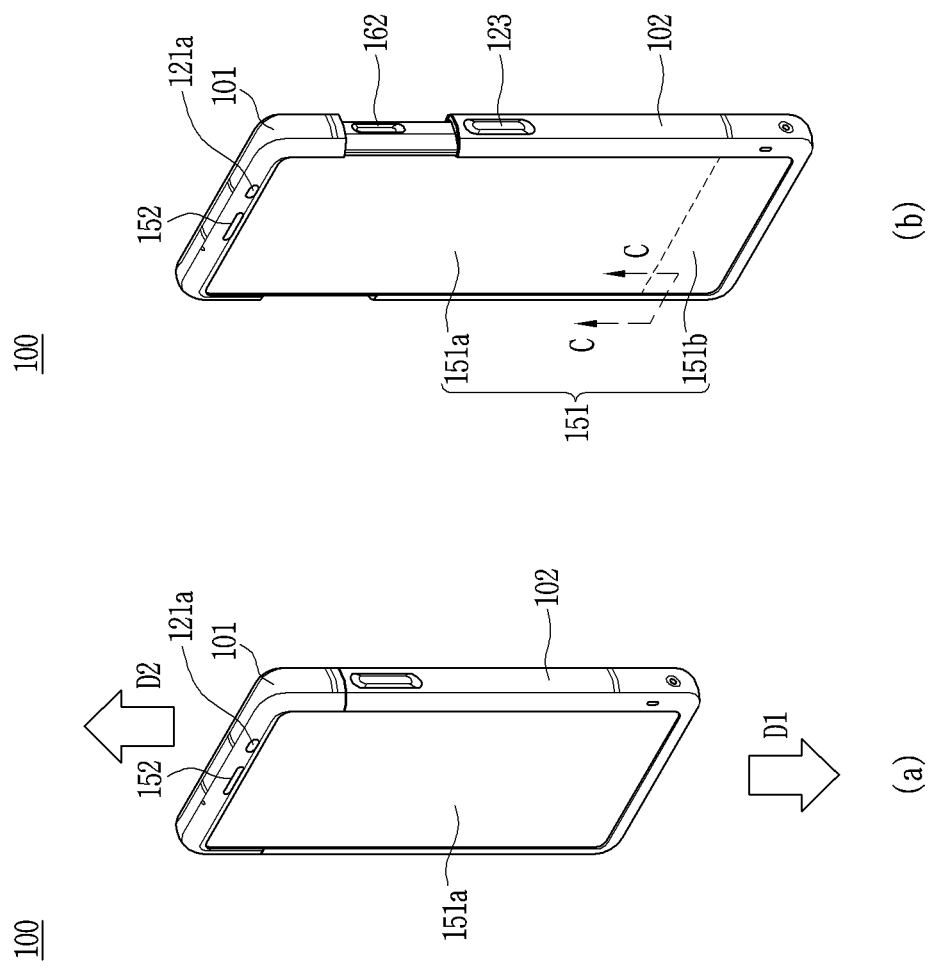
FIGS. 3A and 3B are views illustrating a mobile terminal 100 that may change in size.
Figure 3B:
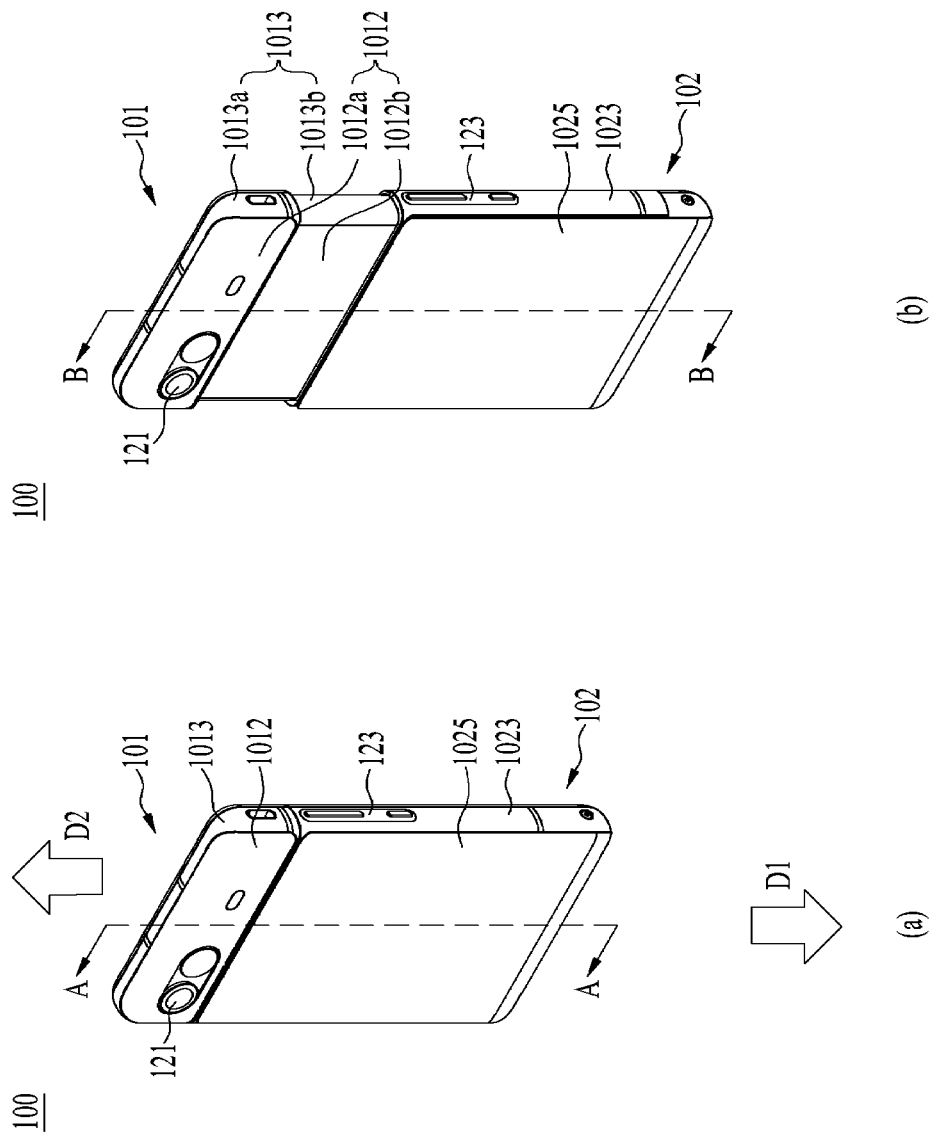

FIGS. 3A and 3B are views illustrating a mobile terminal 100 that may change in size. FIG. 3A is a front view of a first state and a second state of the mobile terminal 100, and FIG. 3B is a rear view of the first state and the second state of the mobile terminal 100. The mobile terminal 100 includes frames 101 and 102 that slide relative to each other to change a size of the mobile terminal 100. The frames include a first frame 101, and a second frame 102 that is slidable relative to the first frame 101. When the second frame 102 moves in a first direction D1, the mobile terminal 100 is switched to an expanded state (second state). On the other hand, when the second frame 102 moves in a second direction opposite to the first direction, the mobile terminal 100 is switched to a retracted state (first state).

The movement of the second frame 102 is a relative movement to the first frame 101. Based on the second frame 102, the mobile terminal 100 is switched to the expanded second state when the first frame 101 is slid in the second direction D2, while being switched to the retracted first state when the first frame 101 is slid in the first direction D1.

As in the embodiment of the present disclosure, when the first frame 101 and the second frame 102 are disposed up and down, since a user grips the lower second frame 102, the first frame 101 moves upward from the user's perspective, and thus it may be recognized that the mobile terminal 100 is expanded upward.

In the following description, a direction that the mobile terminal 100 and the display 151 extend or enlarge is referred to as the first direction D1, a direction that the mobile terminal 100 and the display 151 are contracted, retracted or reduced to be switched from the second state to the first state is referred to as the second direction, and directions perpendicular to the first and second directions are referred to as third and fourth directions. In the drawings, the first and second directions are vertical and the third and fourth directions are horizontal, but the first and second directions may be horizontal and the third and fourth directions may be vertical depending on the placement of the mobile terminal 100.

(a) of FIG. 3A and (a) of FIB. 3B illustrate the first state as the retracted state, and (b) of FIG. 3A and (b) of FIG. 3B illustrate the second state as the expanded state. As in the state that the second frame 102 is expanded by sliding in the first direction, an overlap portion is present between the first frame 101 and the second frame 102.

In the first state, the first frame 101 and the second frame 102 may be configured such that one of the first frame 101 and the second frame 102 is located outside while surrounding the other, or may be configured in a shape in which the first frame 101 has a portion located outside and the second frame 102 has a portion located outside.

In order to expand the mobile terminal 100 by moving the second frame 102 relative to the first frame 101, the first frame 101 and the second frame 102 partially overlap each other. At least one of the first frame 101 or the second frame 102 may include a portion that is located inside in the retracted state of the mobile terminal 100 and then exposed to outside when the mobile terminal 100 is expanded. A rear surface and side surfaces of the mobile terminal 100 may include portions that are located inside another member in the first state and selectively exposed when switched to the second state. In the embodiment, the externally-exposed portion of the second frame may be constant, and the first frame may include an always externally-exposed portion and a selectively-exposed portion.

As illustrated in (b) of FIG. 3, an extended front surface of the mobile terminal in the extended second state is covered with the display 151, such that the inside of the mobile terminal 100 is not exposed.

Depending on whether the frames 101 and 102 of the mobile terminal 100 expand, an area of the display 151 located on the front surface of the mobile terminal 100 may vary. A front surface of the display 151 may have a larger area in the second state than that in the first state. The display 151 includes a fixed part 151a that is fixed to a front surface of the first frame 101 and always located on the front surface of the mobile terminal 100 regardless of the state of the mobile terminal 100, and a variable part 151b that is located on the front surface or a rear surface depending on whether the fixed part 151a and the mobile terminal 100 expand.

The fixed part 151a is coupled to the front surface of the first frame 101 of the display 151 and always located on the front surface, so as to define a portion of a front surface portion. The fixed part 151a is fixed to the first frame 101 and thus maintains a constant shape without a change in a bent (or curved) degree (level). On the other hand, the variable part 151b indicates a bent portion which changes in angle or position. In the second state of the mobile terminal, the variable part moves to the front surface such that the fixed part and the variable part are all located on the front surface portion.

The variable part 151b includes side surface portions located in a lateral (surface) direction of the mobile terminal 100, and positions of the side surface portions vary depending on the position of the second frame 102. With respect to the side surface portions, an area of a region of the variable part located on the front surface and an area of a region located on the rear surface vary. The variable part 151b may partially be a front surface portion and partially be a rear surface portion depending on the first state and the second state.

With respect to the mobile terminal 100, the variable part 151b is located in the first direction with respect to the fixed part 151a, and an end portion of the variable part 151b is bent toward the rear surface of the mobile terminal 100 to be slid on the rear surface of the second frame 102.

A slide frame 103 is coupled to the end portion of the variable part 151b of the display 151 such that the end portion is guided to be slid on the rear surface of the second frame 102. The slide frame 103 moves in the first direction on the second frame 102 at the same time when the second frame 102 moves in the first direction. Therefore, the slide frame 103 moves with respect to the first frame 101 by a distance twice a movement distance with respect to the second frame 102.

In such a way, the display 151 may be configured as a flexible display 151 that is bent such that the variable part 151b of the display 151 can move toward the front surface or the rear surface. The flexible display 151 is a display that can be maintained in a flat state like the existing flat display, and also can be bent, curved, folded, twisted, or rolled like paper. The flexible display 151 denotes a solid display that is manufactured on a thin and flexible substrate and thus is light and not breakable. The flexible display 151 may be bent in a specific direction like paper. The flexible display according to the present disclosure may be disposed such that a radius of curvature thereof changes in the first direction.

In addition, an electronic paper is a display to which general ink characteristics are applied, and is different from the existing flat panel display in view of using reflected light. The electronic paper may change information by using a twist ball or electrophoresis (electrophoresis) using a capsule. In a state where the flexible display 151 is not deformed (e.g., a state having an infinite radius of curvature, hereinafter, referred to as a default state), the display region of the flexible display is flat. When the default state is switched to a state where the flexible display is deformed by an external force (e.g., a state having a finite radius of curvature, hereinafter, referred to as a deformed state), the display region may be curved. As illustrated in the drawing, information displayed in the deformed state may be visual information output on a curved surface. Such visual information is realized by independently controlling an emission of unit pixels (sub-pixels) arranged in a matrix form. The unit pixel denotes an elementary unit for representing one color. In this case, when an external force is applied to the flexible display 151, the flexible display 151 may be deformed from the default state as a flat state into a curved state not the flat state.

Meanwhile, the flexible display unit 151 may be combined with a touch sensor to implement a flexible touch screen. When a touch is input to the flexible touch screen, the controller 180 (see FIG. 1) may perform a control corresponding to the touch input. The flexible touch screen may be configured to sense a touch input even in the deformed state as well as the default state.

A touch sensor senses a touch (or a touch input) applied to the touch screen using at least one of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the display 151 or capacitance occurring at the specific part, into electric input signals. The touch sensor may be configured to detect a touch position, a touch area, touch pressure, touch capacitance, and the like, by a touch object applying a touch onto the touch screen.

On the other hand, the mobile terminal 100 may include a deformation sensor which senses the deformation of the flexible display 151. The deformation sensor may be included in the sensing unit 140 (see FIG. 2A).

The deformation sensor may be provided in the flexible display 151 or cases (a first frame 101 and a second frame 102 to be described later) to sense information related to the deformation of the flexible display 151. Here, the information related to the deformation of the flexible display 151 may be a deformed direction, a deformed degree, a deformed position, a deformed time, an acceleration that the deformed flexible display 151 is restored, and the like. In addition to those, such information may be various information which can be sensed in response to curving of the flexible display 151.

In addition, the controller 180 may change information displayed on the flexible display 151 or generate a control signal for controlling the function of the mobile terminal 100 based on the information related to the deformation of the flexible display 151 detected by the deformation detecting unit.

The deformation of the flexible display 151 may vary depending on the positions of the first frame 101 and the second frame 102. As illustrated in FIG. 3A, since a position where the flexible display 151 is bent is determined according to the positions of the first frame 101 and the second frame 102, a position where the flexible display 151 is to be bent and an area of the flexible display 151 on the front surface may be calculated not by the deformation detecting unit of the flexible display 151 but according to the positions of the first frame 101 and the second frame 102.

The switching of the state (first or second state) of the flexible display 151, namely, the change in the size of the display 151 on the front surface and the rear surface of the mobile terminal 100 according to the change in the size of the mobile terminal 100 may be manually performed by force applied by the user, but the present disclosure may not be limited to the manual method. For example, when the mobile terminal 100 or the flexible display 151 is in the first state, the flexible display 151 may be deformed to the second state by a command of the user or an application, without external force applied by the user. In this way, to automatically deform the flexible display 151 without external force, the mobile terminal 100 may include a driving unit 200 to be explained later.

The flexible display 151 is bent by 180 degrees while rolling around a side portion of the mobile terminal 100 in the first direction. Accordingly, one portion of the flexible display 151 is disposed on the front surface of the mobile terminal, based on the side portion of the mobile terminal 100, and another portion of the flexible display 151 is disposed on the rear surface of the mobile terminal 100. For convenience of explanation, the portion of the flexible display unit 151 located on the front surface is referred to as a front surface portion, and the another portion located on the rear surface is referred to as a rear surface portion. The mobile terminal, as illustrated in FIG. 3A, may be expanded in the first direction or retracted in the second direction opposite to the first direction. In this case, a region of the flexible display 151 located on the front surface changes. That is, the front surface portion and the rear surface portion may change in size depending on the change in the state of the mobile terminal.

Also, the flexible display 151 may be rolled onto or unrolled from the side portion of the mobile terminal in the first direction. Accordingly, the portion disposed on the rear surface of the mobile terminal 100 may be moved, so as to adjust the size of the region of the display unit 151 disposed on the front surface of the mobile terminal 100. Since the flexible display 151 has a fixed area and one continuous body, when the area of the front surface portion increases, the area of the rear surface portion decreases. Thus, the display 151 may be rolled into the second frame 102 movable relative to the first frame 101, more precisely, into the side portion of the second frame 102 in the first direction. The display 151 may be pulled out (withdrawn) from or pushed (inserted) into the second frame 102 while being rolled on the second frame 102 along a moving direction of the second frame 102, so as to adjust the area of the display 151 on the front surface of the mobile terminal 100.

The variable part 151b requires a support structure on the rear surface in order to maintain the flat state because it is flexible. A rolling hinge may be further provided to support the rear surface of the variable part 151b. The rolling hinge may be bendable while the variable part 151*b* is bent and may allow the variable part 151*b* to be maintained in the flat state.

The rolling hinge 104 may be located on the rear surface of the variable part 151*b* of the display 151, and may support the variable part 151*b* to be bent in the first direction but maintained flat without being bent in the third direction. The rolling hinge 104 may include a plurality of support bars extending in the third direction. The plurality of support bars may be disposed in parallel in the first direction. The rolling hinge 104 may be bent together with the variable part 151*b* through a change in angle between the support bars. Both end portions of the support bar may include slide hooks that guide the movement of the display 151 while moving along slide rails disposed on the second frame 102.

A rolling seat located between the support bar and the display 151 may include a cuff pattern configured by a plurality of slits which extend in the third direction to facilitate the deformation in the first direction. The cuff pattern, which has the slits extending in the third direction and are disposed in a zigzag form, restricts the deformation in the third direction while allowing bending in the first direction.

The second frame 102 may include a roll bracket 1028 (see FIG. 4) having a curved surface therein. There is no limitation in position of the roll bracket 1028, but the roll bracket 1028 may be disposed on the end portion of the second frame 102 in the first direction in order to provide a screen with the largest size on the front surface. The roll bracket 1028 may have a bar-like shape that has a curved surface, on which the display 151 can be rolled, and extends in the third direction perpendicular to the first direction.

Also, in order to suppress damage on the display 151 rolled on the roll bracket 1028, a side frame 1024 may be disposed on the end portion of the second frame 102 in the first direction.

Figure 4A:
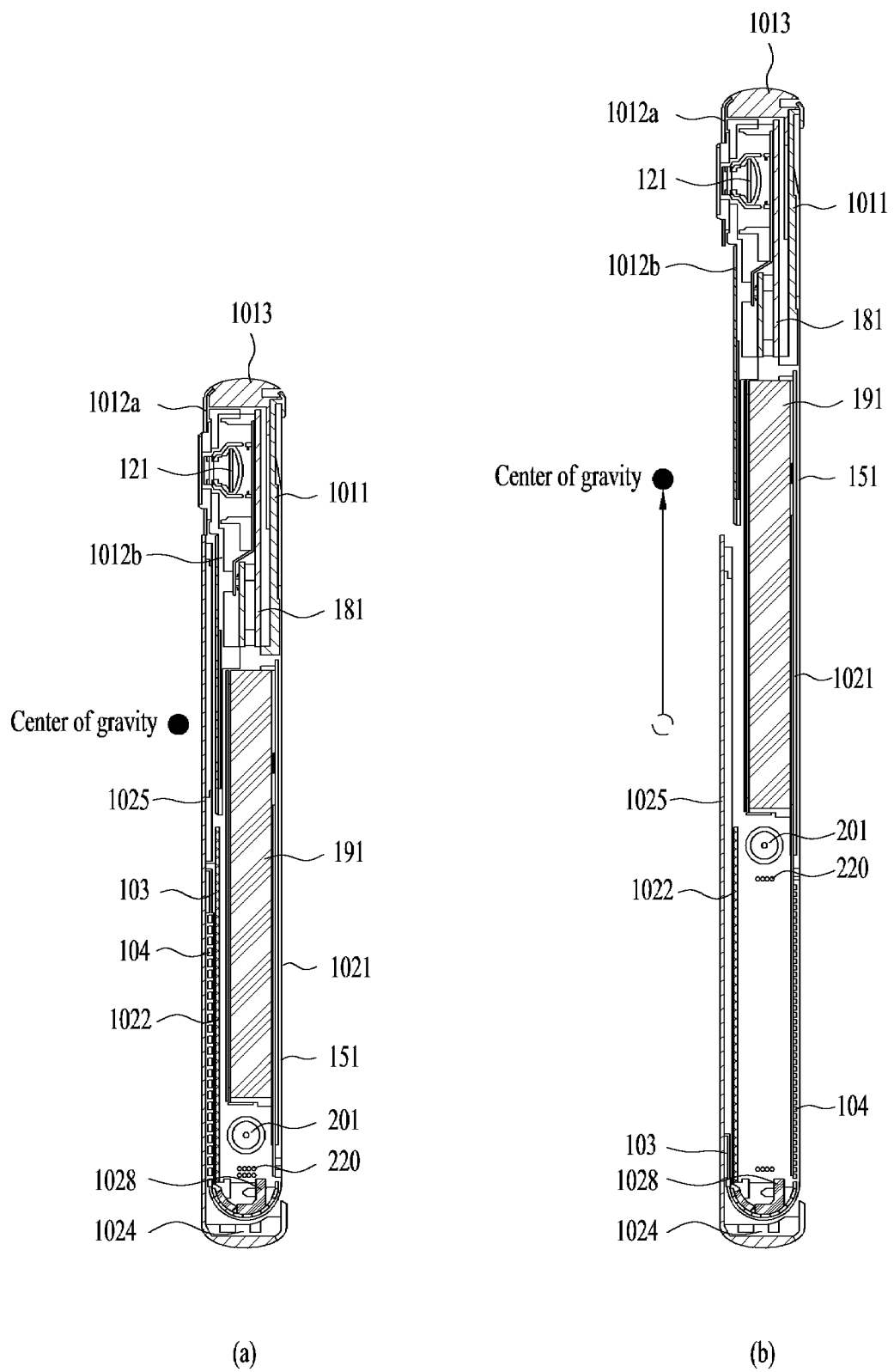
FIG. 4A is a lateral sectional view according to one embodiment of the present disclosure, which illustrate a section taken along the line A-A, and a section taken along the line B-B of FIG. 3B.
Figure 4B:
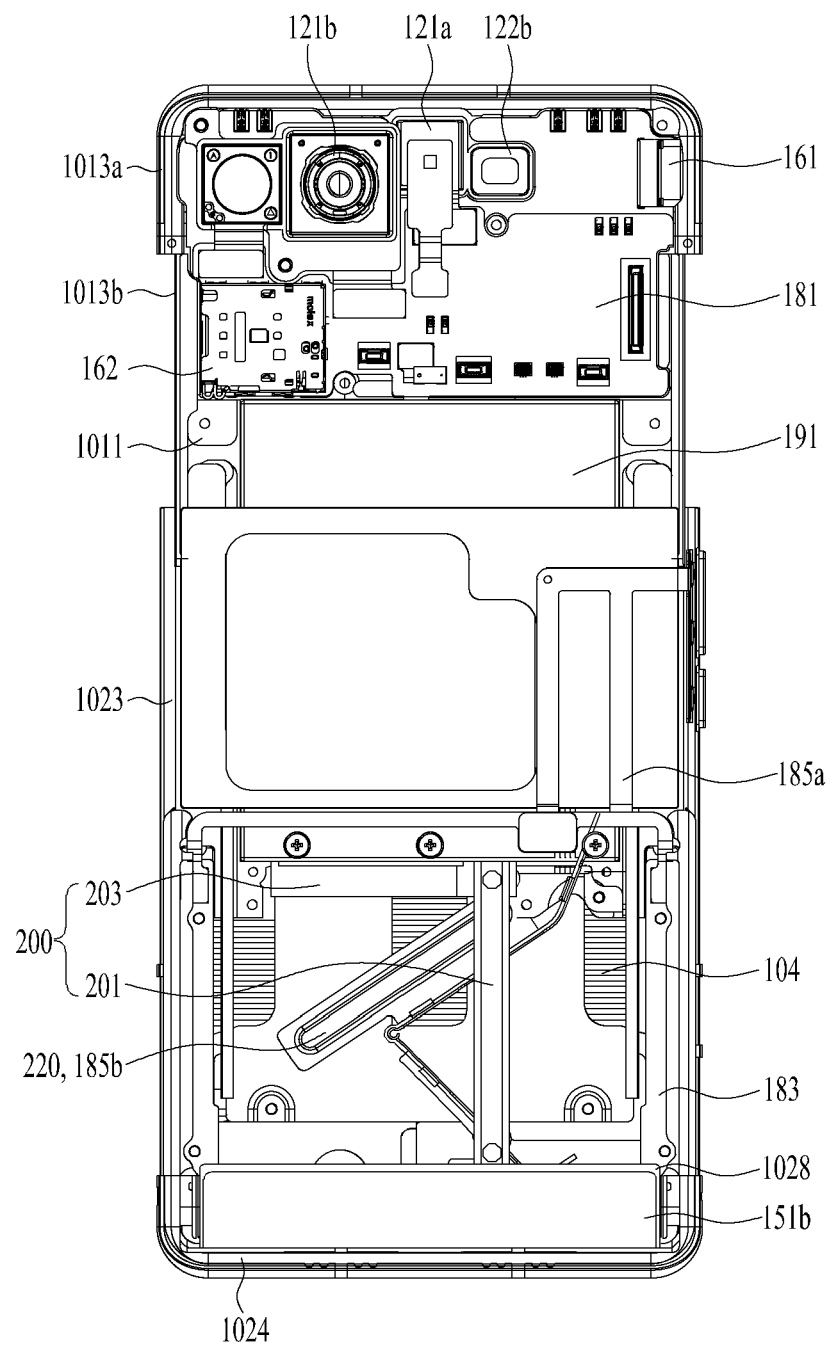
FIG. 4B is a rear view illustrating internal components in a second state of the embodiment of FIG. 4A.

FIG. 4A is a lateral sectional view according to one embodiment of the present disclosure, which illustrate a section taken along the line A-A, and a section taken along the line B-B of FIG. 3B. FIG. 4B is a rear view illustrating internal components in a second state of the embodiment of FIG. 4A. This embodiment illustrates an example in which a battery 191 is mounted in the first frame 101. The battery 191 may be disposed between a first front portion 1011 and a first rear portion 1012 of the first frame 101, and a space open to the bottom of the rear portion 1012 in the second state may be covered with a rear cover 1025.

As in the embodiment of the present disclosure, when the battery 191 is located in the first frame 101, types of components to be mounted in the second frame 102 may be limited, for example, to side antennas and the user input unit 123 or a coil antenna 114 on the rear surface because most of components are located in the first frame 101. Also, since the battery 191 and the main substrate 181 are disposed in the first frame 101, the configuration of a signal connection part 185*b* for connecting each component can be more simplified.

In this embodiment, when the mobile terminal 100 is switched to the second state, an empty space is defined below the battery 191. The second frame 102 which surrounds front and rear sides of the battery 191 moves in the first direction, and supports the rear surface of the variable part 151*b* which has moved to the front surface. The second frame 102 located on the rear surface of the variable part 151*b* forms an empty space therein in the second state. Accordingly, when great force is applied to the front surface, a bending phenomenon may occur. In order to increase support force of the second frame 102, a support link 220 that is unfolded at an expanded portion may further be disposed. The support link 220 is folded in the first state to minimize a mounting space and unfolded in the second state to reinforce rigidity of the expanded portion.

Since the battery 191 is located in the first frame 101, the driving unit 200 may be located in the first direction compared to the battery 191 and may guide the sliding motion between the first frame 101 and the second frame 102.

In this embodiment, a drive motor 201 is located in the first frame 101, a rack gear 203 is located in the second frame 102. The rack gear 203 and the second frame 102 move in the first direction relative to the first frame 101. Since the drive motor 201 is biased to the first direction, the drive motor 201 may be located in the first frame 101 and the rack gear 203 in the second frame, in consideration of a movement space of the rack gear 203.

As in the embodiment, when the battery 191 is disposed in the first frame 101, most of components are disposed in the first frame 101. When the mobile terminal 100 is expanded, the center of gravity is biased to one side. In particular, as in the present disclosure, when the first frame 101 and the second frame 102 are disposed up and down, the center of gravity is moved upward as illustrated in (b) of FIG. 4A, upon an upward movement of the first frame 101. In the state where the user grips the lower portion (second frame) of the mobile terminal, when the center of gravity is moved upward, the user may easily drop the mobile terminal from the hand.

To solve the problem, it is necessary to dispose components inside the frame to be dispersively located in the second state, in order to minimize the movement of the center of gravity even in the second state.

Figure 4C:
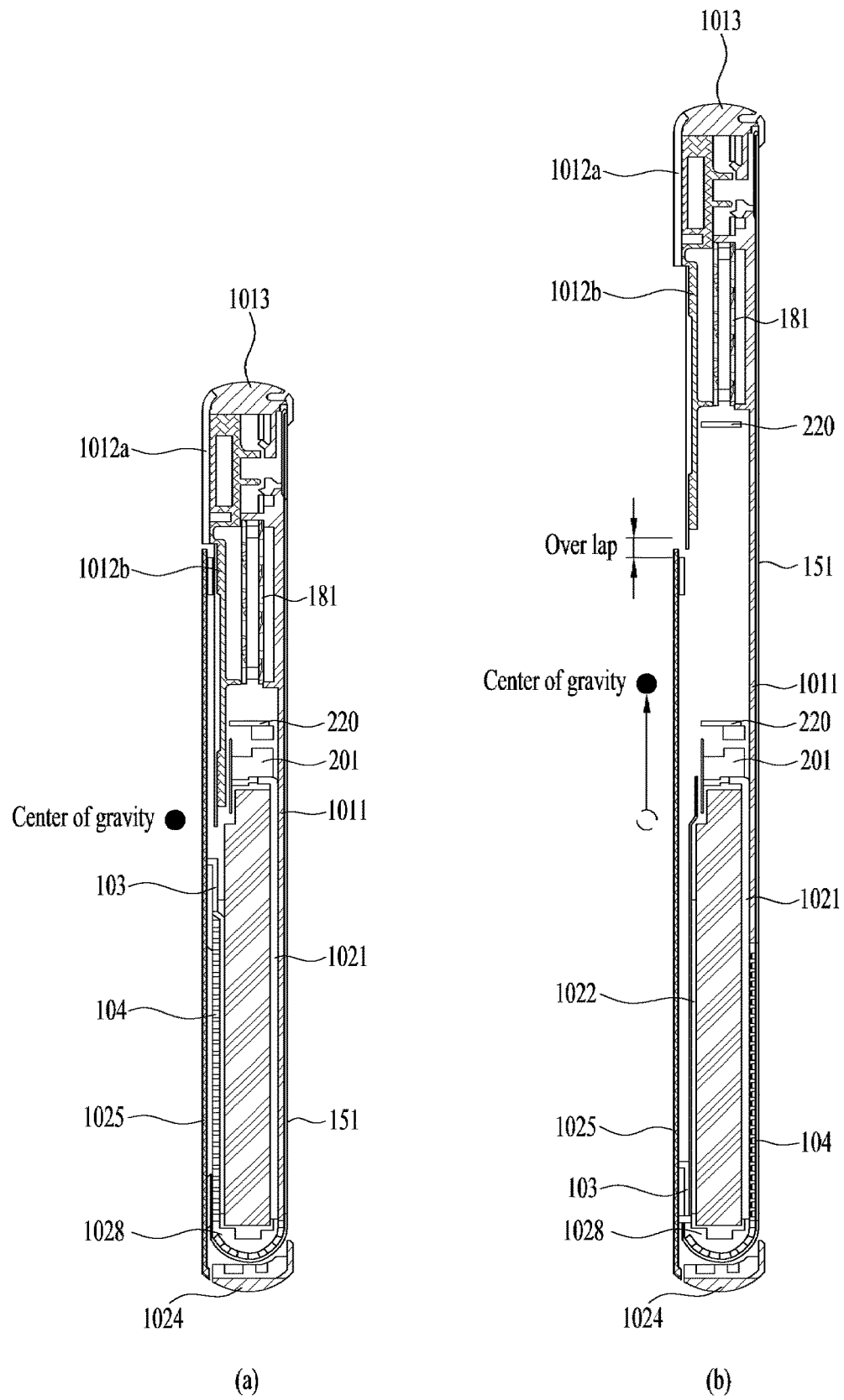
FIG. 4C illustrates another embodiment of the sectional views taken along the lines A-A and B-B of FIG. 3A.
Figure 4D:
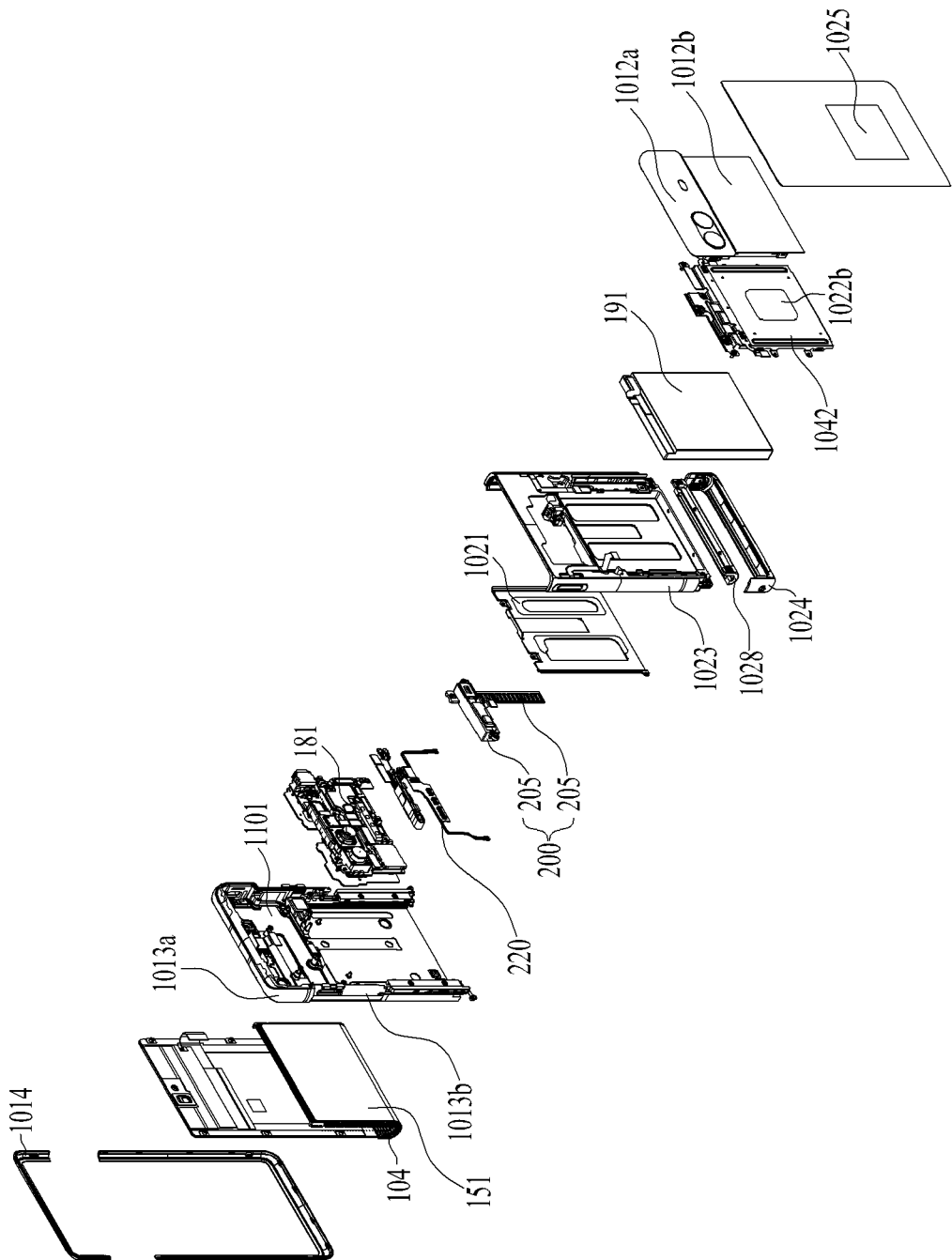
FIG. 4D is an exploded perspective view of the embodiment of FIG. 4C.

As illustrated in FIG. 4C, the battery 191 may be disposed in the second frame of the mobile terminal 100 to minimize the movement of the center of gravity when switched to the second state. FIG. 4C illustrates another embodiment of the sectional views taken along the lines A-A and B-B of FIG. 3A, and FIG. 4D is an exploded perspective view of the embodiment of FIG. 4C.

Hereinafter, each component of the mobile terminal 100 according to the embodiment will be described in more detail, with reference to FIGS. 4C and 4D.

The first frame 101 includes a first front portion 1011 located on the front of the mobile terminal 100 and coupled with the fixed part 151*a* of the display 151, and a first rear portion 1012 located on the rear of the mobile terminal 100. The first rear portion 1012 may include a first rear surface 1012*a* that is always exposed to the outside, and a second rear surface 1012*b* that is exposed to the outside only in the expanded state. The second rear surface 1012*b*, as illustrated in FIG. 3, is not exposed to the outside in the first state by being covered with the rear cover 1025 of the second frame 102, and exposed to the outside in the second state.

The second frame 102 includes a second front portion 1021 located on the front, and a second rear portion 1022 located on the rear of the mobile terminal 100. The second front portion 1021 is located on a rear surface of the first front portion 1011 in the first state, and is pulled out in the second state from the first front portion 1011 in the first direction.

The display 151 may not be fixed to the second frame 102 but may change in position on the second frame 102, in response to the sliding motion of the second frame 102. The variable part 151*b* of the display 151 is located on the rear surface and the side surfaces of the second frame in the first state of the mobile terminal 100. The variable part 151*b* located on the rear surface moves to the front surface of the second frame in the second state.

The second front portion 1021 supports the variable part 151b, which has moved to the front, in the second state. The second rear portion 1022 supports the variable part 151b, which has moved to the rear, in the first state.

The slide frame 103 that is coupled to the end portion of the display 151 to guide the sliding of the display 151 moves on the rear surface of the second rear portion 1022. The display 151 coupled to the slide frame 103 is a moving part that slides in response to the movement of the slide frame 103 and is disposed to always face the rear surface of the mobile terminal 100. Since the moving part does not move toward the front surface, it may limit an area of the front surface of the display 151, and pull the variable part 151b moved to the front surface such that the variable part 151b can be fixed in the flat state.

The second frame 102 may further include the rear cover 1025 that covers the variable part 151b located on the rear surface of the second rear portion 1022. When the end portion of the display 151, namely, the moving part is exposed to the outside, the display 151 may be likely to be damaged. The rear cover 1025 may suppress the rear surface portion of the display 151 from being exposed directly to the outside. The second rear portion 1022 may include a guide member (not illustrated) that guides the sliding of the slide frame 103 which moves on the rear surface of the second rear portion 1022. The rear cover 1025 may cover the guide member not to be exposed to the outside.

The rear cover 1025 may be made of an opaque material, and may also include a transparent material. The transparent rear cover 1025 may provide information to the user by utilizing the display 151 located on the rear surface in the first state.

For example, when the user photographs a direction, in which the user is located, using a rear camera, the user may view a preview image of the camera through the display 151 located on the rear surface. Or, when the mobile terminal 100 is placed such that the rear surface faces upward, an alarm or the like may be provided through the display 151 located on the rear surface.

However, since the second rear portion 1022 may be visually exposed through the rear cover 1025 in the second state, the rear cover 1025 may be coated (tinted) to lower transparency such that the inside is visible only when the display 151 is turned on, namely, when light is emitted from the inside.

The rear cover 1025 may extend in the second direction from a portion where it covers the rear surface part of the display, so as to cover a second rear surface 1012b of the first frame 101. As illustrated in (a) of FIG. 3B, the rear cover 1025 may cover the second rear surface 1012b as well as the first rear surface 1012a in the first state, and define appearance of the rear surface of the mobile terminal 100.

As illustrated in (b) of FIG. 3B, when switched to the second state, the second rear surface 1012b is exposed to the rear surface of the mobile terminal 100. In order for the internal components of the mobile terminal 100 not to be exposed, as illustrated in (b) of FIG. 4C, at least portions of the second rear surface 1012b and the rear cover 1025 may overlap each other even in the second state.

Referring to (a) of FIG. 4C, the second rear surface 1012b and the variable part 151b of the display may be disposed to be adjacent in the first direction without overlapping each other. When the second rear surface 1012b and the display 151 overlap each other, the second rear surface 1012b is supposed to be inserted into the mobile terminal 100 by the sum of thicknesses of the display 151, the rolling hinge 104, and the second rear portion 1022.

In this case, a mounting space inside the first frame 101 may be reduced and a great step may be formed between the first rear surface 1012a and the second rear surface 1012b. This may cause the user to feel uncomfortable when gripping the expanded mobile terminal 100.

Therefore, in the present disclosure, the display 151 and the second rear portion 1022 may be disposed up and down, and a portion externally exposed by being expanded in the second state and a portion where the display 151 is located in the first state may be separated from each other in the first direction.

An extension portion of the rear cover 1025 that covers the second rear surface 1012a in the first state covers internal components that are exposed as the second rear portion 1022 moves in the second state. The second rear surface may cover the rear surface of the first frame 101 exposed in response to the movement of the rear cover 1025. A length of the second rear surface 1012a in the first direction may be longer than or equal to a movement distance of the second frame 102.

The mobile terminal 100 according to the present disclosure may include the frames 101 and 102 in which components are mounted, and the frames 101 and 102 may vary in size in the first direction, as illustrated in FIG. 2. At least one of the frames 101 and 102 may relatively move so as to change in size in the first direction. The frames 101 and 102 has electronic components mounted inside thereof and the flexible display disposed outside.

Since the mobile terminal 100 includes the flexible display 151, the flexible display 151 may be coupled in a manner of covering the front surface and the rear surface of the frames 101 and 102. The frames may include the first frame 101 and the second frame 102 moving relative to the first frame 101 in the first direction. The first frame 101 and the second frame 102 each include a front portion, a rear portion, and side portions, which are coupled all together.

First, the first frame 101 may correspond to a main body of the mobile terminal 100, and define a space between the first front portion 1011 and the first rear surface 1012a for accommodating various components. Also, the first frame 101 may accommodate the second frame 102, which is movably coupled to the first frame 101, in the space. In more detail, the first frame 101 may include the first front portion 1011 disposed on the front of the mobile terminal 100 to support the front surface portion of the display 151, and the first rear surface 1012 disposed on the rear of the mobile terminal to mount various components thereon.

The first front portion 1011 and the first rear portion 1012 may be spaced apart from each other by a predetermined gap to define a predetermined space, and may be connected by the first side portion 1013. The first side portion 1013 may also be formed integrally with the first rear portion 1012 or the first front portion 1011. The camera 121, the audio output module 152, the input/output terminal, and the controller 180 which are components of the mobile terminal 100 may be accommodated in the inner space of the first frame 101. For example, the controller 180 may be a main substrate 181 that includes a processor and an electronic circuit for controlling operations of the mobile terminal 100.

The battery 191 as the power supply unit 190 occupies the largest region of the mobile terminal 100. As the number of components of the mobile terminal 100 increases and a usage time of the display 151 extends, the capacity of the battery 191 becomes important. Accordingly, even if other components are reduced in size, the battery 191 is getting larger. Since the weight of the battery 191 as well as the occupied space increases, the center of gravity of the mobile terminal 100 may change depending on the position of the battery 191.

As illustrated in FIG. 4C, in the embodiment of the present disclosure, the battery 191 may be disposed on the second frame 102, thereby minimizing the shift of the center of gravity when the mobile terminal 100 is expanded. When the battery 191 is mounted on the first frame 101, the center of gravity is almost similar to a sliding distance of the frames 101 and 102. However, in the embodiment of the present disclosure, the weight of the battery 191 may be distributed to the first frame 101 and the second frame 102, such that the center of gravity can be located in a middle portion in the expanded state. As illustrated in the embodiment of FIG. 4A, when the battery 191 is located in the first frame 101, the inner space of the second frame 102 becomes empty in the expanded state of the mobile terminal 100. This causes a problem of weak support force for the rear surface of the variable part 151b. The support bars of the rolling hinge 104 located on the rear surface of the variable part 151b and the second front portion 1021 can support the variable part 151b, but the support force may be limitedly applied. This may cause bending deformation when strong force is applied to the front surface.

Also, the battery 191 may be disposed between the second front portion 1021 and the second rear portion 1022 of the second frame 102 so as to support the rear surface of the variable part 151b which has moved to the front surface of the mobile terminal 100. When the battery 191 is located on the rear surface of the second front portion 1021, the variable part 151b moved to the front may be maintained in the flat state.

Referring to FIGS. 3B and 4D, the side portion of the first frame 101 may include a first side surface 1013a that is always exposed, and a second side surface 1013b that is selectively exposed. The second side portion 1023 defining the side surface of the second frame 102 covers the second side surface 1013b in the first state, and exposes the second side surface 1013b in the second state.

The second side surface 1013b may be located only in a portion which is externally exposed in the second state, and an overlap section between the second side surface 1013b and the second side portion 1023 of the second frame 102 can be minimized.

In the inner space of the second side portion 1023 which does not overlap the second side surface 1013b, guide rails 231 and 232 for guiding the sliding motion of the frames 101 and 102, auxiliary substrates 183a and 183b connected to components of the second frame 102, or the like may be disposed. The first side surface 1013a and the second side surface 1013b are located between the first front portion 1011 and the first and second rear surfaces 1012a and 1012b, to define the inner space of the first frame 101. Here, since the first side surface 1013a is always externally exposed, antennas and the like can be implemented. A SIM card tray insertion hole 162 which does not have to be always exposed may be disposed in the second side surface 1013b.

The second side portion 1023 may define a component mounting space therein together with the second front portion 1021 and the second rear portion 1022, and define appearance of the mobile terminal 100 together with the rear cover 1025. The second side portion 1023, as illustrated in FIG. 3A, may have the same height as the rear cover 1025. A front bezel 1014 that covers a front periphery of the display 151 may further be provided. The front bezel 1014 fixes the end portion of the display 151 to the first frame 101 and the second frame 102.

The front bezel 1014 may include a first bezel adjacent to the first side surface 1013a of the first frame, and a second bezel adjacent to the second side portion 1023 of the second frame. The first bezel and the second bezel may be connected in the first state as illustrated in (a) of FIG. 3A, and disconnected in the second state as illustrated in (b) of FIG. 3B.

Meanwhile, referring to FIGS. 1A and 2A, a 5G wireless communication system, that is, 5G new radio access technology (NR) may be provided. In this regard, as more communication devices demand larger communication capacities, there is a need for improved mobile broadband communication as compared to the related art radio access technology. In addition, massive MTC (Machine Type Communications), which connects a plurality of devices and objects to provide various services anytime and anywhere, is also one of major issues to be considered in next-generation communication. Furthermore, communication system design in consideration of services/terminals that are sensitive to reliability and latency is being discussed. As described above, introduction of next-generation radio access technology in consideration of enhanced mobile broadband communication (eMBB), massive MTC (mMTC), ultra-reliable and low latency communication (URLLC), and the like, is being discussed, and the relevant technology is referred to herein as NR for the sake of convenience. The NR is an expression showing an example of 5G radio access technology (RAT).

A new RAT system including the NR uses an OFDM transmission scheme or a similar transmission scheme. The new RAT system may follow OFDM parameters different from OFDM parameters of LTE. Alternatively, the new RAT system may follow the existing numerology of LTE/LTE-A as it is but have a larger system bandwidth (e.g., 100 MHz). Alternatively, a single cell may support a plurality of numerologies. In other words, terminals operating with different numerologies may coexist in a single cell.

In this regard, in the case of 4G LTE, since the maximum bandwidth of the system is limited to 20 MHz, a single sub-carrier spacing (SCS) of 15 kHz is used. However, since 5G NR supports a channel bandwidth between 5 MHz and 400 MHz, FFT processing complexity may increase to process the entire bandwidth through a single subcarrier spacing. Accordingly, the subcarrier spacing used for each frequency band may be extended and applied.

A numerology corresponds to one subcarrier spacing in the frequency domain. Different numerologies may be defined by scaling a reference subcarrier spacing with an integer N. In this regard, FIG. 5A shows an example of a frame structure in NR. FIG. 5B is a view illustrating a change in a slot length in accordance with a change in a subcarrier spacing in the NR.

An NR system may support a number of numerologies. Here, a numerology may be defined by a subcarrier spacing and a cyclic prefix overhead. Here, a plurality of subcarrier spacings may be derived by scaling a basic subcarrier spacing to an integer N (or µ). Furthermore, even when it is assumed that a very low subcarrier spacing is not used at a very high carrier frequency, the used numerology may be selected independently of the frequency band. In addition, in an NR system, various frame structures according to a number of numerologies may be supported.

Hereinafter, an Orthogonal Frequency Division Multiplexing (OFDM) numerology and frame structure that can be considered in the NR system will be described. A number of OFDM numerologies supported in the NR system may be defined as shown in Table 1 below.

TABLE 1

| m | $\Delta f = 2\mu * 15$ [kHz] | Cyclic prefix (CP) |
|---|---|---|
| 0 | 15 | Normal |
| 1 | 30 | Normal |
| 2 | 60 | Normal, Extended |
| 3 | 120 | Normal |
| 4 | 240 | Normal |

NR supports a number of numerologies (or subcarrier spacings (SCSs)) for supporting various 5G services. For example, NR supports a wide area in traditional cellular bands when the SCS is 15 kHz, and supports a dense-urban, a lower latency and a wider carrier bandwidth when the SCS is 30 kHz/60 kHz, and supports a bandwidth greater than 24.25 GHz to overcome phase noise when the SCS is 60 kHz or higher.

The NR frequency band is defined as a frequency range of two types (FR1, FR2). The FR1 is a sub-6 GHz range, and the FR2 is a range of above 6 GHz, which may denote millimeter waves (mmWs).

Table 2 below shows the definition of the NR frequency band.

TABLE 2

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

With regard to a frame structure in a NR system, the sizes of various fields in the time domain are expressed in multiples of a specific time unit. FIG. 3A illustrates an example of an SCS of 60 kHz, in which one subframe may include four slots. One subframe={1,2,4} slots shown in FIG. 3 is an example, in which the number of slot(s) that can be included in one subframe may be one, two or four. In addition, a mini-slot may include two, four, or seven symbols or may include more or fewer symbols.

Referring to FIG. 5B, a subcarrier spacing of 5G NR phase I and a length of an OFDM symbol corresponding to the spacing are shown. Each subcarrier spacing is extended by a multiplier of two, and the symbol length is inversely reduced. In FR1, subcarrier spacings of 15 kHz, 30 kHz, and 60 kHz are available, depending on the frequency band/bandwidth. In FR2, 60 kHz and 120 kHz may be used for data channels, and 240 kHz may be used for synchronization signals.

In 5G NR, a basic unit of scheduling may be defined as a slot, and the number of OFDM symbols included in a single slot may be limited to 14 as shown in FIG. 3A or 3B regardless of the subcarrier spacing. Referring to FIG. 3A, when a wide subcarrier spacing is used, the length of one slot may decrease in inverse proportion to the subcarrier spacing, thereby reducing transmission delay in a wireless section. In addition, in order to efficiently support ultra-reliable low latency communication (uRLLC), mini-slot (e.g., 2, 4, 7 symbols) unit scheduling may be supported, as described above, in addition to slot-based scheduling.

In consideration of the foregoing technical features, slots in 5G NR described herein may be provided at the same interval as those in 4G LTE or may be provided with slots of various sizes. For an example, in 5G NR, the slot interval may be configured to be 0.5 ms equal to that of 4G LTE. For another example, the slot interval in 5G NR may be configured to be 0.25 ms, which is a narrower interval than that of 4G LTE.

In this regard, the 4G communication system and the 5G communication system may be referred to as a first communication system and a second communication system, respectively. Accordingly, a first signal (first information) of the first communication system may be a signal (information) in a 5G NR frame having a slot interval that is scalable to 0.25 ms, 0.5 ms, and the like. On the contrary, a second signal (second information) of the second communication system may be a signal (information) in a 4G LTE frame having a fixed slot interval of 0.5 ms.

Meanwhile, the first signal of the first communication system may be transmitted and/or received through a maximum bandwidth of 20 MHz. On the contrary, the second signal of the second communication system may be transmitted and/or received through a variable channel bandwidth of 5 MHz to 400 MHz. In this regard, the first signal of the first communication system may be FFT-processed at a single sub-carrier spacing (SCS) of 15 kHz.

On the other hand, the second signal of the second communication system may be FFT-processed at subcarrier spacings of 15 kHz, 30 kHz, and 60 kHz according to the frequency band/bandwidth. In this case, the second signal of the second communication system may be modulated and frequency-converted into a FR1 band and transmitted through a 5G Sub-6 antenna. Meanwhile, the FR1 band signal received through the 5G Sub-6 antenna may be frequency-converted and demodulated. Then, the second signal of the second communication system may be IFFT-processed at subcarrier spacings of 15 kHz, 30 kHz, and 60 kHz according to the frequency band/bandwidth.

On the other hand, the second signal of the second communication system may be FFT-processed at spacings of 60 kHz, 120 kHz, and 240 kHz according to the frequency band/bandwidth and data/synchronous channel. In this case, the second signal of the second communication system may be modulated in a FR2 band and transmitted through a 5G mmWave antenna. Meanwhile, the FR2 band signal received through the 5G mmWave antenna may be frequency-converted and demodulated. Then, the second signal of the second communication system may be IFFT-processed through subcarrier spacings of 60 kHz, 120 kHz, and 240 kHz according to the frequency band/bandwidth and data/synchronous channel.

In 5G NR, symbol-level time alignment may be used for transmission schemes using various slot lengths, mini-slots, and different subcarrier spacings. Accordingly, the present disclosure provides flexibility to efficiently multiplex various communication services such as enhancement mobile broadband (eMBB) and ultra-reliable low latency communication (uRLLC) in the time domain and the frequency domain. In addition, unlike 4G LTE, 5G NR may define uplink/downlink resource allocation at a symbol level within a single slot as shown in FIG. 3. In order to reduce a hybrid automatic repeat request (HARQ) delay, a slot structure capable of directly transmitting HARQ ACK/NACK in a transmission slot may be defined. This slot structure may be referred to as a self-contained structure.

Unlike 4G LTE, 5G NR may support a common frame structure constituting an FDD or TDD frame through a combination of various slots. Accordingly, a dynamic TDD scheme may be adopted to freely dynamically adjust the transmission direction of individual cells according to traffic characteristics.

On the other hand, a detailed operation and function of the electronic device having a plurality of antennas according to an embodiment provided with a multi-transceiving system as shown in FIG. 2B will be discussed below.

Figure 6A:
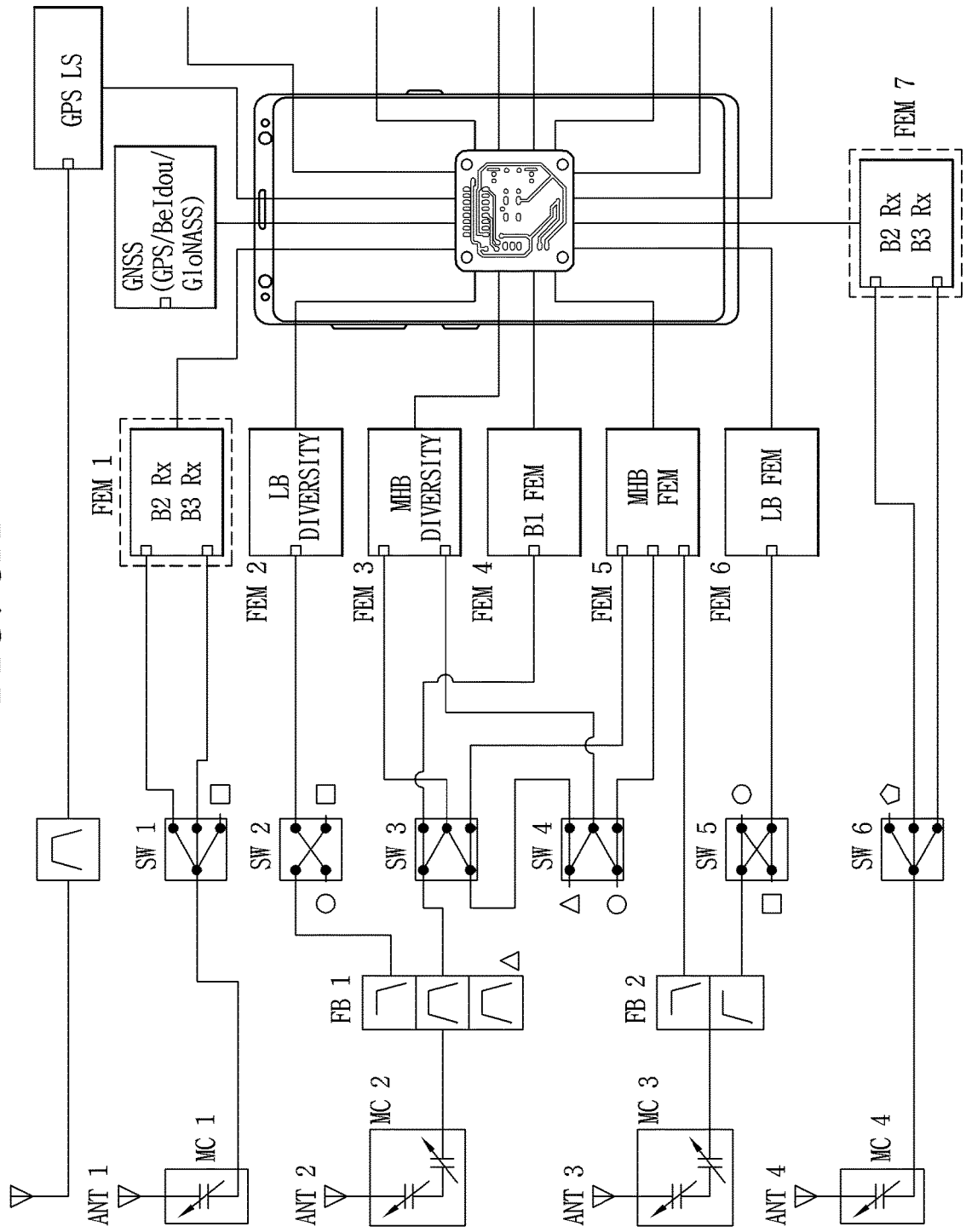
FIG. 6A is a view illustrating a configuration in which a plurality of antennas and transceiver circuits according to an embodiment are operably coupled to a processor.
Figure 6B:
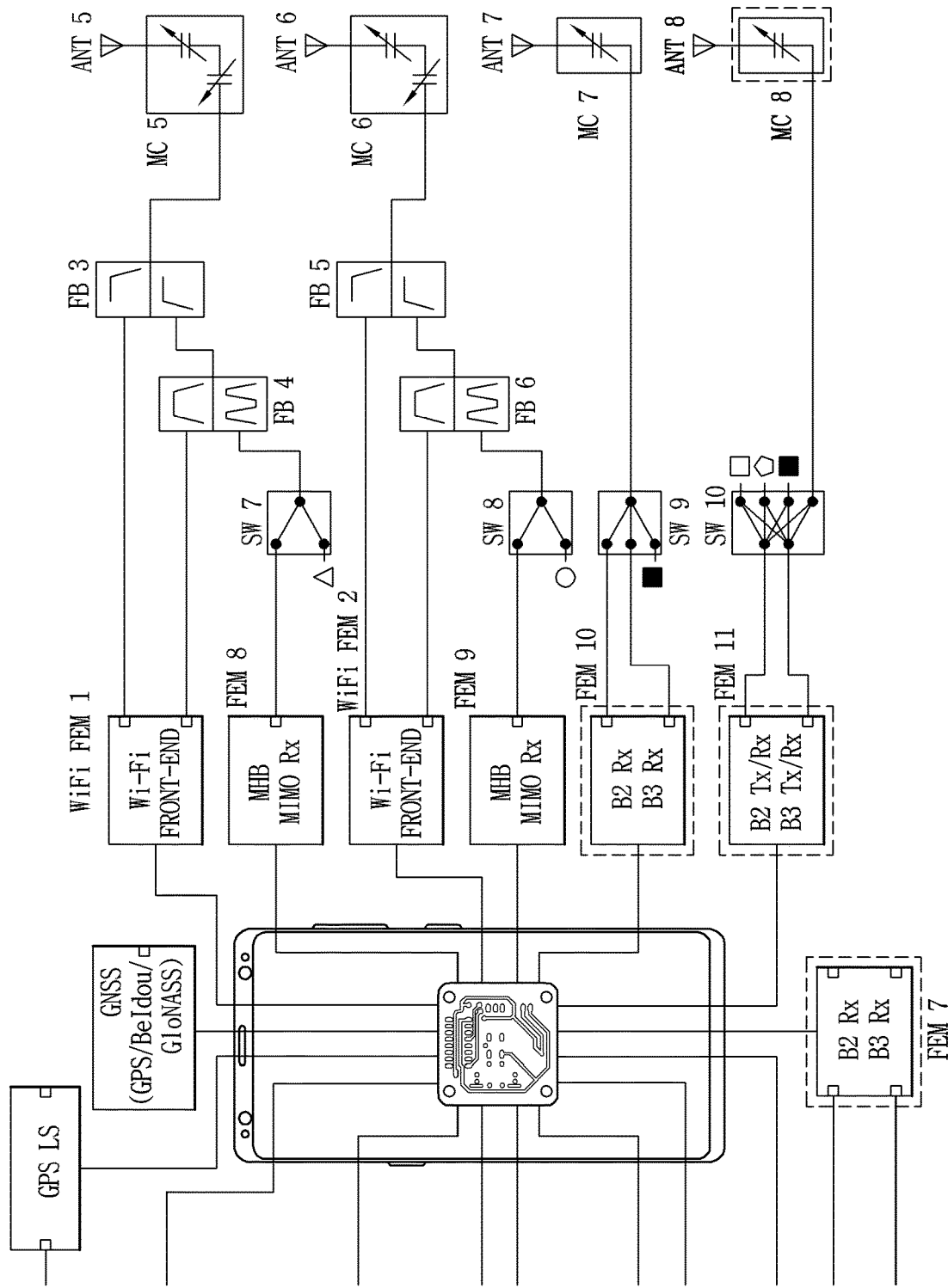
FIG. 6B is a configuration diagram in which antennas and transceiver circuits are additionally coupled to a processor in an operable manner in the configuration diagram in FIG. 6A.

In a 5G communication system according to an embodiment, the 5G frequency band may be a Sub-6 band. In this regard, FIG. 6A is a configuration diagram in which a plurality of antennas and transceiver circuits according to an embodiment are coupled to a processor in an operable manner. FIG. 6B is a view illustrating a configuration in which antennas and transceiver circuits are additionally operably coupled to a processor in the configuration of FIG. 6A.

Referring to FIGS. 6A and 6B, the electronic device may include a plurality of antennas ANT1 to ANT4 and front end modules FEM1 to FEM7 operating in a 4G band and/or a 5G band. In this regard, a plurality of switches SW1 to SW6 may be arranged between the plurality of antennas ANT1 to ANT4 and the front end modules FEM1 to FEM7.

Referring to FIGS. 6A and 6B, the electronic device may include a plurality of antennas ANT5 to ANT8 and front end modules FEM8 to FEM11 operating in a 4G band and/or a 5G band. In this regard, a plurality of switches SW7 to SW10 may be arranged between the plurality of antennas ANT1 to ANT4 and the front end modules FEM8 to FEM11.

Meanwhile, a plurality of signals that can be branched through the plurality of antennas ANT1 to ANT8 may be transmitted to the input of the front-end modules FEM1 to FEM11 or to the plurality of switches SW1 to SW10 through one or more filters.

For an example, the first antenna ANT1 may be configured to receive signals in a 5G band. In this case, the first antenna ANT1 may be configured to receive a second signal of a second band B2 and a third signal of a third band B3. Here, the second band B2 may be an n77 band and the third band B3 may be an n79 band, but the present disclosure is not limited thereto. The second band B2 and the third band B3 may be changed according to an application. Meanwhile, the first antenna ANT1 may also operate as a transmitting antenna as well as a receiving antenna.

In this regard, the first switch SW1 may be configured as an SP2T switch or an SP3T switch. When implemented as an SP3T switch, one output port may be used as a test port. The first and second output ports of the first switch SW1 may be connected to the inputs of the first front-end module FEM1.

In one example, the second antenna ANT2 may be configured to transmit and/or receive signals in a 4G band and/or a 5G band. In this case, the second antenna ANT2 may be configured to transmit/receive a first signal of a first band B1. Here, the first band B1 may be an n41 band, but the present disclosure is not limited thereto, and the first band B1 may be changed according to an application.

Meanwhile, the second antenna ANT2 may operate in a low band LB. In addition, the second antenna ANT2 may be configured to operate in a mid band MB and/or a high band HB. Here, the middle band MB and high band HB may be referred to as MHB.

A first output of the first filter bank FB1 connected to the second antenna ANT2 may be connected to the second switch SW2. Meanwhile, an second output of the first filter bank (FB1) connected to the second antenna (ANT2) may be connected to the third switch (SW3). Furthermore, a third output of the first filter bank FB1 connected to the second antenna ANT2 may be connected to the fourth switch SW4.

Accordingly, an output of the second switch SW2 may be connected to an input of the second front-end module FEM2 operating in the low band LB. Meanwhile, a second output of the third switch SW3 may be connected to an input of the third front-end module FEM3 operating in the MHB band. In addition, a first output of the third switch SW3 may be connected to an input of a fourth front-end module FEM4 operating in a first 5G band B1. Furthermore, a third output of the third switch SW3 may be connected to an input of the fifth front-end module FEM5 operating in the MHB band operating in the first 5G band B1.

In this regard, a first output of the fourth switch SW4 may be connected to an input of the third switch SW3. Meanwhile, a second output of the fourth switch SW4 may be connected to an input of the third front-end module FEM3. In addition, a third output of the fourth switch SW4 may be connected to an input of the fifth front-end module FEM5.

For an example, the third antenna ANT3 may be configured to transmit and/or receive signals in the LB band and/or the MHB band. In this regard, a first output of the second filter bank FB2 connected to the second antenna ANT2 may be connected to an input of the fifth front-end module FEM5 operating in the MHB band. Meanwhile, a second output of the second filter bank FB2 connected to the second antenna ANT2 may be connected to the fifth switch SW5.

In this regard, an output of the fifth switch SW5 may be connected to an input of the sixth front end module FEM6 operating in the LB band.

For an example, the fourth antenna ANT4 may be configured to transmit and/or receive a signal in a 5G band. In this regard, the fourth antenna ANT4 may be configured such that the second band B2 that is a transmission band and the third band B3 that is a reception band are frequency-division multiplexed (FDM). Here, the second band B2 may be an n77 band and the third band B3 may be an n79 band, but the present disclosure is not limited thereto. The second band B2 and the third band B3 may be changed according to an application.

In this regard, the fourth antenna ANT4 may be connected to the sixth switch SW6, and one of the outputs of the sixth switch SW6 may be connected to a reception port of the seventh front-end module FEM7. Meanwhile, another one of the outputs of the sixth switch SW6 may be connected to the transmission port of the seventh front-end module FEM7.

For an example, the fifth antenna ANT5 may be configured to transmit and/or receive signals in a WiFi band. Furthermore, the sixth antenna ANT5 may be configured to transmit and/or receive signals in the MHB band.

In this regard, the fifth antenna ANT5 may be connected to the third filter bank FB3, and a first output of the third filter bank FB3 may be connected to a first WiFi module (WiFi FEM1). On the other hand, a second output of the third filter bank FB3 may be connected to a fourth filter bank FB4. In addition, a first output of the fourth filter bank FB4 may be connected to the first WiFi module (WiFi FEM1). Meanwhile, a second output of the fourth filter bank FB4 may be connected to the eighth front-end module FEM8 operating in the MHB band through the seventh switch SW7. Therefore, the sixth antenna ANT5 may be configured to receive the WiFi band and 4G/5G band signals.

Similarly, the sixth antenna ANT6 may be configured to transmit and/or receive signals in a WiFi band. Furthermore, the sixth antenna ANT6 may be configured to transmit and/or receive signals in the MHB band.

In this regard, the sixth antenna ANT6 may be connected to a fifth filter bank FB5, and a first output of the fifth filter bank FB5 may be connected to a second WiFi module (WiFi FEM2). On the other hand, a second output of the fifth filter bank FB5 may be connected to a sixth filter bank FB6. In addition, a first output of the sixth filter bank FB6 may be connected to a second WiFi module (WiFi FEM2). A second output of the sixth filter bank FB6 may be connected to the ninth front-end module FEM9 operating in the MHB band through the eighth switch SW8. Therefore, the sixth antenna ANT6 may be configured to receive the WiFi band and 4G/5G band signals.

Referring to FIGS. 3B, 6A, and 6B, the baseband processor 1400 may control antennas and the transceiver circuit 1250 to perform multi-input and multi-output (MIMO) or diversity in the MHB band. In this regard, the second antenna ANT2 and the third antenna ANT3 adjacent thereto may be used in a diversity mode for transmitting and/or receiving the same information as a first signal and a second signal. On the contrary, antennas disposed on different side surfaces may be used in the MIMO mode in which first information is included in the first signal and second information is included in the second signal. For an example, the baseband processor 1400 may perform MIMO through the second antenna ANT2 and the fifth antenna ANT5. In another example, the baseband processor 1400 may perform MIMO through the second antenna ANT2 and the sixth antenna ANT6.

For an example, the seventh antenna ANT7 may be configured to receive signals in a 5G band. In this case, the seventh antenna ANT7 may be configured to receive a third signal of a second band B2 and a third signal of a third band B3. Here, the second band B2 may be an n77 band and the third band B3 may be an n79 band, but the present disclosure is not limited thereto. The second band B2 and the third band B3 may be changed according to an application. Meanwhile, the seventh antenna ANT7 may also operate as a transmitting antenna as well as a receiving antenna.

In this regard, the ninth switch SW9 may be configured as an SP2T switch or an SP3T switch. When implemented as an SP3T switch, one output port may be used as a test port. On the other hand, the first and second output ports of the ninth switch SW9 may be connected to the inputs of the tenth front-end module FEM10.

For an example, the eighth antenna ANT8 may be configured to transmit and/or receive signals in the 4G band and/or the 5G band. In this case, the eighth antenna ANT8 may be configured to transmit/receive a signal of the second band B2. In addition, the eighth antenna ANT8 may be configured to transmit/receive a signal of the third band B3. Here, the second band B2 may be an n77 band and the third band B3 may be an n79 band, but the present disclosure is not limited thereto. The second band B2 and the third band B3 may be changed according to an application. In this regard, the eighth antenna ANT8 may be connected to the eleventh front-end module FEM11 through the tenth switch SW10.

Meanwhile, the antennas ANT1 to ANT8 may be connected to impedance matching circuits MC1 to MC8 to operate in a plurality of bands. In this regard, when operating in adjacent bands such as the first antenna ANT1, the fourth antenna ANT4, the seventh antenna ANT7 and the eighth antenna ANT8, only one variable element may be used. In this case, the variable element may be a variable capacitor that varies a capacitance by varying a voltage.

On the contrary, when operating in spaced bands such as the second antenna ANT2, the third antenna ANT3, the fifth antenna ANT5, and the sixth antenna ANT6, only two or more variable elements may be used. In this case, two or more variable elements may be two or more variable capacitors or a combination of a variable inductor and a variable capacitor.

Referring to FIGS. 2B, 6A, and 6B, the baseband processor 1400 may perform MIMO through at least one of the second band B2 and the third band B3 in a 5G band. In this regard, the baseband processor 1400 may perform MIMO through at least two of the first antenna ANT1, the fourth antenna ANT4, the seventh antenna ANT7, and the eighth antenna ANT8 in the second band B2. On the other hand, the baseband processor 1400 may perform MIMO through at least two of the first antenna ANT1, the fourth antenna ANT4, the seventh antenna ANT7, and the eighth antenna ANT8 in the third band B3. Therefore, the baseband processor 1400 may control the plurality of antennas and the transceiver circuit 1250 to support MIMO up to 4RX as well as 2RX in the 5G band.

Figure 7A:
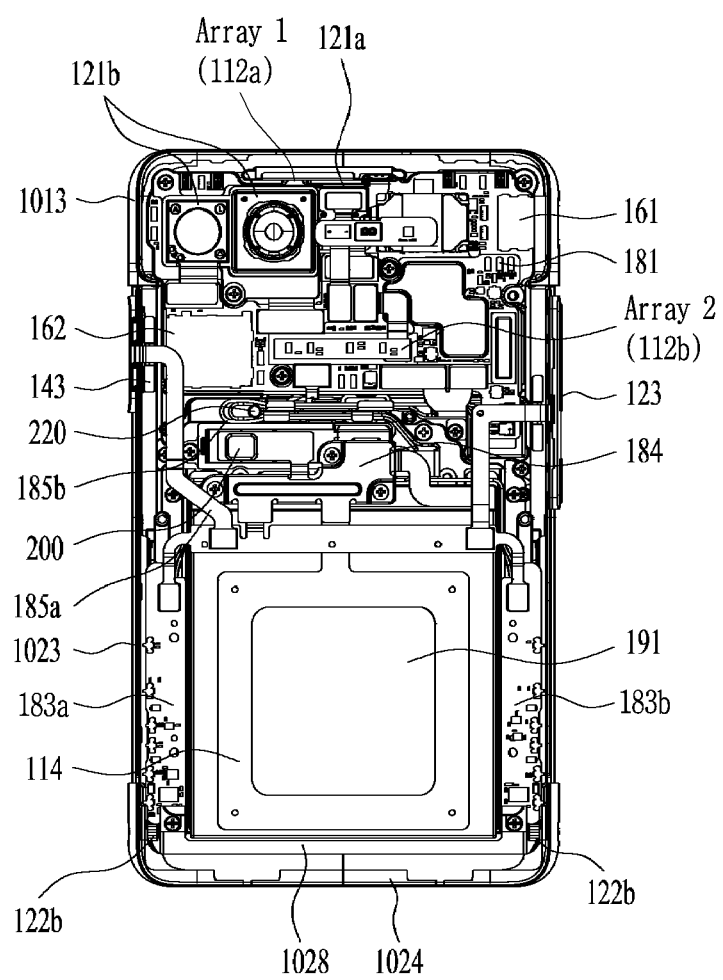
FIGS. 7A and 7B are views illustrating internal components in a first state and a second state of the mobile terminal 100.
Figure 7B:
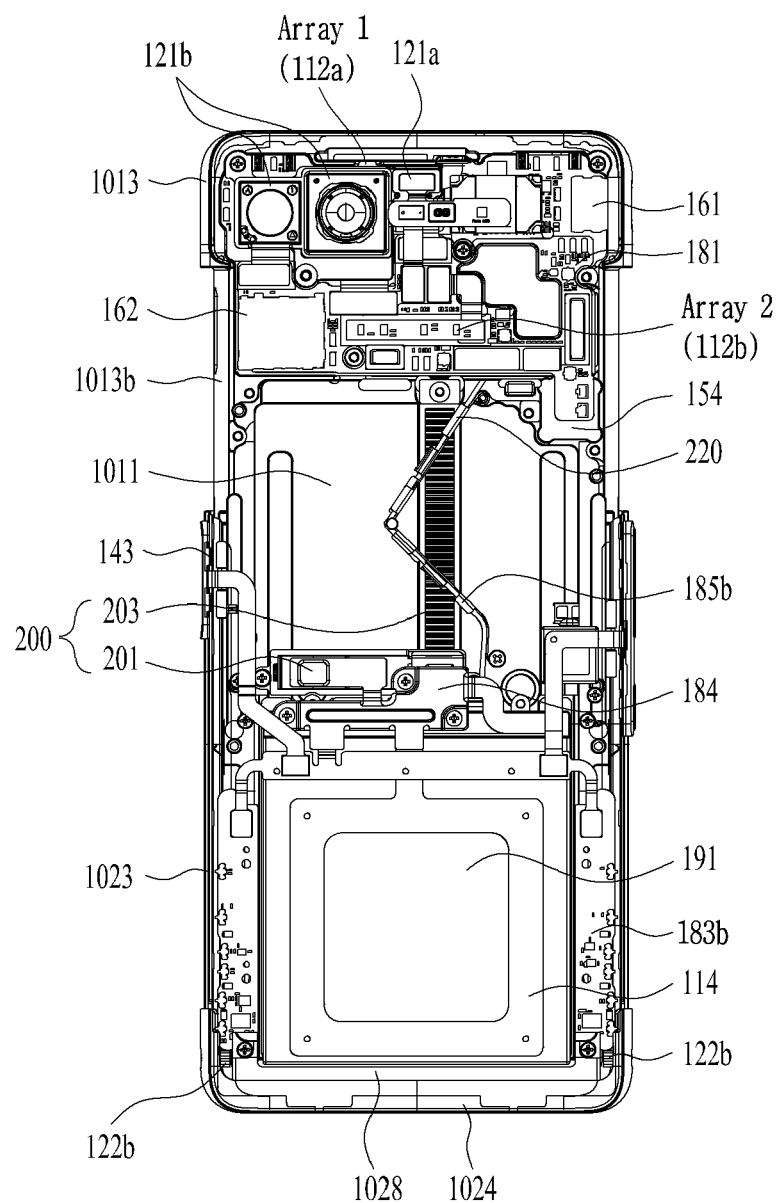

FIGS. 7A and 7B are views illustrating internal components in the first state and the second state of the mobile terminal 100. FIGS. 7A and 7B illustrate the internal components by removing the rear portions 1012 and 1022 and the rear cover 125 covering the display 151 and the rear surface of the mobile terminal 100. FIG. 7A shows the first state and FIG. 7B shows the second state. The main substrate 181, the battery 191, cameras 121a and 121b, the vibration module 154, the microphone 122a, the audio output module 152, the rack gear 203 of the driving unit 200, and the like are mounted on the first frame 101. The battery 191, the user input unit, the coil antenna 114, the mobile communication antenna 112, the microphone 122b, and the motor 201 and a pinion gear (not shown) of the driving unit 200 may be mounted on the second frame 102.

The main substrate 181 may be located on the first frame 101, and the cameras 121a and 121b, the vibration module 154, and the interface units 161 and 162 may be mounted on the main substrate 181. The cameras may include a main camera 121b facing the rear surface of the mobile terminal 100, and a camera 121a facing the front surface of the mobile terminal 100. To dispose the front camera 121a, an area that is partially deactivated may be included in the upper end of the display 151. Meanwhile, antennas 112a and 112b and the like may be disposed on the main substrate 181 or a separate substrate.

A cable terminal 161 for charging or data transmission may be located on the first side surface 1013a to be used even in the first state of the mobile terminal 100. A card mounting unit 162 for mounting a USIM or memory card is not usually used, and thus may be disposed adjacent to the second side surface 1013b which is open only in the second state.

A plurality of mobile communication antennas may be implemented using the first side surface 1013a. Meanwhile, array antennas 112a and 112b for mmWave signals may be disposed in different regions of the mobile terminal 100. The array antennas 112a and 112b may be disposed to face the upper end and the rear surface of the mobile terminal, respectively. Accordingly, beams may be radiated from the array antennas 112a and 112b toward the upper portion and the rear surface of the mobile terminal, respectively.

The driving unit 200 which applies sliding force between the first frame 101 and the second frame 102 includes a driving motor 201, a pinion gear (not shown) that rotates by rotational force supplied from the driving motor 201, and a rack gear 203 engaged with the pinion gear to perform a linear motion. The driving motor 201 and the rack gear 203 may be coupled to different frames. The driving motor 201 according to the embodiment may be located on the second frame 102 and the rack gear 203 on the pinion gear, but they may be disposed in an opposite way.

However, since the user grips the second frame 102, the driving motor 201 may be more stably driven when it is located in the second frame 102 than when located in the first frame 101.

The driving unit 200 may be located above the battery 191 to minimize the length of the short rack gear 203 and enable a stable sliding motion. Since the driving unit 200 located above the battery 191 guides the sliding motion at a central portion of the mobile terminal 100 in the first direction, driving force can be stably transferred without being biased to one side.

The rack gear 203, referring to FIG. 7B, is also located adjacent to the central portion of the mobile terminal 100 in the third direction, so as to enable the stable sliding motion of the frames 101 and 102 without being inclined when the frames 101 and 102 slide.

The rack gear 203 of the driving unit 200 may be disposed on the rear surface of the first front portion 1011 to face the rear surface of the mobile terminal 100. The second frame 102 may include a slot that is formed in the first front portion 1011 to extend in the first direction to a position corresponding to the rack gear 203. Thus, the rack gear 203 can be located in the slot in the first state. The rack gear 203 may overlap the battery 191, which is mounted to the second frame 102, in the first state. In the second state, the rack gear 203 may move in the second direction along the first frame 101 and extend to be located in an empty space.

In the embodiment of the present disclosure, the components are dispersively mounted in the first frame 101 and the second frame 102, which is advantageous in that the center of gravity is stable and the battery 191 supports the variable part 151*b* of the display. However, there is a need of a signal connection part 185*b* for connecting the component mounted in the first frame 101 and the component mounted in the second frame 102. The signal connection part 185*b* may include an electrical signal and power source of the battery 191, and may be made of a material that is deformable in response to the movement of the frames.

The signal connection part 185*b* may be constituted by using a flexible printed circuit board (FPCB) or a coaxial cable. Since antenna signals cause noise when affected by external impact, a coated coaxial cable may be used.

The signal connection part 185*b* may be bent between the first frame 101 and the second frame 102. When the FPCB or coaxial cable is bent in a thickness direction of the mobile terminal 100 in the first state, a curvature of a bent portion may be small. Also, when a position of the bent portion changes in response to the movement of the frame, it may cause a problem in view of durability.

Therefore, the signal connection part 185*b* according to the present disclosure may be disposed to be overlaid in the first direction of the mobile terminal 100 in the first state, and the bent portion of the signal connection part may become open in the second state and a bent angle of the bent portion may change.

Meanwhile, the electronic device of FIGS. 7A and 7B may be a terminal that changes in size as any one frame moves relative to another frame in different directions. The electronic device may be switched to an expanded state (first state) that the size thereof increases, and a retracted/reduced state (second state) that the size decreases/is reduced. In the expanded state (first state) of the electronic device, a specific module may be externally exposed or the display may extend. For example, in the expanded state (first state), a partial region of the display may be externally exposed.

In this regard, the display may include a first region 151*a* that is exposed to the front surface in the retracted state, and a second region 151*b* that is an expanded region exposed to the front surface in the expanded state. Specifically, the display 151 includes a fixed part 151*a* that is fixed to the front surface of the first frame 101 and always located on the front surface of the mobile terminal 100 regardless of the state of the mobile terminal 100. The display 151 further includes a variable part 151*b* that is located on the front surface or the rear surface depending on whether or not the mobile terminal 100 is expanded. The fixed part 151*a* and the variable part 151*b* may be referred to as the first region 151*a* and the second region 151*b*, respectively.

In the retracted/reduced state (second state), the first region 151*a* corresponding to the fixed part 151*a* may be exposed to the front surface of the rollable device. Accordingly, a mode in which the first region 151*a* is exposed to the front surface of the rollable device may be referred to as a first mode (basic mode). Also, in the expanded state (first state), the first region 151*a* and the second region 151*b* corresponding to the fixed part 151*a* and the variable part 151*b* may be exposed to the front surface of the rollable device. Accordingly, a mode in which the first region 151*a* and the second region 151*b* are exposed to the front surface of the rollable device may be referred to as a second mode (expansion mode).

Hereinafter, detailed operations and functions of the mobile terminal (electronic device), which has a plurality of antennas and changes in size, according to an embodiment provided with a multi-transceiving system as illustrated in FIGS. 2B, 6A, and 6B will be described.

Figure 8A:
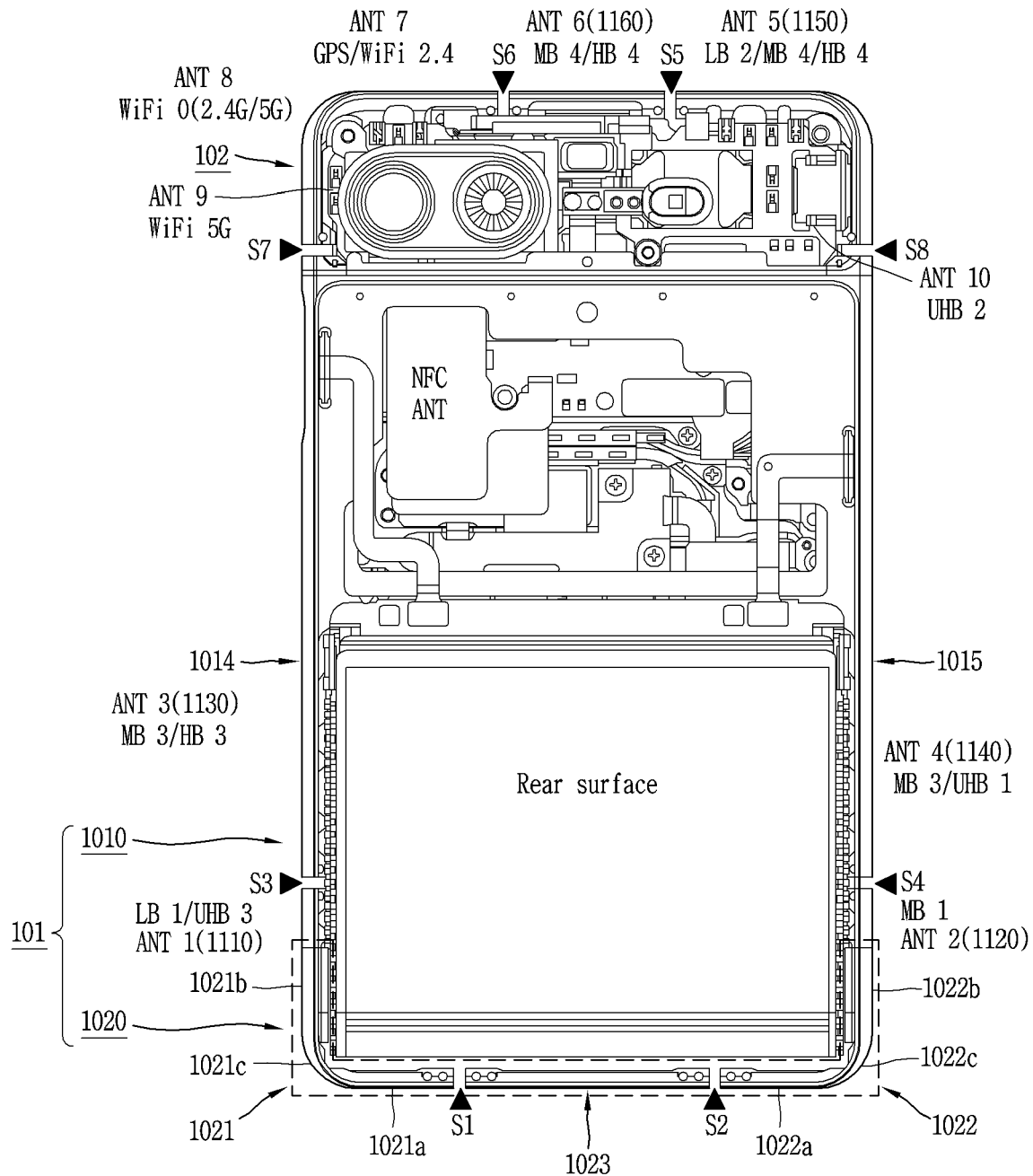
FIG. 8A illustrates a structure in which a plurality of antennas are disposed on metal rims of an electronic device.
Figure 8B:
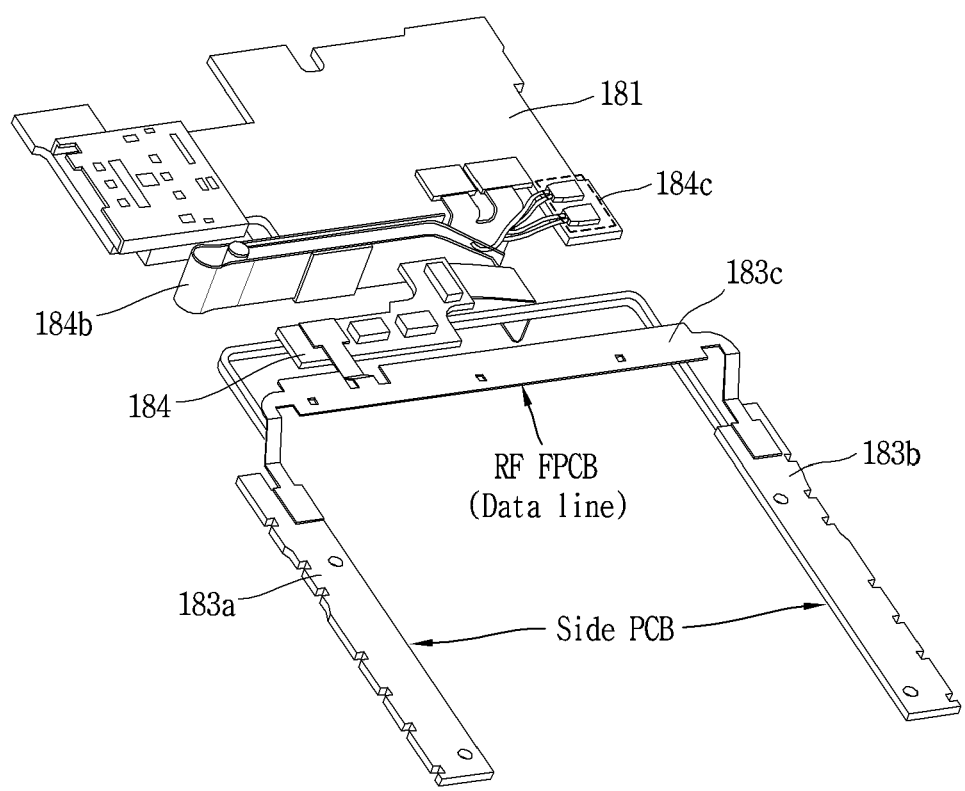
FIG. 8B illustrates a configuration in which side PCBs disclosed in the present disclosure are connected to a main PCB through an FPCB and an auxiliary PCB.

In this regard, FIG. 8A illustrates a structure in which a plurality of antennas are disposed on metal rims of an electronic device. Specifically, FIG. 8A shows a structure in which a plurality of LTE/5G Sub6 antennas and WiFi antennas are disposed on the metal rims of the electronic device. A plurality of mmWave antenna modules (see FIGS. 7A and 7B) may be disposed inside the electronic device. FIG. 8B illustrates a configuration in which side PCBs disclosed in the present disclosure are connected to a main PCB through an FPCB and an auxiliary PCB.

Referring to FIGS. 7A and 8A, the mode in which the first region 151*a* is exposed to the front surface of the rollable device may be referred to as a closed state because the first frame 101 is coupled to the second frame 102 in the first mode (basic mode). Referring to FIGS. 7B and 8A, the mode in which the first region 151*a* and the second region 151*b* are exposed to the front surface of the rollable device may be referred to as an open state because the first frame 101 is spaced apart from the second frame 102 by a predetermined distance in the second mode (expansion mode).

A plurality of antennas include a first antenna ANT1 and a second antenna ANT2 disposed on the bottom (lower portion) of the mobile terminal. In this regard, the first antenna ANT1 and the second antenna ANT2 are not limited to being disposed on the bottom. For example, antennas disposed on the top (upper portion) of the electronic device may alternatively be referred to as the first antenna ANT1 and the second antenna ANT2. Therefore, the first antenna ANT1 and the second antenna ANT2 may be referred to as low side antennas. The first antenna ANT1 and the second antenna ANT2 may be disposed on one side and another side of the second metal housing 1020, respectively. Also, partial regions of the first antenna ANT1 and the second antenna ANT2 may be disposed on one side and another side of the first metal housing 1010, respectively.

The plurality of antennas may include a third antenna (ANT1) 1110 and a fourth antenna (ANT2) 1120 disposed on the side surfaces of the mobile terminal. Also, the plurality of antennas may further include a third antenna (ANT3) 1130 and a fourth antenna (ANT4) 1140 disposed on the side surfaces of the mobile terminal. Therefore, the first antenna ANT1 to the fourth antenna ANT4 may also be referred to as lower side antennas.

Also, the plurality of antennas further include a fifth antenna ANT5 to an eighth antenna ANT8 disposed on the top of the mobile terminal. Therefore, the fifth antenna ANT5 to the eighth antenna ANT8 may also be referred to as upper side antennas. Also, the plurality of antennas further include a ninth antenna ANT5 to a tenth antenna ANT10 disposed inside the mobile terminal.

The first antenna ANT1 may be configured to operate in a low band (LB) and an ultra-high band (UHB) of the LTE/5G band. The second antenna ANT2 may be configured to operate in a mid-band (MB) and a high band (HB) of the LTE/5G band. Therefore, the first antenna ANT1 may be configured to transmit and/or receive at least one of LB and UHB signals of the LTE/5G band. The second antenna ANT2 may be configured to transmit and/or receive at least one of MB and HB signals.

The third antenna ANT3 may be configured to operate in MB and HB of the LTE/5G band. The fourth antenna ANT4 may be configured to operate in HB and UHB of the LTE/5G band. Therefore, the third antenna ANT3 may be configured to transmit and/or receive at least one of MB and HB signals of the LTE/5G band. The fourth antenna ANT4 may be configured to transmit and/or receive at least one of HB and UHB signals of the LTE/5G band. Therefore, MIMO operation may be performed by using two or more of the first antenna (ANT1) 1110 to the fourth antenna (ANT4) 1140 disposed on the bottom and the side surfaces of the mobile terminal. On the other hand, carrier aggregation (CA) operation may be performed by using at least one of the first antenna (ANT1) 1110 to the fourth antenna (Ant4) 1140 disposed on the bottom and the side surfaces of the mobile terminal. Also, MIMO+CA operation may be performed by using two or more of the first antenna (ANT1) 1110 to the fourth antenna (Ant4) 1140 disposed on the bottom and the side surfaces of the mobile terminal.

The fifth antenna ANT5 may be configured to operate in LB, MB, and HB of the LTE/5G band. The sixth antenna ANT6 may be configured to operate in MB and HB of the LTE/5G band. Therefore, the fifth antenna ANT5 may be configured to transmit and/or receive at least one of LB, MB, and HB signals of the LTE/5G band. The sixth antenna ANT6 may be configured to transmit and/or receive at least one of MB and HB signals of the LTE/5G band. Therefore, MIMO operation may be performed by using the fifth antenna (ANT5) 1150 and the sixth antenna (ANT6) 1160 disposed on the top and the side surfaces of the mobile terminal. On the other hand, CA operation may be performed by using at least one of the fifth antenna (ANT5) 1150 and the sixth antenna (ANT6) 1160 disposed on the top and the side surfaces of the mobile terminal. Therefore, MIMO+CA operation may be performed by using the fifth antenna (ANT5) 1150 and the sixth antenna (ANT6) 1160 disposed on the top and the side surfaces of the mobile terminal.

In another embodiment, MIMO operation may be performed by using two or more of the first antenna (ANT1) 1110 to the sixth antenna (ANT6) 1160 disposed on different regions (top, bottom, side surfaces) of the mobile terminal. On the other hand, CA operation may be performed by using at least one of the first antenna (ANT1) 1110 to the sixth antenna (ANT6) 1160 disposed on the bottom and the side surfaces of the mobile terminal. Also, MIMO+CA operation may be performed by using two or more of the first antenna (ANT1) 1110 to the sixth antenna (ANT6) 1160 disposed on the bottom and the side surfaces of the mobile terminal.

On the other hand, the seventh antenna ANT7 may operate as a GPS/WiFi antenna. The eighth antenna ANT8 may be configured to operate in a WiFi band. Specifically, the eighth antenna ANT8 may be configured to operate in WiFi bands of a first band and a second band. In this regard, the first band and the second band may be 2.4 GHz and 5 GHz bands, respectively, but are not limited thereto, and may be different WiFi bands. WiFi MIMO operation may be performed in the first band using the seventh antenna ANT7 and the eighth antenna ANT8.

The ninth antenna ANT9 disposed inside the mobile terminal may be configured to operate in a WiFi band. Specifically, the ninth antenna ANT9 may be configured to operate in a WiFi band of the second band. WiFi MIMO operation may be performed in the second band using the eighth antenna ANT8 and the ninth antenna ANT9.

On the other hand, the tenth antenna ANT10 disposed inside the mobile terminal may be configured to operate in UHB of the LTE/5G band. The eleventh antenna ANT11 disposed inside the mobile terminal may be configured to operate in UHB of the LTE/5G band. Therefore, the tenth antenna ANT10 may be configured to transmit and/or receive at least one of UHB signals of the LTE/5G band. An eleventh antenna ANT11 may be configured to operate in UHB of the LTE/5G band.

Therefore, MIMO operation may perform using two or more of the first antenna (ANT1) 1110, the fourth antenna (ANT4) 1140, the tenth antenna ANT10, and the eleventh antenna ANT11 that operate in UHB. Therefore, CA operation may perform using at least one of the first antenna (ANT1) 1110, the fourth antenna (ANT4) 1140, the tenth antenna ANT10, and the eleventh antenna ANT11 that operate in UHB. Also, MIMO+CA operation may perform using two or more of the first antenna (ANT1) 1110, the fourth antenna (ANT4) 1140, the tenth antenna ANT10, and the eleventh antenna ANT11 that operate in UHB.

Referring to FIGS. 7A, 7B, and 8A, the plurality of mmWave band antenna modules may be disposed on the side surfaces of the mobile terminal and/or inside the mobile terminal. The plurality of mmWave band antenna modules may include a first array antenna (ARRAY1) 112a and a second array antenna (ARRAY2) 112b. The first array antenna (ARRAY1) 112a and the second array antenna (ARRAY2) 112b may be disposed on a side surface of the electronic device and inside the electronic device, such that antenna elements can be disposed to radiate signals toward the side surface and the rear surface. For example, the first array antenna (ARRAY1) 112a and the second array antenna (ARRAY2) 112b may be disposed on an upper side surface of the electronic device and inside the electronic device, respectively, to radiate signals toward the upper side surface and the rear surface.

In the first array antenna (ARRAY1) 112a and the second array antenna (ARRAY2) 112b, the plurality of antenna elements may be spaced at predetermined distances. Beamforming may be performed by controlling phases of signals applied to the respective antenna elements arranged at the predetermined distances. An optimal antenna may be selected from the first array antenna (ARRAY1) 112a and the second array antenna (ARRAY2) 112b, and beamforming may be performed through the selected array antenna. As another embodiment, MIMO or diversity may be performed using both the first array antenna (ARRAY1) 112 and the second array antenna (ARRAY2) 112b.

In this regard, electronic devices may be configured to provide 5G communication services in various frequency bands. Recently, attempts have been made to provide 5G communication services using a Sub6 band that is a band of 6 GHz or less. In the future, however, it is also expected to provide 5G communication services by using a millimeter-wave (mmWave) band in addition to the Sub6 band for a faster data rate. Meanwhile, electronic devices supporting 4G and 5G communication services may be provided in various form factors. As an example of the form factors for the electronic device, a rollable device may be considered. In the rollable device which changes in size, wireless performance deviation may occur between a retracted state (first state) and an expanded state (second state).

Therefore, the present disclosure proposes a plurality of antenna structures disposed on a metal housing of a mobile terminal, capable of minimizing wireless performance deviation between a retracted state (first state) and an expanded state (second state). Referring to FIG. 7A to FIG. 8A, the plurality of antennas may be disposed on the metal housing of the mobile terminal that changes in size. Referring to FIGS. 7A to 8A, the mobile terminal that vertically changes in size may be referred to as a vertically rollable device. However, the retraction/expansion of the rollable device may not be limited to the vertical direction but the size may alternatively change horizontally.

Referring to FIGS. 7A to 8A, upper end antennas may be disposed on the second frame 102 that corresponds to a fixed part metal frame. Lower end antennas may be disposed on the first frame 101 that corresponds to a variable part metal frame. The first metal housing 1010 of the first frame 101 may be referred to as a slide metal part or slide metal cover. The second frame 102 that is exposed to the upper end and side surfaces of the rollable device may be referred to as a front metal part or a front metal cover.

Figure 9A:
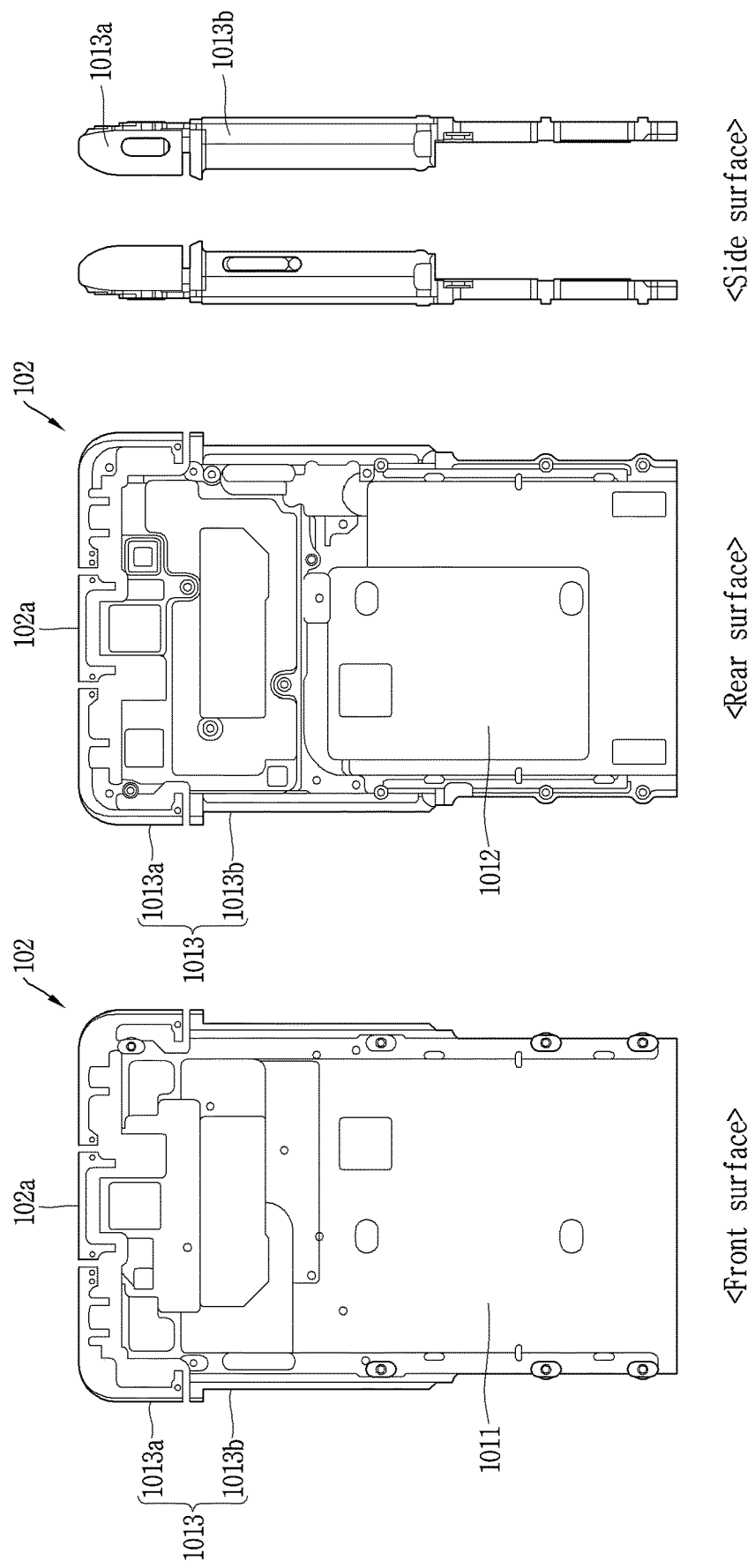
FIG. 9A illustrates front, rear, and lateral views of a front metal part. On the other hand.

In this regard, FIG. 9A illustrates front, rear, and lateral views of the front metal part. On the other hand, FIG. 9B illustrates front, rear, and lateral views of the slide metal part.

Referring to FIG. 9A, the front metal part 102 may include an upper side surface 102a, a front portion 1011, a rear portion 1012, and side portions 1013. The front portion 1011 and the rear portion 1012 may also be referred to as a front surface portion and a rear surface portion. The side portions 1013 includes a first side surface 1013a always exposed to outside, and a second side surface 1013b exposed to the outside only in the second state. A plurality of antennas may be disposed on the upper side surface 102a and the first side surface 1013a of the front metal part 102. Referring to FIGS. 8A and 9A, the fifth antenna ANT5 to the eighth antenna ANT8 may be disposed on the upper side surface 102a and the first side surface 10103a.

Figure 9B:
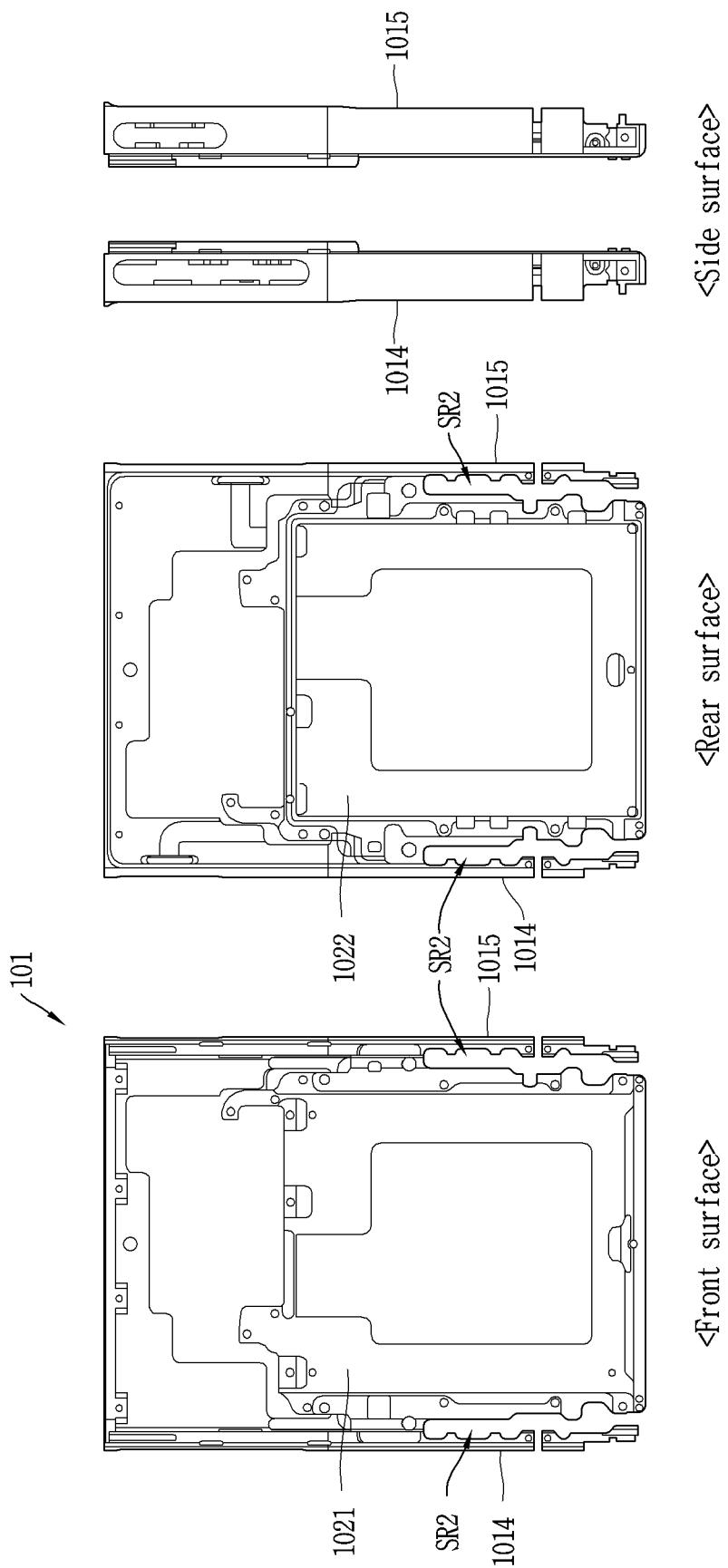
FIG. 9B illustrates front, rear, and lateral views of a slide metal part.

Referring to FIG. 9B, the slide metal part 1010 may include a front portion 1021, a rear portion 1022, and side portions 1014 and 1015. A plurality of slot regions from which a metal region has been removed may be disposed in a body region corresponding to the front portion 1021 and the rear portion 1022. The side portions 1014 and 1015 constituting a left surface and a right surface may be configured as side antennas. Referring to FIGS. 8A and 9B, the side portions 1014 and 1015 constituting the left surface and the right surface may operate as the third antenna (ANT3) 1130 and the fourth antenna (ANT4) 1140. A fourth conductive member and a fifth conductive member of the side portions 1014 and 1015 may operate as a third antenna (ANT3) 1130 and a fourth antenna (ANT4) 1140.

Referring to FIGS. 7A to 9B, the upper end antennas may include at least one of the fifth antenna (ANT5) 1150 to the eighth antenna (ANT8) 1180. The lower end antennas may include at least one of the first antenna (ANT1) 1110 to the fourth antenna (ANT4) 1140.

The upper end antennas disposed on the front metal part 102 corresponding to the second frame 102 hardly cause interference with the lower end antennas. This results from that the upper end antennas and the lower end antennas are disposed on the different frames and sufficiently spaced apart from each other. Also, the upper end antennas hardly exhibit antenna performance deviation due to the relative movement, namely, the open/closed states of the first frame 101 and the second frame 102. This results from non-occurrence of interference between the upper end antennas and the lower end antennas due to the relative movement of the first frame 101 and the second frame 102. However, a region where the ground is disposed may change according to the relative movement of the first frame 101 and the second frame 102. This ground condition may affect the antenna characteristics. Therefore, in the present disclosure, the antenna characteristics of the upper end antennas according to the relative movement of the first frame 101 and the second frame 102 when the upper end antennas are disposed on the second frame 102 will be described in detail.

The present disclosure proposes a method of designing upper end antennas which are not affected by a variable part and a method of designing lower end antennas in a variable ground structure in a rollable device. In this regard, antenna performance deviation rarely occurs in the upper end antennas when the rollable device is retracted/expanded in size. On the other hand, the antenna performance deviation may occur in the lower end antennas when the rollable device is retracted/expanded in size.

Figure 10A:
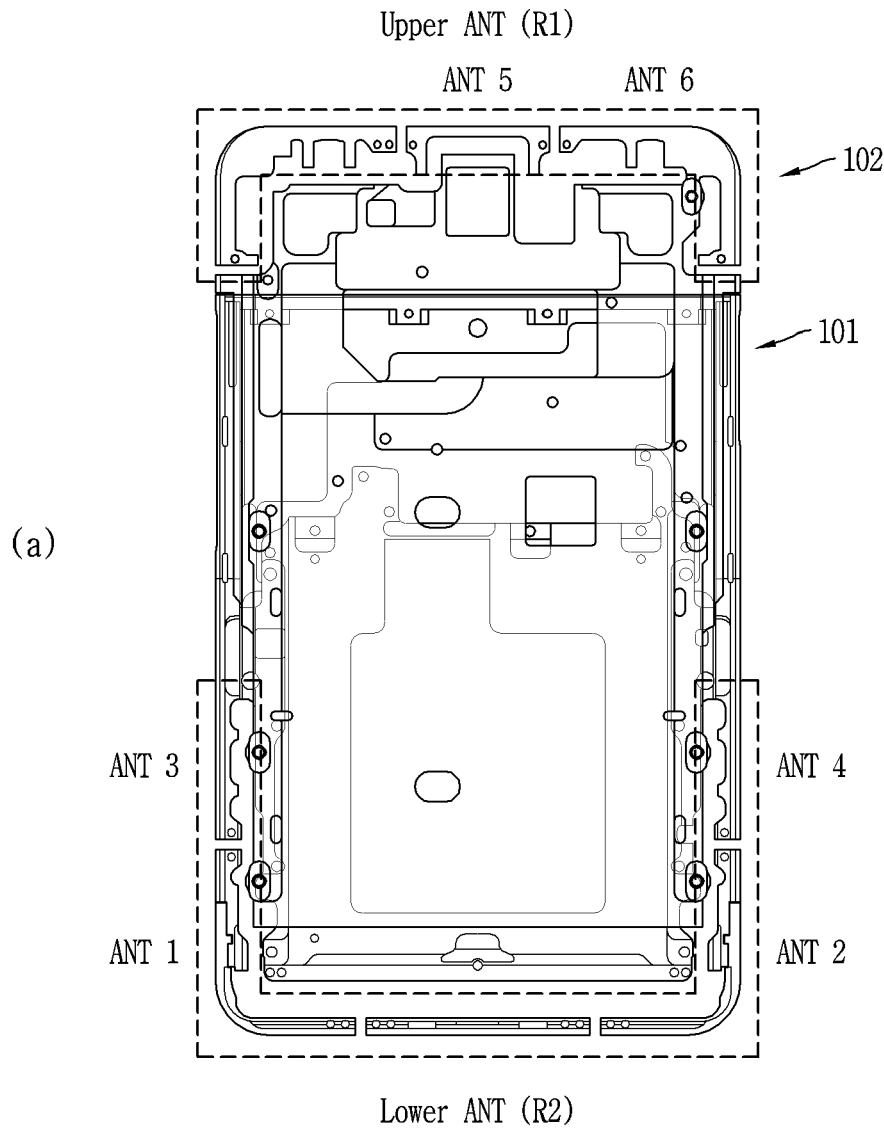
FIG. 10A is a conceptual view illustrating a metal frame coupling structure and a ground condition according to the coupling structure when first and second frames are coupled in a first state as a closed state.
Figure 10A:
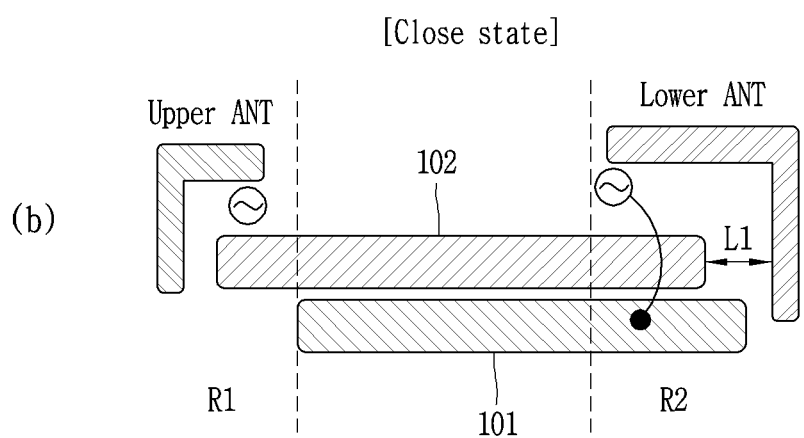
Figure 10B:
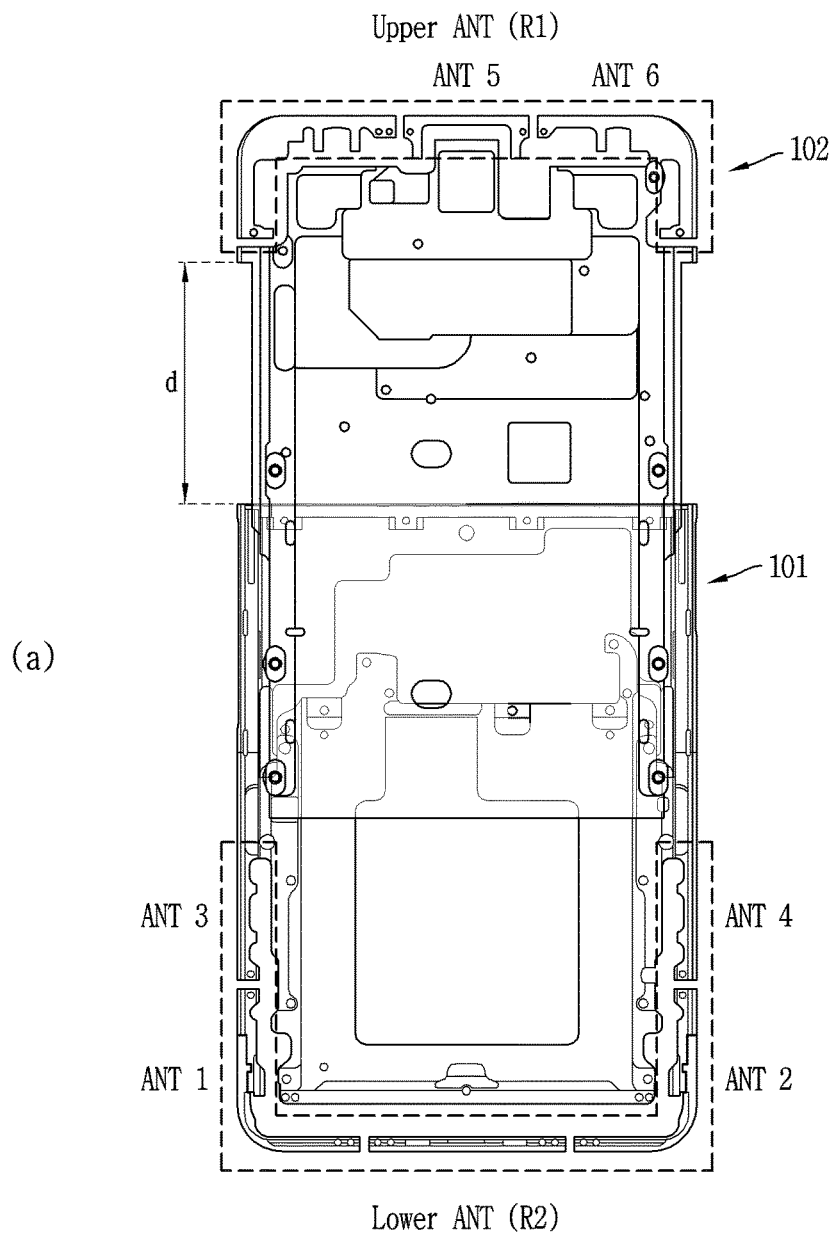
FIG. 10B is a conceptual view illustrating a metal frame coupling structure and a ground condition according to the coupling structure when first and second frames are coupled in a second state as an open state.
Figure 10B:
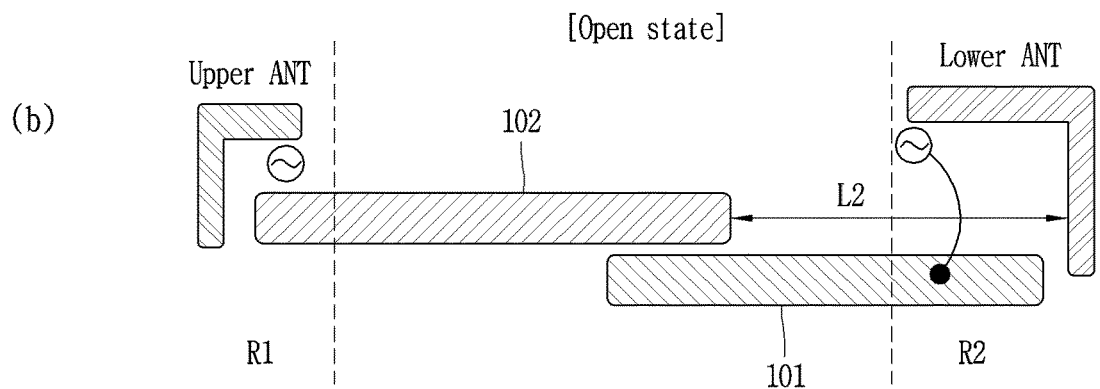

In this regard, FIG. 10A is a conceptual view illustrating a metal frame coupling structure and a ground condition according to the coupling structure when the first and second frames are coupled in a first state as a closed state. FIG. 10B is a conceptual view illustrating a metal frame coupling structure and a ground condition according to the coupling structure when the first and second frames are coupled in a second state as an open state.

Referring to FIGS. 7A, 8A, and 10A, the front metal part 102 corresponding to the first frame is coupled to the slide metal part 1010 in the first state that is the closed state. An upper end antenna region defined on the front metal part 102 is disposed adjacent to the slide metal part 1010 that operates as a ground.

Referring to FIGS. 7B and 10B, the front metal part 102 corresponding to the first frame is coupled to the slide metal part 1010 in the second state as the open state in which the two metal parts are spaced apart from each other by a predetermined distance d. The upper end antenna region defined on the front metal part 102 is spaced apart the predetermined distance d from the slide metal part 1010 that operates as the ground.

Referring to (b) of FIG. 10A and (b) of FIG. 10B, the slide metal part 1010 that operates as the ground is not disposed in the upper end antenna region R1 where the upper end antennas are disposed, in the first state and the second state. In the upper end antenna region R1, the front metal part 102 as the fixed part operates as the ground. Thus, there is not a great antenna characteristic variation according to the change in the ground condition in the first state and the second state. In detail, the upper end antenna region R1 does not include the slide frame, namely, the slide metal part 1010 that is the ground of the lower end antennas, and is not affected by the slide metal part 1010. Accordingly, antenna performance deviation is not caused due to the switching between the first state and the second state, namely, the closed state and the open state.

On the other hand, the change in the ground condition occurs in a lower end antenna region R2 where the lower end antennas are disposed, in the first state and the second state. This is because a distance between the lower end antenna disposed in the lower end antenna region R2 and the ground is changed upon switching from the first state to the second state. The distance between the lower end antenna and the ground is L1 in the first state. The distance between the lower end antenna and the ground changes to L2 in the second state, and thus the antenna performance varies.

The change of the ground condition in the lower end antenna region R2 is caused by the change of the ground adjacent to the lower end antenna. In the first state, the ground adjacent to the lower end antenna is the front metal part 102. In the second state, the ground adjacent to the lower end antenna is the slide metal part 1010. Therefore, the lower end antenna region R2 includes a cover frame, namely, the front metal part 102 that is the ground of the upper end antennas, in the closed state, and thus is greatly affected by the front metal part 102 operating as the ground. This causes great antenna performance deviation due to the switching between the first state and the second state, namely, the closed state and the open state.

The antenna performance variation due to the change of the ground condition may occur both in the first and second antennas ANT1 and ANT2 disposed on the lower end portion and the third and fourth antennas ANT3 and ANT4 disposed on the side portions. On the other hand, antenna characteristics of the third and fourth antennas ANT3 and ANT4 disposed on the side portions may be affected by parasitic resonance due to a slot gap between the slide metal part 1010 and the front metal part 102.

Figure 11A:
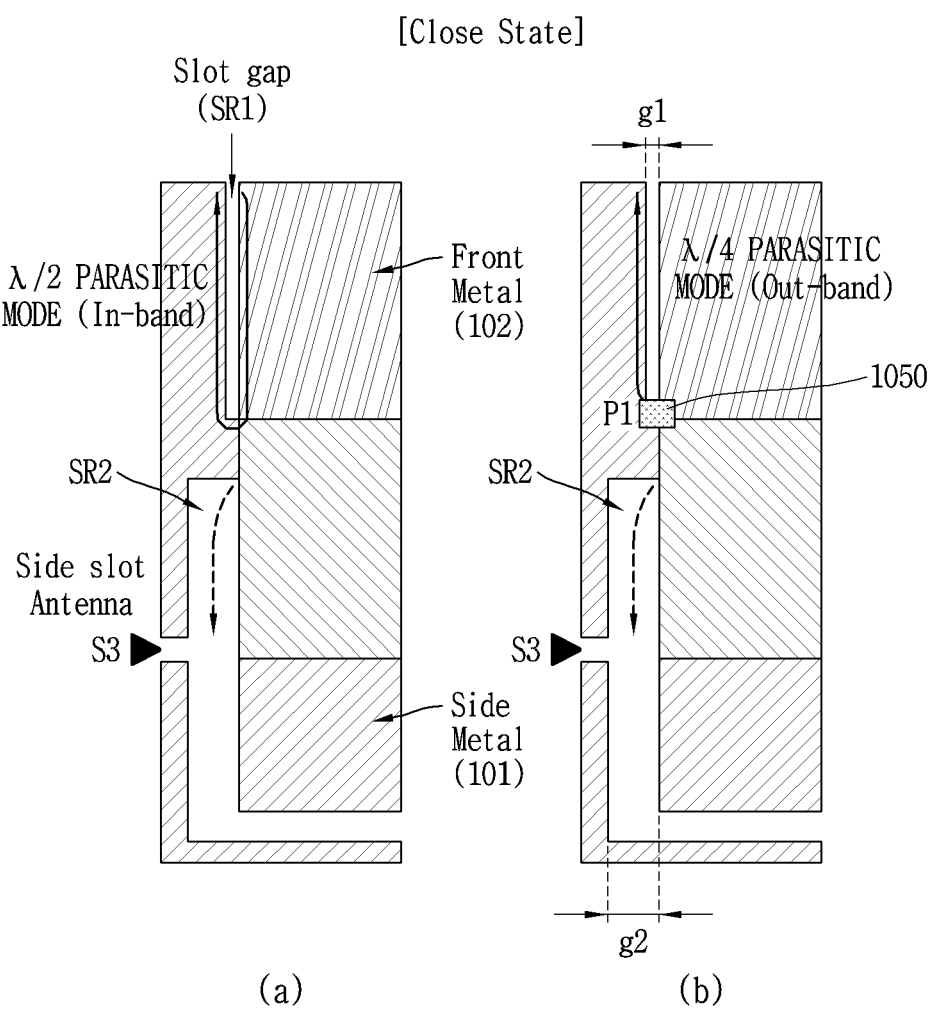
FIGS. 11A and 11B are conceptual views illustrating an operation of an antenna according to a principle of generating parasitic resonance by a slot gap due to a relative movement between first and second frames, and a configuration for suppressing it.
Figure 11B:
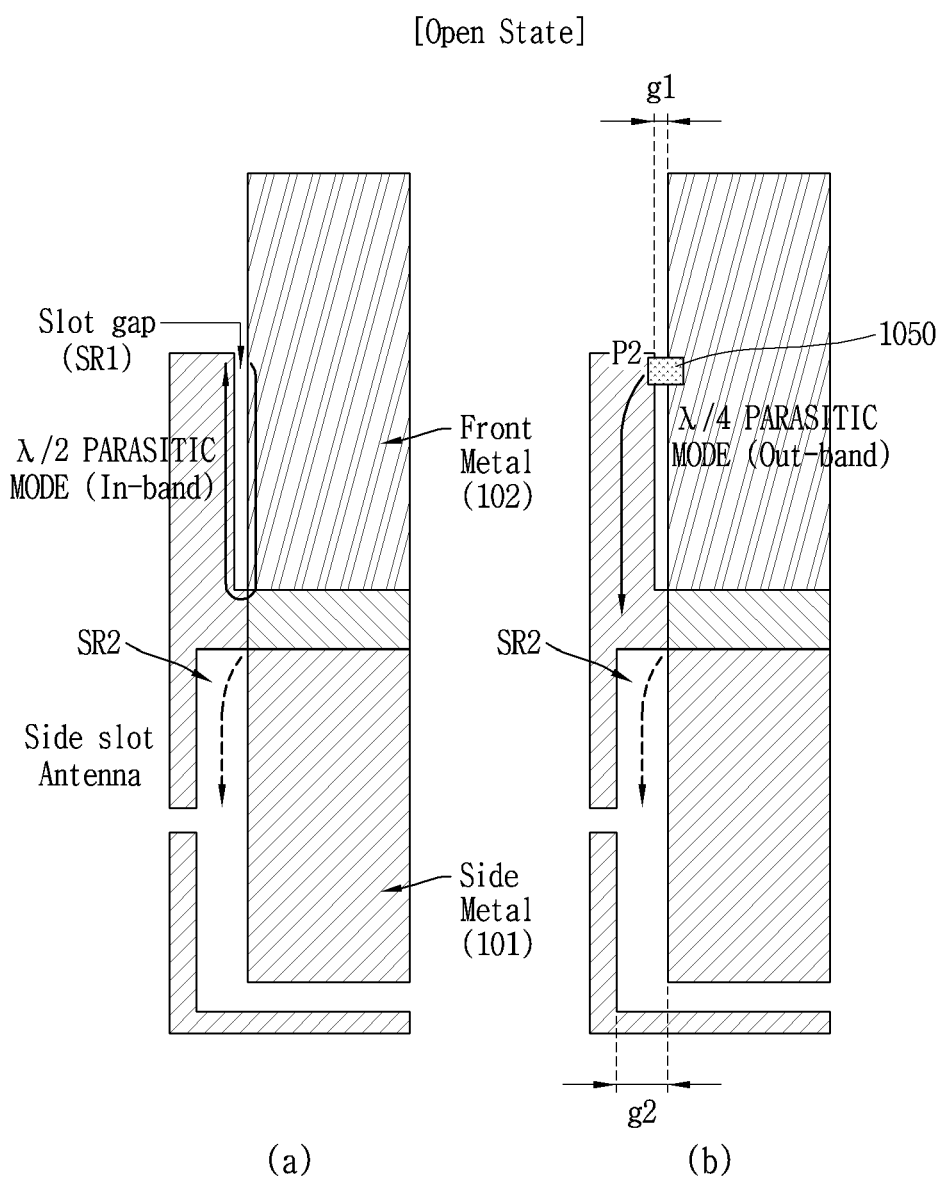

In this regard, FIGS. 11A and 11B are conceptual views illustrating an operation of an antenna according to a principle of generating parasitic resonance by a slot gap due to a relative movement between first and second frames, and a configuration for suppressing it.

FIG. 11A is a conceptual view illustrating a parasitic mode change according to presence or absence of a ground contact in the closed state (first state) and an affection to the side antennas according to the change. On the other hand, FIG. 11A is a conceptual view illustrating a parasitic mode change according to presence or absence of a ground contact in the open state (second state) and an affection to the side antennas according to the change.

(a) of FIG. 11A illustrates a parasitic mode by a current that is generated along both sides of a slot region SR1 that corresponds to the slot gap before the ground contact. On the other hand, (b) of FIG. 11A illustrates a parasitic mode by a current that is generated along one side of the slot region SR1 that corresponds to the slot gap after the ground contact.

Figure 12A:
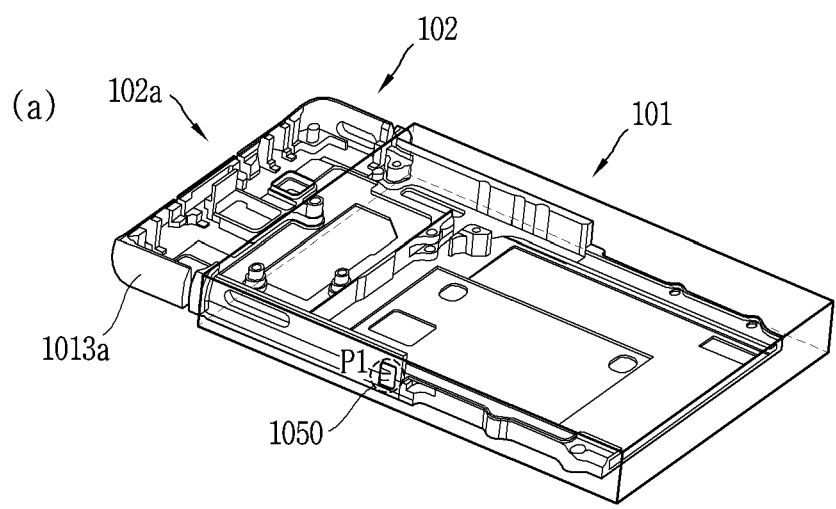
FIG. 12A is a perspective view illustrating that a front metal part and a slide metal part are coupled to each other according to a closed/open state. On the other hand.
Figure 12A:
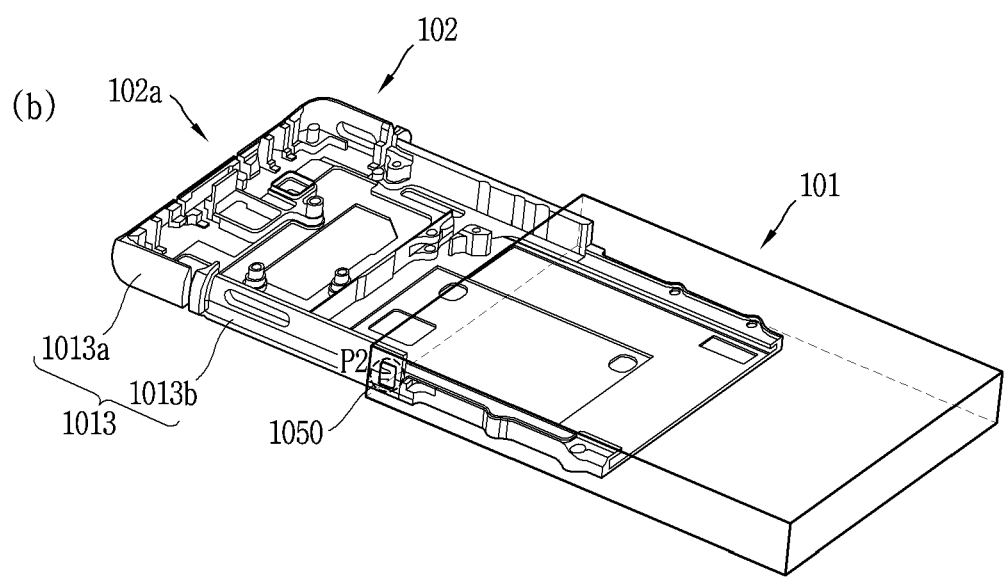
Figure 12B:
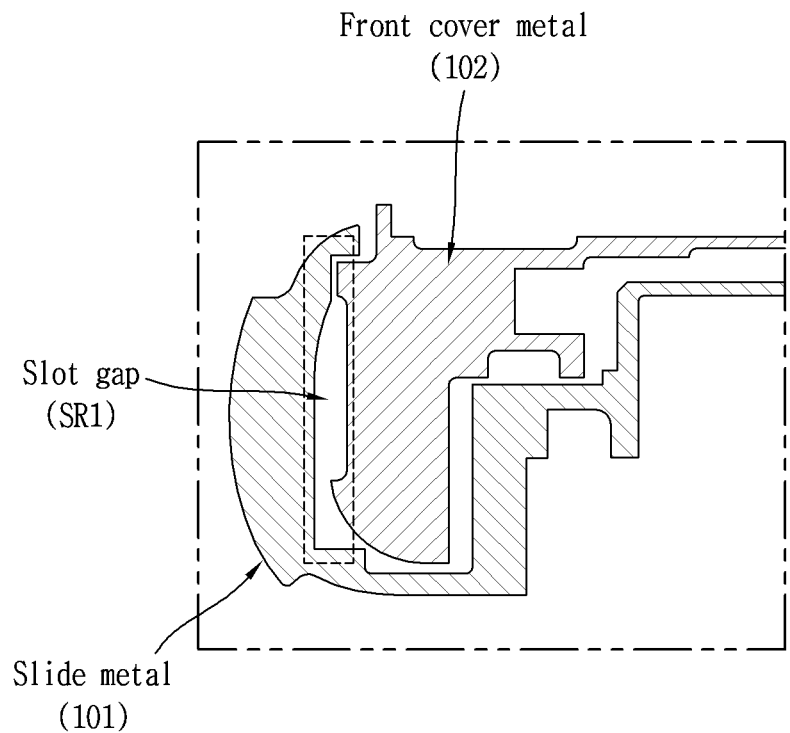
FIG. 12B is a lateral view illustrating a structure in which the front metal part and the slide metal part are spaced apart from each other by a slot gap in the closed/open state.
Figure 12C:
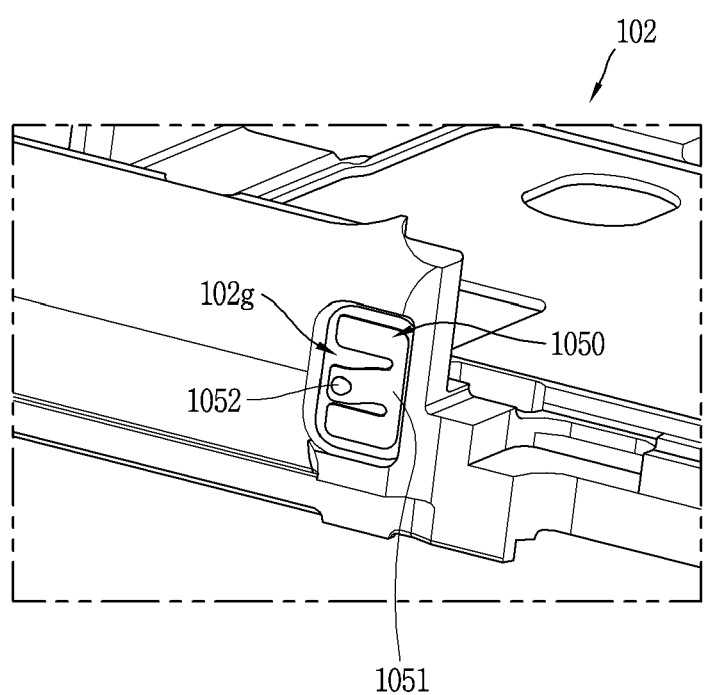
FIG. 12C is an enlarged view illustrating a contact member disposed on the front metal part.

FIG. 12A is a perspective view illustrating that a front metal part and a slide metal part are coupled to each other according to a closed/open state. On the other hand, FIG. 12B is a lateral view illustrating a structure in which the front metal part and the slide metal part are spaced apart from each other by a slot gap in the closed/open state. FIG. 12C is an enlarged view illustrating a contact member disposed on the front metal part.

Referring to FIG. 11A and (a) of FIG. 12A, in the closed state (first state), the front metal part 102 and the slide metal part 1010 are electrically connected through a contact member 1050 at a first point P1. The first point P1 corresponds to a lower end portion of the slot region SR1. Referring to FIG. 11B and (b) of FIG. 12A, in the open state (second state), the front metal part 102 and the slide metal part 1010 are electrically connected through the contact member 1050 at a second point P2. The second point P2 corresponds to an upper end portion of the slot region SR1.

Referring to FIG. 12B, the slot gap SR1 is defined between the front metal part 102 corresponding to the front metal cover and the slide metal part 1010 corresponding to the side metal. FIG. 12B illustrates a structure in which the contact member for electrically connecting the front metal part 102 and the slide metal part 1010 is not disposed in the slot region SR1 corresponding to the slot gap. Parasitic resonance is generated by the slot region SR1 between the front metal part 102 and the slide metal part 1010. The parasitic resonance is generated in an operating band (e.g., MB) of the side antenna by the current that is generated along both sides of the slot region SR1 between the front metal part 102 and the slide metal part 1010. Also, antenna performance deviation between the closed and open states may be caused due to the relative movement between the front metal part 102 and the slide metal part 1010.

To mitigate the interference with the side antenna and the antenna performance deviation of the side antenna due to the parasitic resonance, the contact member 1050 of FIG. 12A may be disposed on the front metal part 102. Referring to FIG. 12C, the contact member 1050 may be welded on or integrally formed with the front metal part 102. The contact member 1050 may be attached to or integrally formed with a side surface groove 102g of the front metal part 102. The contact member 1050 may include a fixed portion 1 051 and coupling portion 1052 with respect to the front metal part 102. The front metal part 102 may be connected to be in contact with the slide metal part 1010 of FIG. 12A through the coupling portion 1052.

In FIGS. 11A to 12C, the side antenna is described as the third antenna ANT3 disposed on one side, for the sake of explanation. However, the side antenna is not limited thereto but alternatively corresponds to the fourth antenna ANT4 disposed on another side. The side antenna may form a λ/4 slot with the slide metal part 1010 to operate as an antenna. On the other hand, a λ/2 slot mode (parasitic mode) may be formed due to the slot gap of the slot region SR1 between the front metal part 102 and the slide metal part 1010. Due to the slot mode (parasitic mode), the parasitic resonance may be generated at an operating frequency of the third antenna ANT3 as the side antenna.

However, as illustrated in (b) of FIG. 11A, the ground contact by the contact member 1050 may cause the change of the parasitic mode. After the ground contact by the contact member 1050, a current is generated along one side of the slot region SR1. Accordingly, the λ/4 slot mode is formed in the slot region SR1, and the parasitic resonance is deviated from an operating frequency band of the third antenna ANT3. A gap g2 of a second slot region SR2 may be set to be greater than a gap g1 of the slot region SR1. In this regard, it is necessary to set the slot region SR1 to be a predetermined gap or less, for maintenance of mechanical rigidity and electrical connection between the slide metal part 1010 and the front metal part 102. On the other hand, it is necessary to set the second slot region SR2 forming a side antenna region to be a predetermined gap or more for antenna performance. Accordingly, the gap g2 of the second slot region SR2 may be set to be greater than the gap g1 of the slot region SR1.

Even in the open state (second state) of FIG. 11B, similarly to the closed state (first state) of FIG. 11A, the side antenna may form a λ/4 slot with the slide metal part 1010 to operate as an antenna. A λ/2 slot mode (parasitic mode) may be formed due to the slot gap of the slot region SR between the front metal part 102 and the slide metal part 1010. Due to the slot mode (parasitic mode), the parasitic resonance may be generated at an operating frequency of the third antenna ANT3 as the side antenna.

However, as illustrated in (b) of FIG. 11B, the ground contact by the contact member 1050 may cause the change of the parasitic mode. After the ground contact by the contact member 1050, a current is generated along one side of the slot region SR. Accordingly, the λ/4 slot mode is formed in the slot region SR1, and the parasitic resonance is deviated from an operating frequency band of the third antenna ANT3. Referring to (b) of FIG. 11B and (b) of FIG. 12A, in the open state (second state), a connected position between the front metal part 102 and the slide metal part 1010 through the contact member 1050 is P2 that is an upper end portion of the slide metal part 1010. Referring to (b) of FIG. 11B and (a) of FIG. 12A, in the closed state (first state), a connected position between the front metal part 102 and the slide metal part 1010 through the contact member 1050 is P1 that is one point of the slide metal part 1010.

Accordingly, as the contact point by the contact member 1050 is changed to the upper end portion in the second state, a parasitic mode field distribution may be made in an opposite direction to the parasitic mode field distribution in the first state. However, even if the parasitic mode field distribution changes due to the change of the contact point by the contact member 1050, the change of the parasitic resonating frequency may not occur. The change of the parasitic resonating frequency is determined depending on a length of a current path formed in the slot region SR1. Referring to (b) of FIG. 11A and (b) of FIG. 11B, even if the contact point changes, the length of the current path formed along the one side of the slot region SR1 is λ/4, and thus the parasitic resonating frequency band is deviated from the operating frequency band of the side antenna.

Referring to (b) of FIG. 11A and (a) of FIG. 12A, in the closed state (first state), the front metal part 102 and the slide metal part 1010 are connected through the contact member 1050 to be in ground-contact with each other at one point P1 of the slide metal part 1010. Referring to (b) of FIG. 11B and (b) of FIG. 12A, in the open state (second state), the front metal part 102 and the slide metal part 1010 are connected through the contact member 1050 to be in ground-contact with each other at the upper end portion P2 of the slide metal part 1010. In the first state and the second state, the slot region SR1 corresponding to the slot gap is defined between the front metal part 102 and the slide metal part 1010. Referring to FIGS. 11A to 12B, the current generated between the front metal part 102 and the slide metal part 1010 may generate parasitic resonance on the adjacent side antenna.

The ground condition of the upper end antennas disposed on the upper side surface 102a of the front metal part 102 does not change due to the relative motion of the slide metal part 1010 in the closed/open state. Therefore, the antenna characteristic variation of the upper end antennas disposed on the upper side surface 102a and the side portion 1013a of the front metal part 102 may be ignorable. On the other hand, the side antennas or lower end antennas disposed on the slide metal part 1010 in the closed/open state may be involved in the antenna characteristic variation. As both end portions of the slot region SR1 between the front metal part 102 and the slide metal part 1010 are electrically connected by the contact member 1050, the current path formed on the slot region SR1 changes to one side direction. Due to the change of the current path, a parasitic resonating band by the slot region SR1 is deviated from an operating band of the side antenna.

Figure 13:
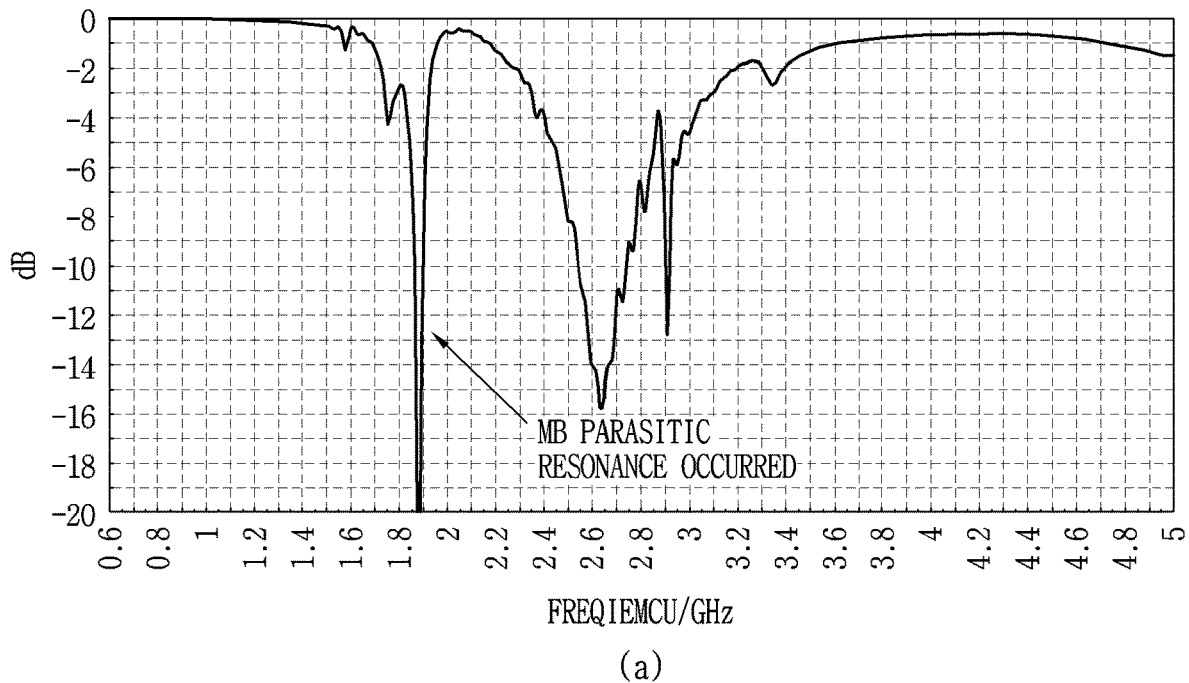
FIG. 13 is a view illustrating a generation or non-generation of parasitic resonance according to whether a ground-contact is made in the closed state.
Figure 13:
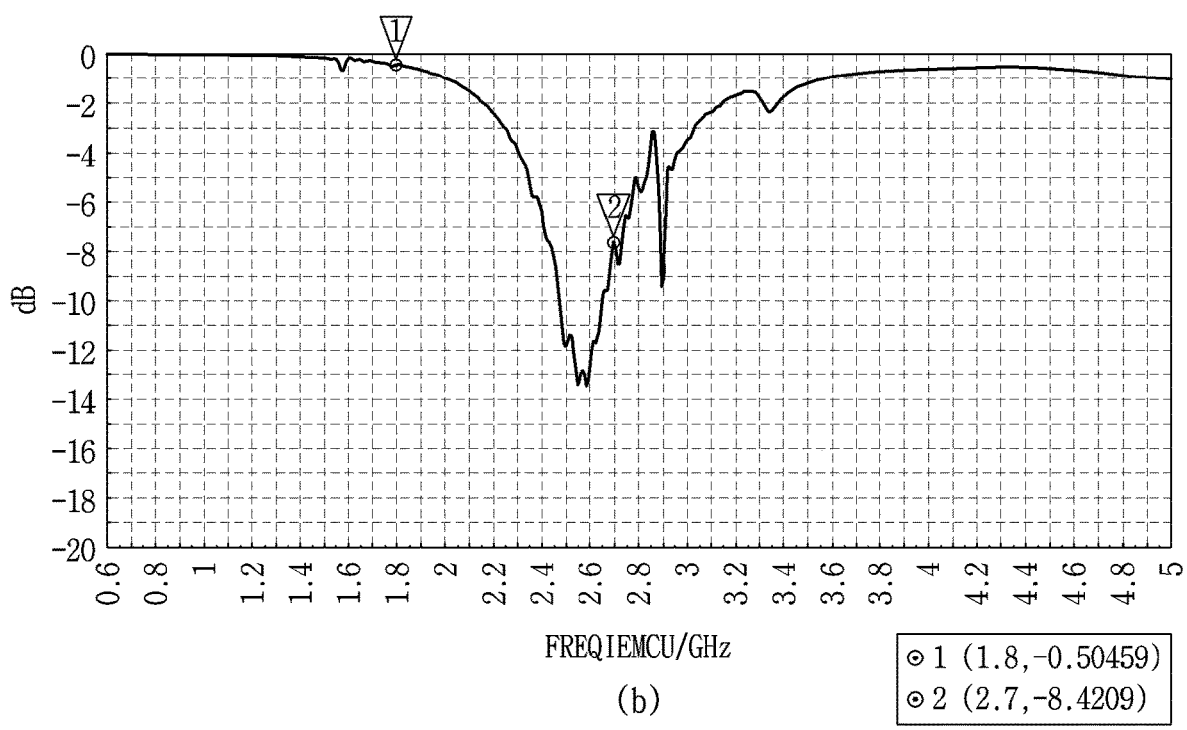

FIG. 13 is a view illustrating a generation or non-generation of parasitic resonance according to whether a ground-contact is made in the closed state. (a) of FIG. 13 illustrates the reflection coefficient characteristic of the side antenna adjacent to the slot region before the ground-contact. (b) of FIG. 13 illustrates the reflection coefficient characteristic of the side antenna adjacent to the slot region after the ground-contact.

Referring to (a) of FIG. 13, the parasitic resonance may be generated at a frequency adjacent to the antenna operating frequency before the ground-contact. As one example, when the third antenna ANT3 as the side antenna operates in HB, the parasitic resonance by the slot region SR1 may be generated in MB adjacent to HB. Or, when the third antenna ANT3 operates in MB/HB, the parasitic resonance by the slot region SR1 may be generated in MB. Therefore, an in-band parasitic resonance may be generated in the same band as the antenna operating band or MB as a band adjacent to the antenna operating band.

Referring to (b) of FIG. 13, the parasitic resonance may be removed from a frequency adjacent to the antenna operating frequency after the ground-contact. As one example, when the third antenna ANT3 as the side antenna operates in HB, the parasitic resonance by the slot region SR1 does not occur in MB adjacent to HB. Or, when the third antenna ANT3 operates in MB/HB, the parasitic resonance by the slot region SR1 does not occur in MB. Therefore, an in-band parasitic resonance is removed by the contact member 1050 in the same band as the antenna operating band or MB as a band adjacent to the antenna operating band. Therefore, upon the relative movement between the front metal part 102 and the slide metal part 1010, the parasitic resonance by the slot region SR1 is removed, and the performance variation of the side antenna is not caused.

Hereinafter, a mobile terminal that changes in size according to the present disclosure will be described based on the aforementioned configuration, operations, and technical features, with reference to the accompanying drawings. Referring to FIGS. 3A and 7A to 12, the mobile terminal having the variable size may include the slide metal part 1010 and the front metal part 102. The mobile terminal may further include the contact member 1050 and the antennas ANT3 and ANT4. The mobile terminal may further include the display 151 that includes a first region 151a that is exposed to the front surface in the retracted state, and a second region 151b that is an expanded region exposed to the front surface in the expanded state.

The slide metal part 1010 may include a left side surface, a right side surface, and a bottom side surface defining appearance of the mobile terminal. The slide metal part 1010 may include a plurality of metal housings. As one example, the slide metal part 1010 may include a first metal housing 1010, and a second metal housing 1020 coupled to the first metal housing 1020 to overlap the first metal housing 1010. In this case, the first metal housing 1010 coupled to the front metal part 102 may alternatively be referred to as a slide metal part 1010.

The front metal part 102 may include an upper side surface and a front portion defining the appearance of the mobile terminal, and may be configured to be coupled to the slide metal part 1010. The fifth antenna ANT5 to the eighth antenna ANT8 corresponding to the upper end antennas may be disposed on the upper side surface 102a of the front metal part 102. The front portion 102b of the front metal part 102 may include a region that is partitioned to accommodate a plurality of electronic components including a plurality of PCB s 181, 183a, and 183b. The front portion 102b of the front metal part 102 may include an upper slot region USR that is configured to be separated from the upper end antennas. Some of those electronic components may be exposed through at least partial region of the upper slot region USR. Also, a plurality of slot regions may further be defined on the front portion 102b of the front metal part 102.

A contact member 1050 by which the slide metal part 1010 and the front metal part 102 are in contact with each other may be disposed on the side surface of the front metal part 102. On the other hand, antennas may be disposed on the left side surface and the right side surface of the slide metal part 1010, and the slot region SR may be defined on a region of the side surface of the slide metal part 1010 that overlaps the front metal part 102.

The contact member 1050 partially changes the current path generated along both sides of the slot region SR in the open/closed state, such that the parasitic resonance is deviated from the resonating frequency band of the adjacent antenna. In this regard, the slide metal part 1010 and the front metal part 102 are in contact with each other at a first position P1, which is a lower end of the slot region SR, through the contact member 1050. The first state is a retracted state, namely, the closed state, in which a display region (or display area) of the mobile terminal is retracted. Accordingly, the slide metal part 1010 and the front metal part 102 can be in contact with each other through the contact member 1050 at the first position P1, to remove the parasitic resonance by the slot region SR1. In detail, the parasitic resonance between the antennas ANT3 and ANT4 and the slot region SR1 by the current generated along the both sides of the slot region SR1 can be removed as the current path is generated along one side by the contact member 1050 of the first position P1. In this case, the contact member 1050 may be in ground-contact with the side portion of the slide metal part 1010 at the first position P1 as the lower end of the slot region SR1.

In the closed state (first state), the length of the current path is changed, by the contact member 1050, from about ½ (half) of a wavelength corresponding to the antenna operating band into about ¼ (quarter) of the wavelength. In this regard, the length of the current path generated along the both sides has a half wavelength of a specific operating band of the antenna, and thus the parasitic resonance occurs at the specific operating band of the antenna by the current generated along the both sides. On the other hand, the current path generated along the one side by the contact member 1050 of the first position P1 which is the lower end of the slot region SR1 can have the length corresponding to the quarter (¼) wavelength of the specific operating band, so as to remove the parasitic resonance at the specific operating band of the antenna by the current generated along the one side.

Through the contact member 1050, the slide metal part 1010 and the front metal part 102 are in contact with each other in the second state at a second position P2 that is an upper end of the slot region SR. The second state is an expanded state, in which the display region of the mobile terminal is expanded, namely, the open state. Accordingly, the slide metal part 1010 and the front metal part 102 can be in contact with each other through the contact member 1050 at the second position P2, to remove the parasitic resonance by the slot region SR1. In detail, the parasitic resonance between the antennas ANT3 and ANT4 and the slot region SR1 by the current generated along the both sides of the slot region SR1 can be removed as the current path is generated along one side by the contact member 1050 of the second position P2. In this case, the contact member 1050 may be in ground-contact with the side portion of the slide metal part 1010 at the first position P2 as the lower end of the slot region SR1.

In the open state (second state), the length of the current path is changed, by the contact member 1050, from about ½ (half) of a wavelength corresponding to the antenna operating band into about ¼ (quarter) of the wavelength. In this regard, the length of the current path generated along the both sides has a half wavelength of a specific operating band of the antenna, and thus the parasitic resonance occurs at the specific operating band of the antenna by the current generated along the both sides. On the other hand, the current path generated along the one side by the contact member 1050 of the second position P2 which is the upper end of the slot region SR1 can have the length corresponding to the quarter (¼) wavelength of the specific operating band, so as to remove the parasitic resonance at the specific operating band of the antenna by the current generated long the one side.

Figure 14:
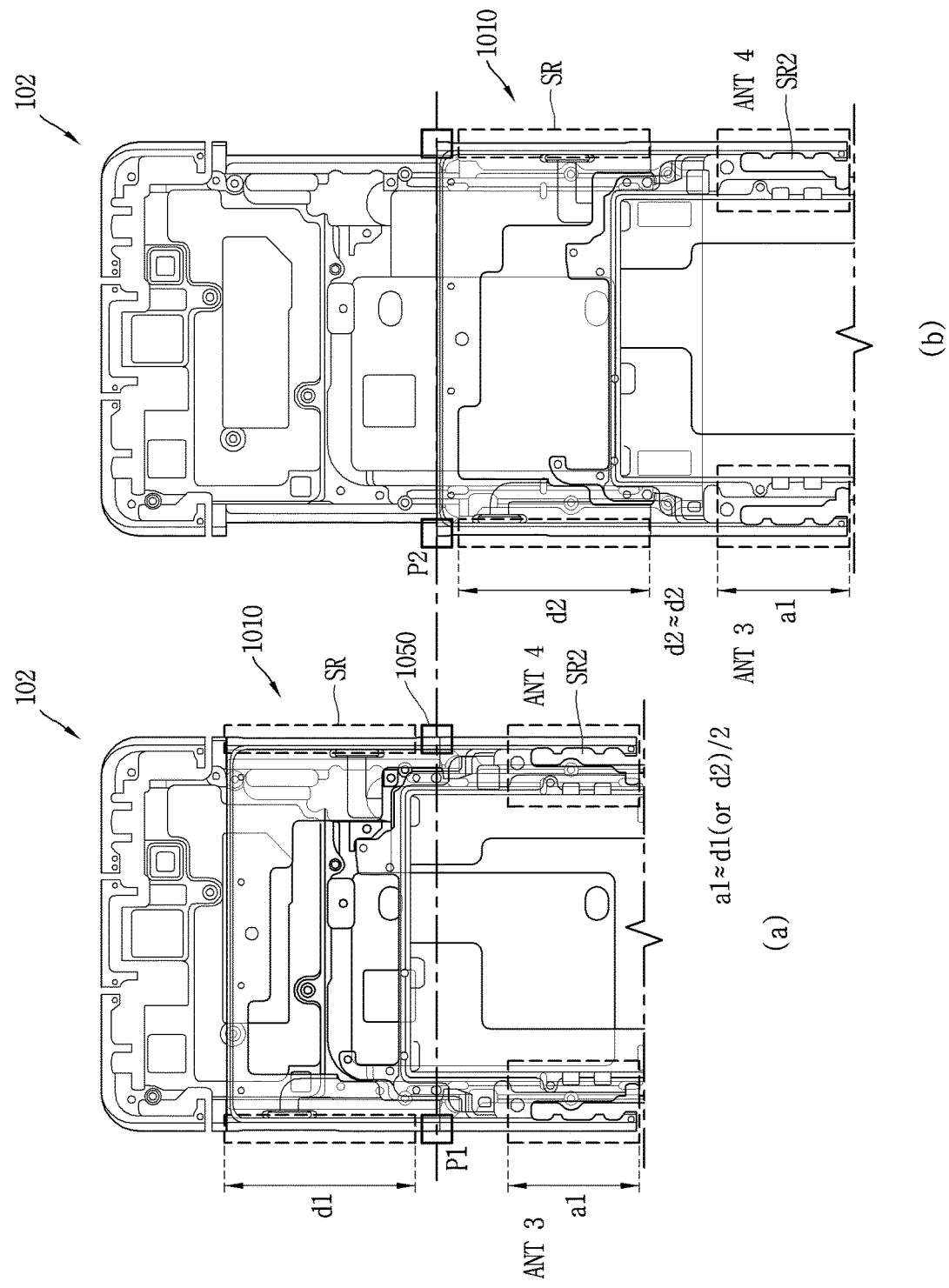
FIG. 14 is a view illustrating a coupling structure between the first frame and the second frame and a position of a contact member according to the open/closed state.

Hereinafter, a slot length of the slot region SR1 formed on the side surface and the lengths of the side antennas ANT3 and ANT4 will be described. In this regard, FIG. 14 is a view illustrating a coupling structure between the first frame and the second frame and a position of a contact member according to the open/closed state. Here, the first frame and the second frame may be referred to as the slide metal part 1010 and the front metal part 102, respectively.

Referring to FIGS. 12A and (a) of FIG. 14, the contact member 1050 formed on the front metal part 102 is in ground-contact with the slide metal part 1010 at P1 as one point of the slide metal part 1010 in the closed state (first state). Referring to (b) of FIG. 14, the contact member 1050 formed on the front metal part 102 is in ground-contact with the slide metal part 1010 at P2 as one point of the slide metal part 1010 in the open state (second state).

Referring to FIGS. 7A to 14, in the antennas ANT3 and ANT4 formed on the left side surface and the right side surface of the slide metal part 1010, the second slot region SR2 defined on the front portion 1010b of the slide metal part has a length a1 corresponding to a quarter (¼) wavelength of a specific operating band of the antenna. On the other hand, the length of the antenna ANT3, ANT4 may be longer than the length a1 of the second slot region SR2. The length of the second slot region SR2 may be determined as a length from one end portion of the second slot region SR2 to one end portion of the slit S3, S4 formed in the slide metal part 1010.

In the closed/open state of FIG. 14, the length a1 of the second slot region SR2 may be set to about a half (½) of a length d1, d2 of the slot region SR1. Here, the length d1 of the slot region SR1 corresponds to a length of the slot gap between the front metal part 102 and the slide metal part 1010. On the other hand, the length a1 of the second slot region SR2 corresponds to a length from one end portion of the second slot region SR2 to one end portion of the slit S3, S4 formed in the slide metal part 1010.

Referring to FIGS. 7A to 14, in the first state in which the slide metal part 1010 moves in a first direction as an upward direction, the front metal part 102 is in contact with the slide metal part 1010 at the first position P1, which is the lower end of the slot region SR1, by the contact member 1050. As the front metal part 102 is in contact with the slide metal part 1010 at the first position P1, the parasitic resonance by the slot region can be removed. On the other hand, in the second state in which the slide metal part 1010 moves in a second direction as a downward direction, the front metal part 102 is in contact with the slide metal part 1010 at the second position P2, which is the upper end of the slot region SR1, by the contact member 1050. As the front metal part 102 is in contact with the slide metal part 1010 at the second position P2, the parasitic resonance by the slot region can be removed.

Referring to FIGS. 3A and 7A to 14, the display 151 may include a first region 151a that is exposed to the front surface in the retracted state of the mobile terminal, and a second region 151b that is an expanded region exposed to the front surface in the expanded state of the mobile terminal. In the first state in which the first region 151a of the display is exposed, the front metal part 102 is in contact with the slide metal part 1010 at the first position P1, which is the lower end of the slot region SR1, by the contact member 1050. As the front metal part 102 is in contact with the slide metal part 1010 at the first position P1, the parasitic resonance by the slot region can be removed. On the other hand, in the second state in which the first region 151a and the second region 151b of the display are exposed, the front metal part 102 is in contact with the slide metal part 1010 at the second position P2, which is the upper end of the slot region SR1, by the contact member 1050. As the front metal part 102 is in contact with the slide metal part 1010 at the second position P2, the parasitic resonance by the slot region can be removed.

The slide metal part 101 corresponding to the first frame may include a first metal housing 1010 and the second metal housing 1020. The first metal housing 1010 includes a left side surface and a right side surface defining the appearance of the mobile terminal. The second metal housing 1020 may include a lateral side surface, a right side surface, and a bottom side surface defining the appearance. On the other hand, the side antennas ANT3 and ANT4 disclosed in the present disclosure are disposed on the left side surface and the right side surface of the first metal housing 1010.

The lower end antennas disclosed in the present disclosure may include the first antenna ANT1 to the fourth antenna ANT4. The first antenna ANT1 and the second antenna ANT2 that are disposed in the second metal housing among the lower end antennas may be configured as conductive members that are disposed on one side surface and the lower end of the appearance of the mobile terminal. The first antenna ANT1 and the second antenna ANT2 may be configured as a first conductive member 1021 and a second conductive member 1022.

The first conductive member 1021 of the second metal housing 1020 may include first and second sub members 1021a and 1021b, and a corner region 1021c. The second conductive member 1022 of the second metal housing 1020 may include first and second sub members 1022a and 1022b, and a corner region 1022c.

With regard to the first conductive member 1021, the first sub member 1021a may be disposed on the bottom side surface of the appearance, and the second sub member 1021b may be disposed on the left side surface of the appearance. The corner region 1021c is defined between the first sub member 1021a and the second sub member 1021b. With regard to the second conductive member 1022, the first sub member 1022a may be disposed on the bottom side surface of the appearance, and the second sub member 1022b may be disposed on the right side surface of the appearance. The corner region 1022c is defined between the first sub member 1022a and the second sub member 1022b.

The left side surface and the right side surface of the first metal housing 1010 and the second sub members 1021b and 1022b of the second metal housing 1020 may overlap each other. The overlapped first metal housing 1010 may not be exposed externally but the second sub members 1021b and 1022b may be exposed externally.

The first metal housing that overlaps the first conductive member 1021 may operate as the first antenna ANT1, and the second metal housing that overlaps the second conductive member 1022 may operate as the second antenna ANT2. A third conductive member 1023 is disposed between the first conductive member 1021 and the second conductive member 1022. On the other hand, the antennas ANT3 and ANT4 corresponding to a fourth conductive member 1014 and a fifth conductive member 1015 that are disposed on the left side surface and the right side surface of the first metal housing 1010 may operate as the third antenna and the fourth antenna, respectively. The lower end antennas including the first antenna ANT1 to the fourth antenna ANT4 may be disposed on the side surfaces of the slide metal part 1010.

Figure 15A:
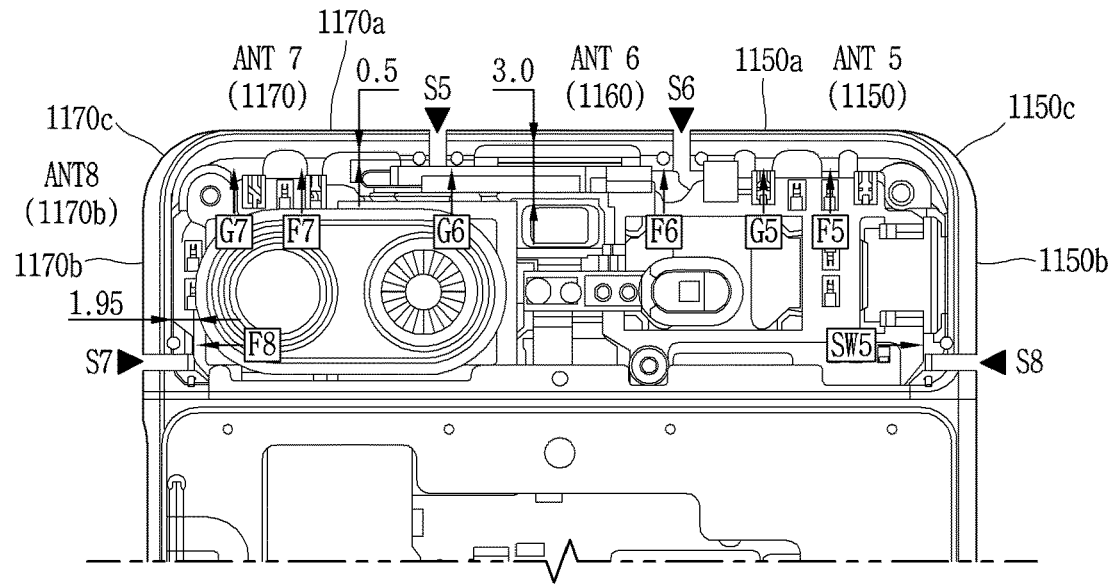
FIGS. 15A and 15B are views illustrating a disposition structure of upper end antennas in accordance with one embodiment.
Figure 15B:
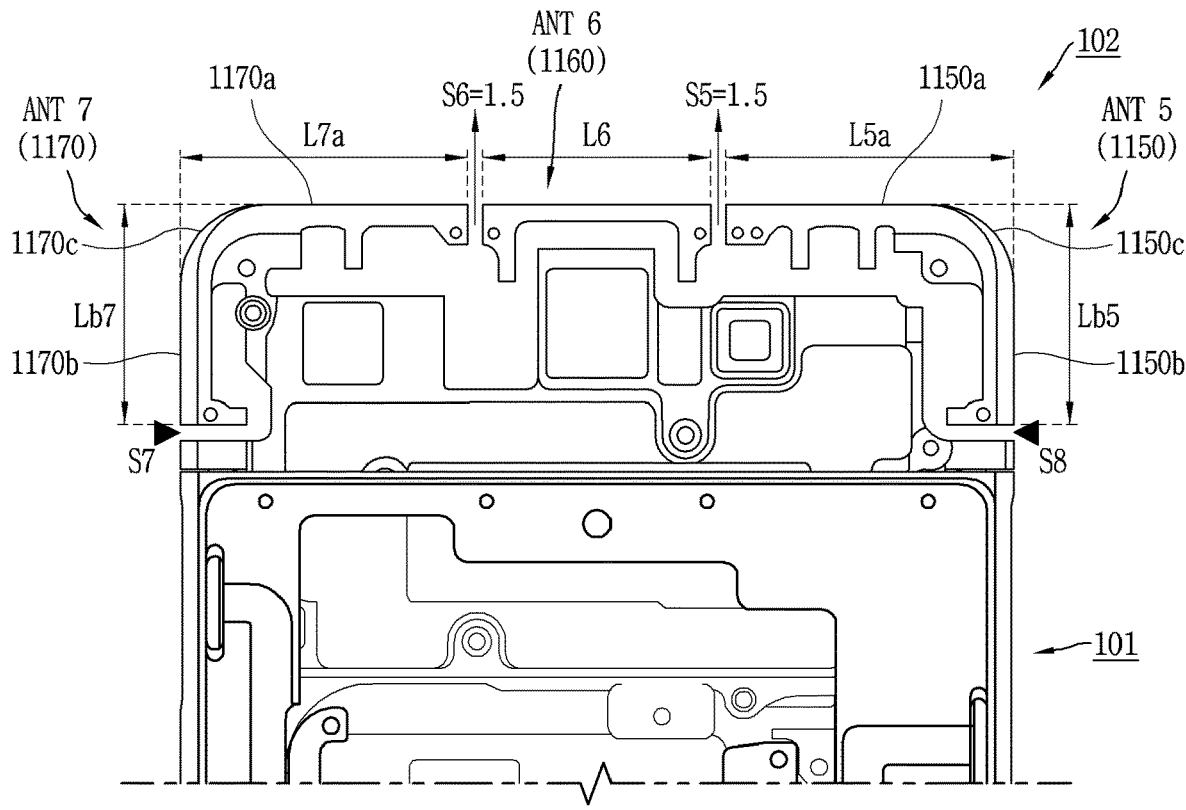
Figure 16:
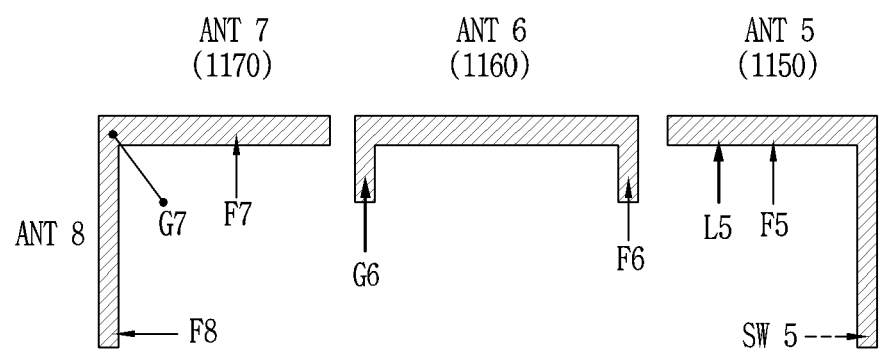
FIG. 16 is a conceptual view illustrating a disposition structure of feed parts, ground parts, and a switch according to the disposition of the upper end antennas of FIGS. 15A and 15B.

In the meantime, the upper end antennas isolated by the slits disclosed in the present disclosure may also be configured to include a plurality of antennas. In this regard, FIGS. 15A and 15B are views illustrating a disposition structure of upper end antennas in accordance with one embodiment. FIG. 15A illustrates an antenna disposition structure in a state, in which PCBs and electronic components are disposed inside the mobile terminal, and positions of feed parts and ground parts according to the structure. FIG. 15B illustrates an antenna disposition structure and a length of each antenna region in a state, in which PCBs and electronic components are not disposed inside the mobile terminal. On the other hand, FIG. 16 is a conceptual view illustrating a disposition structure of feed parts, ground parts, and a switch according to the disposition of the upper end antennas of FIGS. 15A and 15B.

Referring to FIG. 15A, an upper clearance of the upper end antenna may be in the range of 0.5 mm to 3.0 mm. The minimum clearance 0.5 mm may be a gap between an upper end antenna and a proximity section. The maximum clearance 3.0 mm may be a gap between the upper end antenna and a display FPCB module. On the other hand, the side clearance of the upper end antenna may be a gap between the upper end antenna and the display module. For example, the side clearance of the upper end antenna may be about 1.95 mm, but is not limited thereto.

Referring to FIGS. 15A and 15B, the fifth conductive member 1150 and the sixth conductive member 1160 operate as the fifth antenna ANT5 and the sixth antenna ANT6, respectively. A seventh conductive member 1170 is fed at different points to operate as the seventh antenna ANT1 and the eighth antenna ANT5. A slit S5 may be disposed between the fifth conductive member 1150 and the sixth conductive member 1160. A slit S6 may be disposed between the sixth conductive member 1160 and the seventh conductive member 1170. A gap between the slits S5 and S6 may be designed as about 1.5 mm, but is not limited thereto.

The fifth conductive member 1150 and the seventh conductive member 1170 constituting the upper end antennas may be implemented in a symmetrical shape in left and right directions, but are not limited thereto. In this regard, second sub members 1150b and 1170b may be symmetrical with each other in the left and right directions, for the sake of manufacturing. On the other hand, lengths of the first sub members 1150a and 1170a may be independently designed for optimizing antenna characteristics.

A length L5 of the fifth conductive member 1150 may be determined as the sum L5a+L5b of the lengths of the first and second sub members 1150a and 1150b. In detail, the length L5 of the fifth conductive member 1150 may be determined as the sum of the lengths of the first and second sub members 1150a and 1150b and a length of the corner region 1150c. A length L6 of the seventh conductive member 1170 may be determined as the sum L7a+L7b of lengths of first and second sub members 1170a and 1170b. In detail, the length L7 of the seventh conductive member 1170 may be determined as the sum of the lengths of the first and second sub members 1170a and 1170b and a length of a corner region 1170c.

When the fifth conductive member 1150 and the seventh conductive member 1170 are implemented in the symmetrical shape in the left and right directions, the lengths L5b and L7b of the second sub members 1150b and 1170b may be set to the same value. On the other hand, the lengths L5a and L7a of the first sub members 1150a and 1170a may be set to the same value. Or, when antenna operating bands are different from each other, the lengths L5a and L7a of the first sub members 1150a and 1170a may be independently set to different values.

Referring to FIGS. 7A to 16, the upper end antennas may operate as the fifth antenna (ANT5) 1150 to the seventh antenna (ANT7) 1170. The upper end antennas may alternatively operate as the fifth antenna ANT5 to the eighth antenna (ANT8) 1180. In this case, the eighth antenna (ANT8) 1180 may share a partial antenna region with the seventh antenna (ANT7) 1170. The upper end antennas may be physically spaced apart from one another by a plurality of slits S5 and S6. End portions of the upper end antennas may be physically spaced apart from the slide metal part 1010 by a plurality of slits S7 and S8.

The fifth conductive member 1150 to the seventh conductive member 1170 that are disposed on the upper side surface 102a of the front metal part 102 and separated by the slits may operate as the fifth antenna ANT5 to the seventh antenna ANT7. The fifth antenna (ANT5) 1150 includes a first sub member 1150a disposed on the upper side surface, a second sub member 1150b disposed on one side surface (right side surface), and a corner region 1150c. The sixth antenna (ANT6) 1160 is configured as the sixth conductive member 1160 that is separated by the slits S5 and S6 from the fifth conductive member 1150 and the seventh conductive member 1170. The seventh antenna (ANT7) 1170 includes a first sub member 1170a disposed on the upper side surface, a second sub member 1170b disposed on another side surface (left side surface), and a corner region 1170c. The upper end antennas including the fifth antenna (ANT5) 1150 to the seventh antenna (ANT7) 1170 may be disposed on the upper side surface 102a of the front metal part 102.

The fifth antenna (ANT5) 1150 may be electrically connected to an upper PCB 182, which is received in the front metal part 102, through a feed part F5 at a first point of the first sub member 1150a. The fifth antenna (ANT5) 1150 may be electrically connected to the upper PCB 182 through an inductor L5 at a second point. Also, the fifth antenna (ANT5) 1150 may be electrically connected to the upper PCB 182 through a switch SW5 at one point of the right side surface thereof, such that an operating band of the fifth antenna (ANT5) 1150 can be adjusted. The sixth antenna (ANT6) 1160 may be electrically connected to the upper PCB 182, which is received in the front metal part 102, through a feed part F6 and a ground part G6 at both end portions of the sixth conductive member 1160.

The seventh antenna (ANT7) 1170 may be electrically connected to the upper PCB 182, which is received in the front metal part 102, through a feed part F7 at one point of the first sub member 1170a. The seventh antenna (ANT7) 1170 may be electrically connected to a ground part G7 at a second point of the corner region 1170c. The eighth antenna ANT8 may be disposed on the left side surface of the front metal part 102 to be adjacent to the seventh antenna ANT7. The eighth antenna ANT8 may be electrically connected to the upper PCB 182 through a feed part F8 at one point of the second sub member 1070b. The eighth antenna ANT8 may be electrically connected to the ground part G7 at the second point of the corner region 1170c.

Therefore, the seventh antenna (ANT7) 1170 and the eighth antenna ANT8 may have the common ground structure to be electrically connected to the ground part G7 at the same second point of the corner region 1170c. Accordingly, the seventh antenna ANT7 that is a GPS/WiFi antenna may be configured in a ground junction structure with the eighth antenna ANT8 that is a WiFi antenna. That is, a region of an integrally-connected conductive member may be partitioned based on a ground so as to implement different antennas. In the meantime, the sixth antenna ANT6 may be electrically connected to the ground part G6 through a lumped matching element such as an L/C element. This can reduce interference between the sixth antenna ANT6 and the seventh antenna ANT7.

Figure 17A:
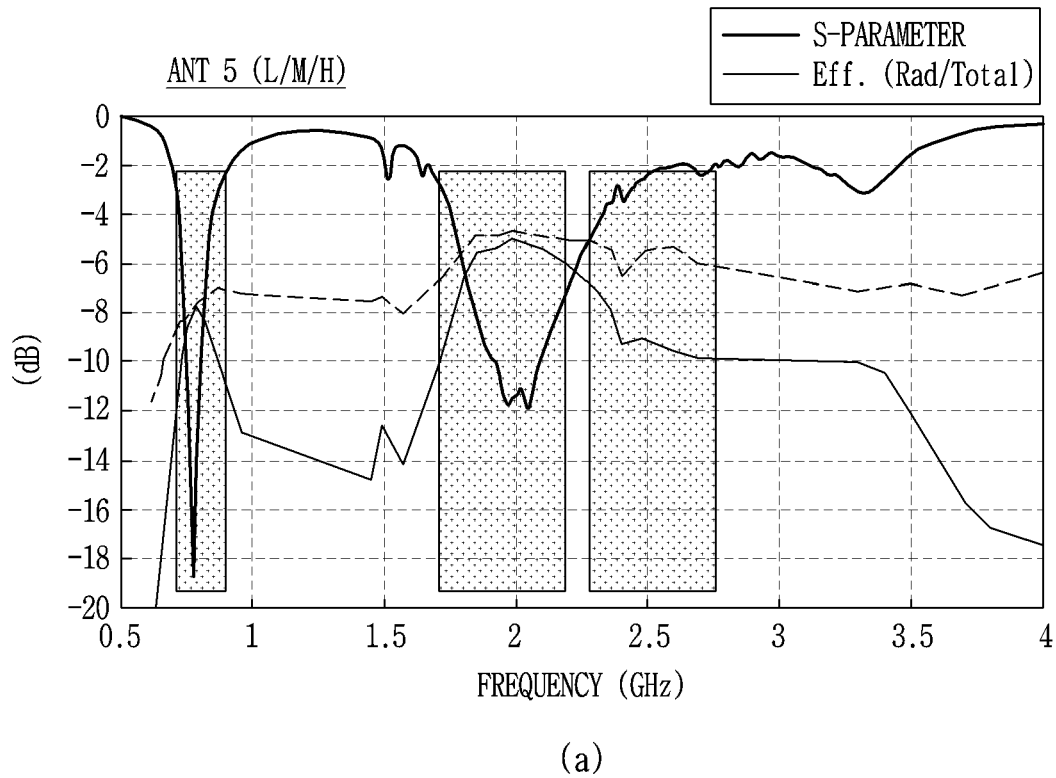
FIG. 17A is a view illustrating reflection coefficient and efficiency characteristics of upper end antennas that are adjacent to each other and can operate in 4G/5G bands.
Figure 17A:
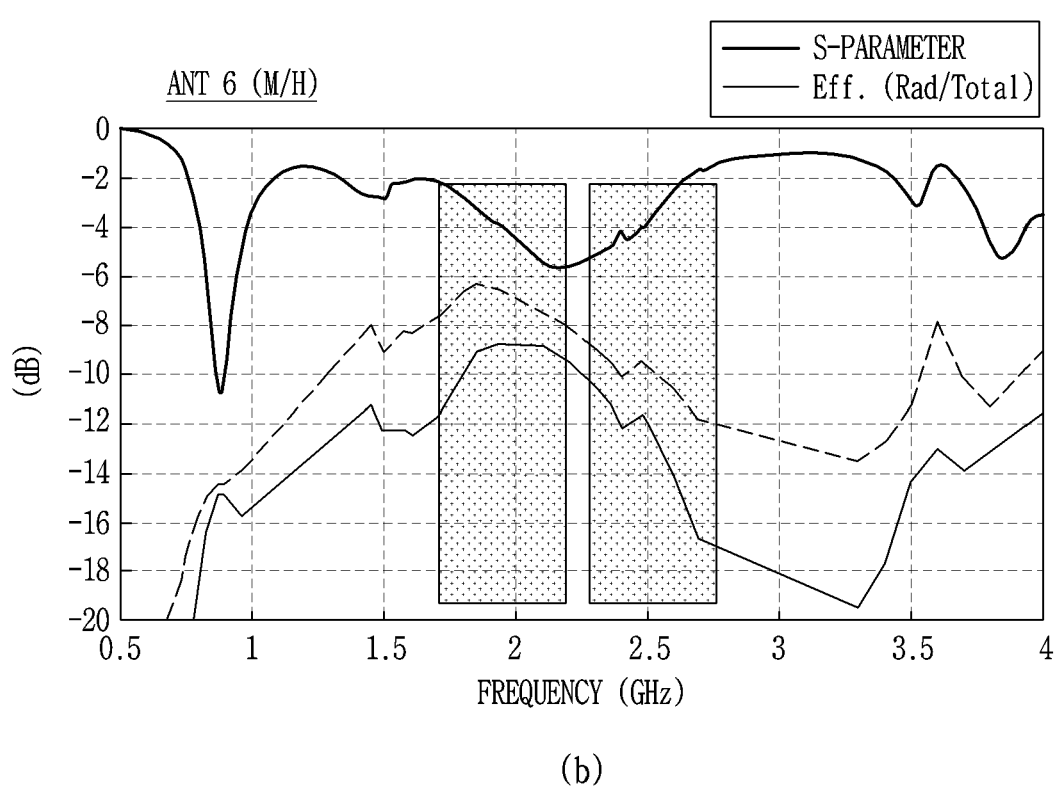
Figure 17B:
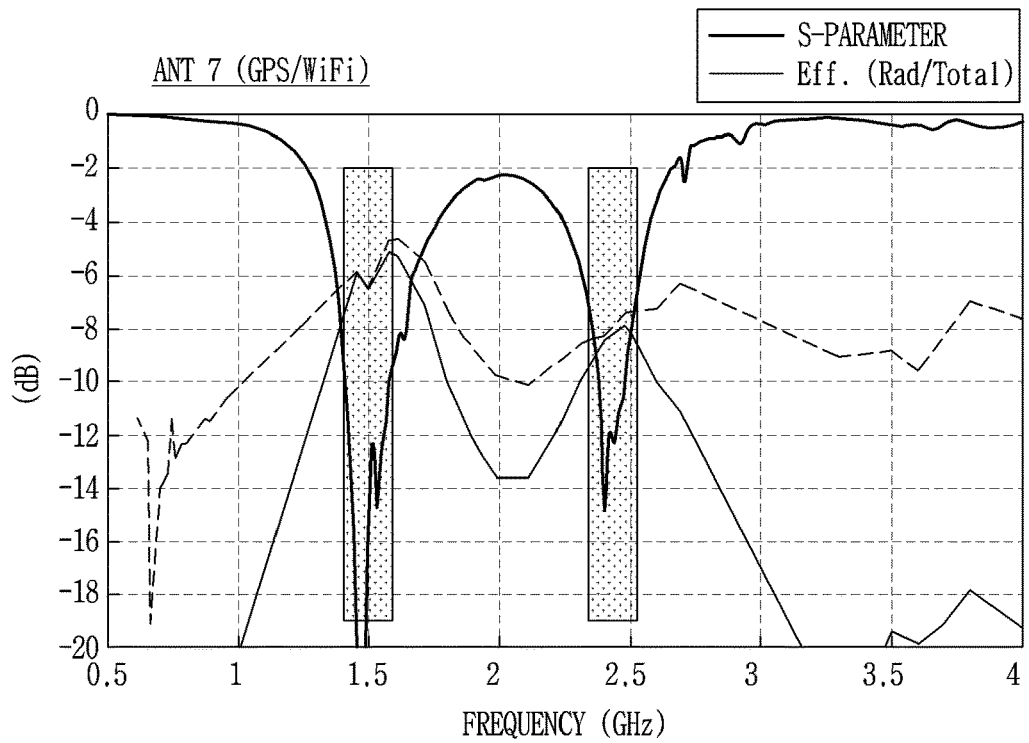
FIG. 17B is a view illustrating reflection coefficient and efficiency characteristics of upper end antennas that are adjacent to each other and can operate in a WiFi band.
Figure 17B:
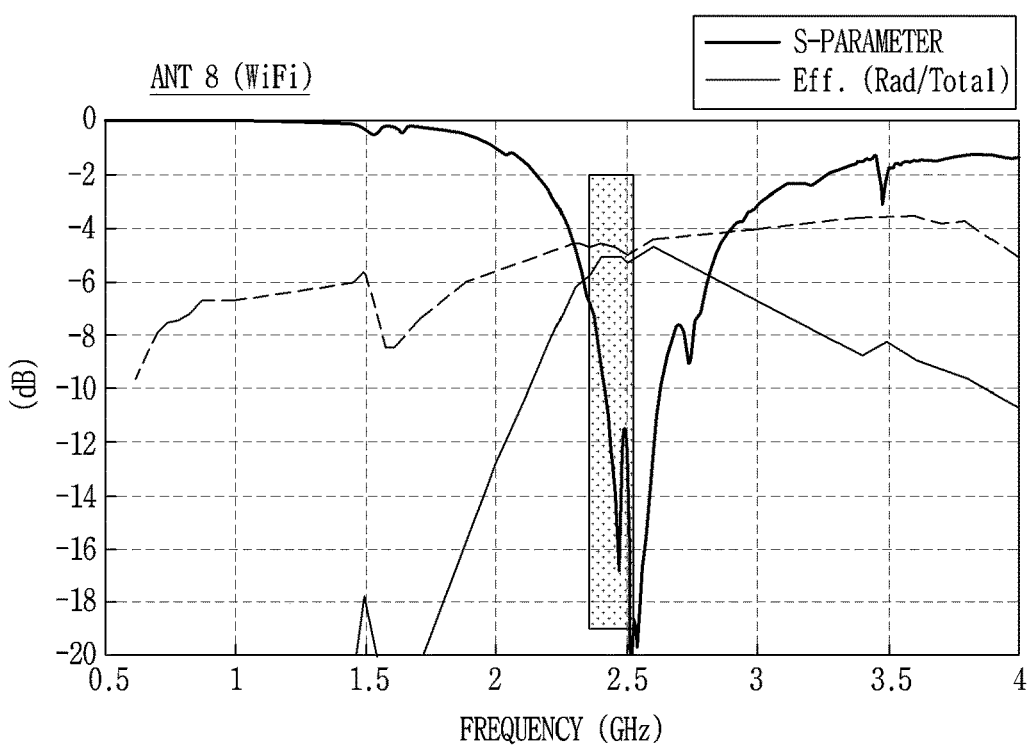

The fifth antenna ANT5 to the eighth antenna ANT8 corresponding to the upper end antennas can reduce an interference level by the slit structure and the disposition structure of the ground parts and tuners. In this regard, FIG. 17A is a view illustrating reflection coefficient and efficiency characteristics of upper end antennas that are adjacent to each other and can operate in 4G/5G bands. FIG. 17B is a view illustrating reflection coefficient and efficiency characteristics of upper end antennas that are adjacent to each other and can operate in a WiFi band.

Referring to (a) of FIG. 17A, the fifth antenna ANT5 operating in LB/MB/HB has a dual resonance characteristic of resonating in LB and resonating in MB/HB. Efficiency of the fifth antenna ANT5 is measured by a predetermined level or more in LB/MB/HB. Therefore, the fifth antenna ANT5 operates as a radiator in LB/MB/HB. Referring to (b) of FIG. 17A, the sixth antenna ANT6 operating in LB/MB/HB has a dual resonance characteristic of resonating in MB/HB. Efficiency of a predetermined level or more is measured for the sixth antenna ANT6 in MB/HB. Therefore, the sixth antenna ANT6 operates as a radiator in MB/HB.

Referring to (a) of FIG. 17B, the seventh antenna ANT7 has a dual resonance characteristic in GPS band and WiFi band. Efficiency of a predetermined level or more is measured for the seventh antenna ANT7 in the GPS/WiFi band. Therefore, the seventh antenna ANT7 operates as a radiator in the GPS/WiFi bands. Referring to (b) of FIG. 17B, the eighth antenna ANT8 has a resonance characteristic in the WiFi band. Efficiency of a predetermined level or more is measured for the eighth antenna ANT8 in the WiFi band. Therefore, the eighth antenna ANT8 operates as a radiator in the WiFi band.

Meanwhile, a plurality of PCBs in addition to the upper PCB 182 may be received in the front metal part 102. In this regard, as illustrated in FIG. 8B, a first PCB 181 and second and third PCBs 183a and 183b may be disposed in the front metal part 102. According to an embodiment, the first PCB 181 may alternatively be formed integrally with the upper PCB 182.

Referring to FIG. 2B and FIGS. 7A to 16, the mobile terminal may include the first PCB 181, the second and third PCBs 183a and 183b, and a processor 1400, 1450. The first PCB 181 may include a wireless communication unit 1250. The second PCB 183a may be electrically connected to the first PCB 181 and received in one side of the slide metal part 1010. The third PCB 183b may be electrically connected to the first PCB 181 and received in another side of the slide metal part 1010. The processor 1400, 1450 may be operably coupled to the wireless communication unit 1250.

Figure 18:
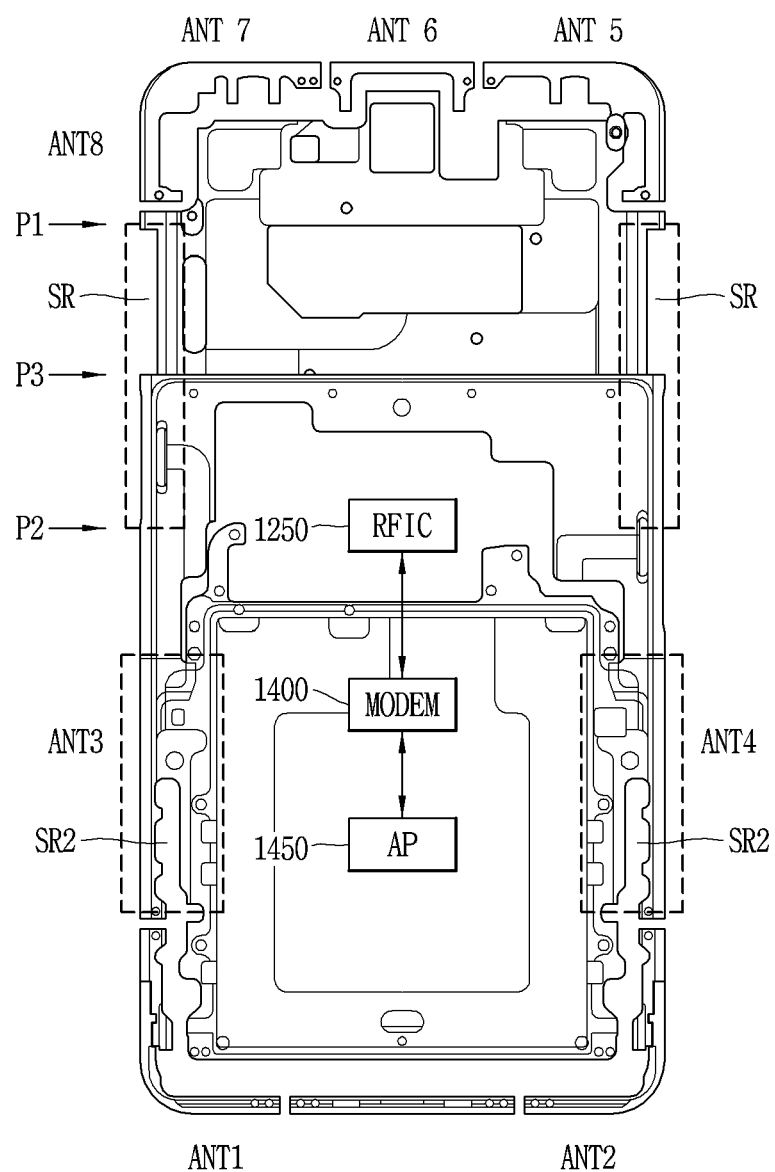
FIG. 18 is a view illustrating a coupled state between the first and second frames in a third state in which a display region is partially expanded.

Meanwhile, the size-variable mobile terminal may also perform wireless communication in an arbitrary state other than the closed/open state. In this regard, FIG. 18 is a view illustrating a coupled state between the first and second frames in a third state in which a display region (or display area) is partially expanded. In the third state of FIG. 18, a position where the slide metal part 1010 is coupled to the contact member 1050 is a third point P3. Therefore, the third point P3 is disposed at a middle point between the first point P1 and the second point P2 which are the coupled positions in the first state and the second state of (a) of FIG. 14 and (b) of FIG. 14.

Referring to FIG. 2B and FIGS. 7A to 18, the processor 1400, 1450 may determine whether the slide metal part 1010 is electrically connected to the front metal part 102 through the contact member 1050 in the third state other than the first state or the second state. The third state indicates a state in which the slide metal part 1010 is coupled to the front metal part 102 through the contact member 1050 at an arbitrary point (e.g., P3) between the upper end portion and the lower end portion of the slot region SR1. When it is determined that the slide metal part 1010 is coupled in the third state, the processor 1400, 1450 may control the wireless communication unit 1250 to measure quality of a signal received through the side antenna ANT3, ANT4. The quality of the received signal may be at least one of SNR, SIR and signal strength, but is not limited thereto.

When the quality of the signal received through the side antenna ANT3, ANT4 is less than a threshold value, the processor 1400, 1450 may control the wireless communication unit 1250 to receive a signal by using the upper end antenna that is disposed on the upper side surface 102a of the front metal part 102, other than the side antenna ANT3, ANT4. Accordingly, in the present disclosure, wireless communication performance can be optimized by selecting an optimal antenna based on antenna performance, even in an arbitrary state in which the size-variable mobile terminal is not completely retracted or expanded. Especially, during the change of the size of the mobile terminal, a user is likely to grab the side surfaces and the lower end portion of the mobile terminal with both hands.

Therefore, the processor 1400, 1450 may control the wireless communication unit 1250 to operate one of the fifth antenna ANT5 and the sixth antenna ANT6 disposed on the upper portion of the front metal part 102 in the third state. The fifth antenna ANT5 and the sixth antenna ANT6 may be configured to transmit and receive signals in 4G/5G bands. Meanwhile, when reception performance of the upper end antenna is deteriorated, the side antenna may be used after the mobile terminal is completely changed into the expanded state. The processor 1400, 1450 may determine whether signal qualities received by the fifth antenna ANT5 and the sixth antenna ANT6 are less than a threshold value.

When the signal qualities are less than the threshold value, the processor 1400, 1450 may control the wireless communication unit to operate one of the third antenna ANT3 and the fourth antenna ANT4 disposed on the left side surface and the right side surface of the slide metal part 1010 after switching to the second state. Since the user is likely not to grab the side regions after the mobile terminal is completely switched to the second expanded state, the control operation is performed after the switching to the second state.

On the other hand, when switched to the closed state (first state), the user is likely not to grab the lower end antenna region. Also, since the ground state is stable in the closed state (first state), the processor 1400, 1450 may perform the control operation to use the lower end antenna. In this regard, the processor 1400, 1450 may control the wireless communication unit 1250 to operate one of the first antenna ANT1 and the second antenna ANT2 disposed on the lower portion of the slide metal part 1010 in the first state.

Meanwhile, an electronic device supporting 4G and 5G communication services according to the present disclosure may be provided in various form factors. As an example of the form factor for the electronic device, a rollable device may be considered. Metal rim frames of electronic devices having various form factors may have an integral structure or a variable structure. In this regard, a rollable device having an integral frame structure has a difficulty in implementing a rollable display.

The rollable display may be configured to have a display region which is decreased or increased by a variable mechanism structure. When metal frames of a rollable device having a variable mechanism structure is used as antennas, it is difficult to secure antenna performance owing to the metal frames separately provided from each other.

The present disclosure is directed to solving the aforementioned problems and other drawbacks. One aspect of the present disclosure is to provide a disposition of antennas in rim regions of an electronic device even when a form factor changes.

Another aspect of the present disclosure is to provide a disposition of antennas in rim regions in a rollable device which has a display rollable to one side.

Still another aspect of the present disclosure is to provide a disposition of antennas in rim regions in a vertical rollable device.

Still another aspect of the present disclosure is to secure antenna performance of a predetermined level or higher while overcoming an antenna design space limitation.

Still another aspect of the present disclosure is to provide an antenna feeding structure in which a change in antenna characteristics is insensitive to a change in size of a mobile terminal.

Meanwhile, an electronic device may maintain a dual connectivity state with eNB and gNB by using a plurality of antenna modules disclosed herein. Alternatively, multi-input and multi-output (MIMO) may be performed with a first communication system or a second communication system using the plurality of antenna modules. In this regard, one of the plurality of antennas performing MIMO with the first communication system or the second communication system may be referred to as a first antenna module and another referred to as a second antenna module. Referring to FIGS. 1A to 18C, a plurality of antennas selected from the first antenna ANT1 to the fourth antenna ANT4, disposed on the bottom of the mobile terminal that changes in size may be referred to as a first antenna module and a second antenna module, respectively. As another example, a plurality of antennas selected from the first antenna ANT1 to the sixth antenna ANTE, which can operate in LTE/5G Sub6 bands, may be referred to as a first antenna module and a second antenna module, respectively.

The electronic device may further include a transceiver circuit 1250 and a baseband processor 1400. The transceiver circuit 1250 may be operably coupled to the first antenna module and the second antenna module. The transceiver circuit 1200 may be configured to control the first antenna module and the second antenna module. In this regard, the transceiver circuit 1250 may switch on or off signals applied to the first antenna module and the second antenna module or control magnitudes of such signals.

The baseband processor 1400 corresponding to a modem may be operably coupled to the transceiver circuit 1250. The baseband processor 1400 may perform MIMO through the first antenna module and the second antenna module.

In this regard, the baseband processor 1400 may control the transceiver circuit 1250 to perform UL-MIMO by transmitting a first signal and a second signal. Also, the baseband processor 1400 may control the transceiver circuit 1250 to perform DL-MIMO by receiving the first signal and the second signal.

When the quality of a signal received through the first antenna module or the second antenna module is lower than or equal to a threshold value, the corresponding antenna module may be switched to another connectivity. For example, when the quality of a signal received through the first antenna module or the second antenna module is lower than or equal to a threshold value, the corresponding antenna module may be switched to another communication system, namely, switching between 4G and 5G communication systems may be performed.

In this regard, when the first signal received through the first antenna module is lower than or equal to the threshold value, the baseband processor 1400 may release a MIMO mode and switch to the dual connectivity state. The baseband processor 1400 may control the transceiver circuit 1250 to switch to the dual connectivity state through the first antenna module and the second antenna module.

In this regard, when 5G MIMO is performed through the first antenna module and the second antenna module, switching to the 4G communication system through the first antenna module may be made. Therefore, the electronic device can be switched to an EN-DC state. Meanwhile, when 4G MIMO is performed through the first antenna module and the second antenna module, switching to the 5G communication system through the first antenna module may be made. Therefore, the electronic device can be switched to an EN-DC state.

As another example, the baseband processor 1400 may release the MIMO mode and switch to a dual connectivity state when the second signal received through the second antenna module is lower than or equal to the threshold value. The baseband processor 1400 may control the transceiver circuit 1250 to switch to the dual connectivity state through the first antenna module and the second antenna module.

In this regard, when 5G MIMO is performed through the first antenna module and the second antenna module, switching to the 4G communication system through the second antenna module may be made. Therefore, the electronic device can be switched to an EN-DC state. Meanwhile, when 4G MIMO is performed through the first antenna module and the second antenna module, switching to the 5G communication system through the second antenna module may be made. Therefore, the electronic device can be switched to an EN-DC state.

As described above, the electronic device may operate in the EN-DC state of maintaining a connectivity state with both the 4G communication system and the 5G communication system. In this regard, a first antenna module and a second antenna module may be configured to operate in a first communication system and a second communication system, respectively. Here, the first and second communication systems may be a 4G communication system and a 5G communication system, but the present disclosure is not limited thereto.

On the other hand, when quality of a signal received through an antenna module in the EN-DC state is less than or equal to a threshold value, the baseband processor 1400 may control the transceiver circuit to receive a signal of another communication system through the antenna module. In this regard, the baseband processor 1400 may determine whether the quality of the first signal of the first communication system received through the first antenna module is lower than or equal to the threshold value. When the quality of the first signal is less than or equal to the threshold value, the baseband processor 1400 may control the transceiver circuit 1250 to receive the second signal of the second communication system through the first antenna module.

In this regard, when the first communication system and the second communication system use the same band, an operating frequency of the transceiver circuit 1250 may be set equally, and only magnitude and phase of a signal may be controlled. On the other hand, when the first communication system and the second communication system use different bands, magnitude and phase of a signal may be controlled while changing the operating frequency of the transceiver circuit 1250.

As another example, the baseband processor 1400 may determine whether the quality of the second signal of the second communication system received through the second antenna module is lower than or equal to the threshold value. When the quality of the second signal is less than or equal to the threshold value, the baseband processor 1400 may control the transceiver circuit 1250 to receive the first signal of the first communication system through the second antenna module.

In this regard, when the first communication system and the second communication system use the same band, an operating frequency of the transceiver circuit 1250 may be set equally, and only magnitude and phase of a signal may be controlled. On the other hand, when the first communication system and the second communication system use different bands, magnitude and phase of a signal may be controlled while changing the operating frequency of the transceiver circuit 1250.

Meanwhile, the electronic device may be allocated with time/frequency resources for MIMO or EN-DC from the base station. In this regard, the baseband processor 1400 may determine whether a resource including a specific time section and a frequency band is allocated as a DL-MIMO resource through blind decoding for a PDCCH region and a corresponding resource region. The baseband processor 1400 may control the transceiver circuit 1250 to receive the first signal through the first antenna module and the second signal through the second antenna module in the allocated specific resource.

In this regard, the first signal of the first communication system and the second signal of the second communication system may be received through the first antenna module and the second antenna module, respectively, thereby switching to the EN-DC state or maintaining the current state. Alternatively, 4G DL MIMO may be performed by receiving the first signal and the second signal of the 4G communication system through the first antenna module and the second antenna module. Alternatively, 5G DL MIMO may be performed by receiving the first signal and the second signal of the 5G communication system through the first antenna module and the second antenna module.

As another example, the first signal of the first communication system and the second signal of the second communication system may be transmitted through the first antenna module and the second antenna module, respectively, thereby switching to the EN-DC state or maintaining the current state. Alternatively, 4G UL MIMO may be performed by transmitting the first signal and the second signal of the 4G communication system through the first antenna module and the second antenna module. Alternatively, 5G UL MIMO may be performed by transmitting the first signal and the second signal of the 5G communication system through the first antenna module and the second antenna module.

A dual connectivity state may be specified such that the electronic device is operated in an EN-DC, NGEN-DC, or NR-DC configuration as illustrated in FIG. 1C. EN-DC or NGEN-DC band combinations may include at least one E-UTRA operating band. Specifically, operating bands for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

A UE channel bandwidth for EN-DC may be defined. In this regard, a UE channel bandwidth for intra-band EN-DC in FR1 may be defined. Channel arrangements for DC may be defined. In this regard, channel spacing for intra-band EN-DC carriers may be defined.

The configuration for EN-DC may be defined. Specifically, configurations for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

As an example, UL EN-DC configuration may be defined for 2, 3, 4, 5, or 6 bands in FR1. In this regard, the UL EN-DC configuration for 2, 3, 4, 5, or 6 bands in FR1 may be made of a combination of EUTRA and NR configurations. This EN-DC, NGEN-DC, or NR-DC configuration may also be defined for downlink (DL) as well as uplink (UL).

Transmitter power may be defined in relation to EN-DC. UE maximum output power and UE maximum output power reduction may be defined for each configuration of the above-described EN-DCs. UE additional maximum output power reduction may be defined in relation to EN-DC. Configured output power for EN-DC and configured output power for NR-DC may be defined.

The foregoing description has been given of the configuration that the electronic device having the plurality of transceivers and antennas according to the embodiment performs the MIMO and/or the CA. In this regard, the electronic devices that performs the MIMO and/or the CA may operate in an EN-DC configuration so as to be in an EN-DC state with eNB and gNB. Hereinafter, a wireless communication system including an electronic device performing MIMO and/or CA operations and a base station will be described. In this regard, FIG. 19 illustrates a block diagram of a wireless communication system that is applicable to methods proposed herein.

Figure 19:
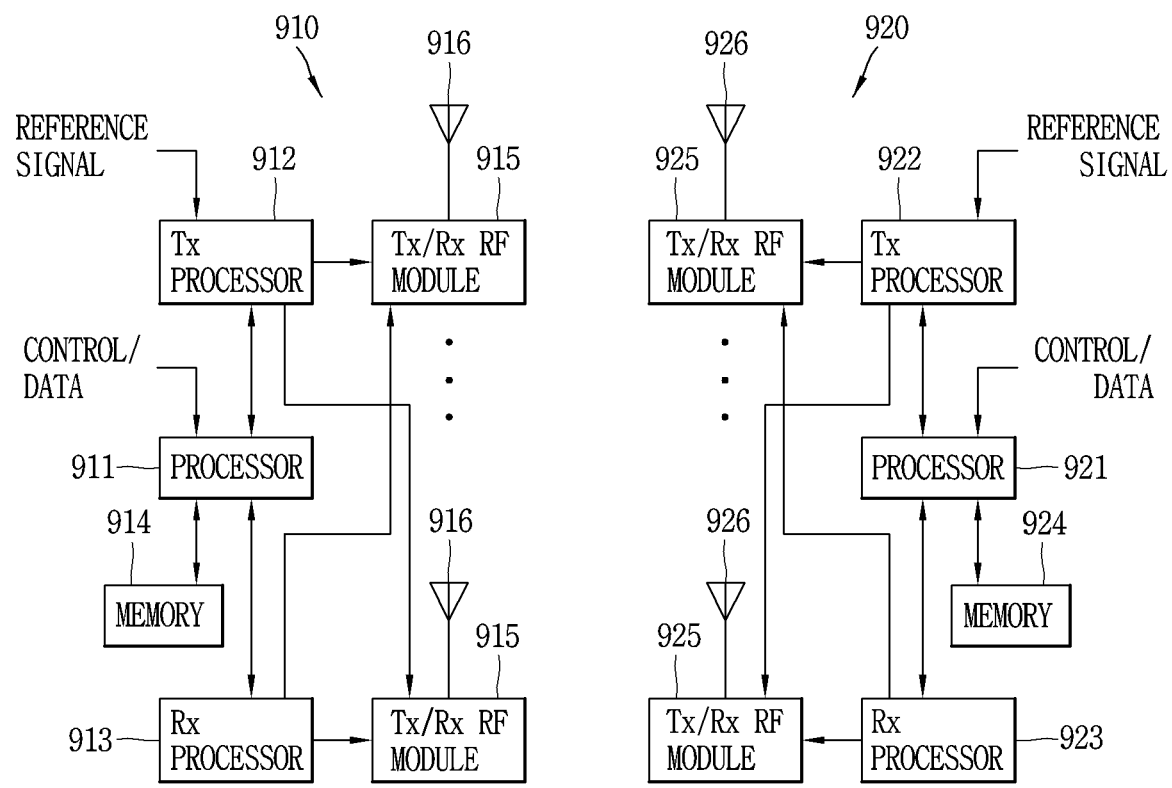
FIG. 19 is an exemplary block diagram of a wireless communication system to which methods proposed in the present disclosure are applicable.

Referring to FIG. 19, the wireless communication system includes a first communication device 910 and/or a second communication device 920. The term 'A and/or B' may be interpreted as having the same meaning as 'at least one of A and B'. The first communication device may denote a base station and the second communication device may denote a terminal (or the first communication device may denote the terminal and the second communication device may denote the base station).

The base station (BS) may be replaced with a term such as a fixed station, a Node B, an evolved-NodeB (eNB), a Next Generation NodeB (gNB), a base transceiver system (BTS), an access point (AP), or a general NB (gNB), a 5G system, a network, an AI system, a road side unit (RSU), robot or the like. In addition, the terminal may be fixed or have mobility, and may be replaced with a term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, or the like.

The first communication apparatus and the second communication apparatus each may include a processor 911, 921, a memory 914, 924, one or more Tx/Rx radio frequency modules 915, 925, a Tx processor 912, 922, an Rx processor 913, 923, and an antenna 916, 926. The processor may implement the aforementioned functions, processes, and/or methods. More specifically, in DL (communication from the first communication apparatus to the second communication apparatus), an upper (high-level) layer packet from a core network may be provided to the processor 911. The processor implements the function of an L2 layer. In DL, the processor may provide multiplexing between a logical channel and a transport channel and radio resource allocation to the second communication apparatus 920, and may be in charge of signaling to the second communication apparatus. The Tx processor 912 may implement various signal processing functions for an L1 layer (i.e., a physical layer). The signal processing function may facilitate forward error correction (FEC) in the second communication apparatus, and include coding and interleaving. The encoded and modulated symbols are divided into parallel streams, and each stream is mapped to an OFDM subcarrier, and multiplexed with a reference signal (RS) in a time and/or frequency domain, and combined together using an Inverse Fast Fourier Transform (IFFT) to create a physical channel carrying a time-domain OFDMA symbol stream. The OFDM stream may be spatially precoded to generate multiple spatial streams. The spatial streams may be provided to different antennas 916 via individual Tx/Rx modules (or transceiver) 915, respectively. The Tx/Rx modules may modulate RF carrier waves into the spatial streams for transmission. The second communication apparatus may receive a signal through the antenna 926 of each Tx/Rx module (or transceiver) 925. Each Tx/Rx module may demodulate information modulated to an RF carrier, and provide it to the RX processor 923. The RX processor may implement various signal processing functions of Layer 1. The RX processor may perform spatial processing with respect to the information in order to recover an arbitrary spatial stream destined for the second communication apparatus. When a plurality of spatial streams are destined for the second communication device, the spatial streams may be combined into a single OFDMA symbol stream by a plurality of RX processors. The RX processor may transform the OFDMA symbol stream from a time domain to a frequency domain by using Fast Fourier Transform (FFT). A frequency domain signal may include an individual OFDMA symbol stream on a subcarrier for each OFDM signal. Symbols on each subcarrier and a reference signal may be recovered and demodulated by determining the most probable signal placement points transmitted by the first communication device. These soft decisions may be based on channel estimate values. The soft decisions may be decoded and deinterleaved to recover data and control signal originally transmitted over the physical channel by the first communication device. The corresponding data and control signal may then be provided to the processor 921.

UL (communication from the second communication apparatus to the first communication apparatus) may be processed in the first communication apparatus 910 in a similar manner to that described with respect to the receiver function in the second communication apparatus 920. The Tx/Rx modules 925 may receive signals via the antennas 926, respectively. The Tx/Rx modules may provide RF carriers and information to the RX processor 923, respectively. The processor 921 may be associated with the memory 924 that stores program codes and data. The memory may be referred to as a computer-readable medium.

Hereinafter, technical effects of an electronic device having a plurality of antennas operating according to the present disclosure will be described.

According to the present disclosure, in an electronic device whose form factor varies, an antenna design space limitation can be overcome.

According to the present disclosure, in a rollable device in which a display rolls to one side, an antenna design space limitation can be overcome.

According to the present disclosure, in a vertical rollable device, a wireless platform design structure including an antenna disposition can be provided.

According to the present disclosure, separated metal rims can be used for implementing a display sliding part, thereby overcoming an antenna design space limitation and securing antenna performance of a predetermined level or higher.

According to the present disclosure, an antenna structure in which an antenna characteristic variation is insensitive to a change in size of a mobile terminal can be provided.

According to the present disclosure, a ground connection structure between different metal frames can be provided, such that the antenna characteristic variation is insensitive to the change of the size of the mobile terminal.

According to the present disclosure, the ground connection structure between different frames can be provided, to suppress deterioration of antenna performance due to parasitic resonance.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

With regard to the present disclosure described above, the design of an antenna including processors 180, 1250, and 1400 and a controller for controlling the same in an electronic device 180 having a plurality of antennas, and a control method thereof may be implemented as codes readable by a computer on a medium written by a program. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor 180 of the terminal. Therefore, the detailed description should not be limitedly construed in all of the aspects, and should be understood to be illustrative. The scope of the invention should be determined by reasonable interpretation of the appended claims and all changes that come within the equivalent scope of the invention are included in the scope of the disclosure.

What is claimed is:

1. A mobile terminal, comprising:
a slide metal part including a left side surface, a right side surface, and a bottom side surface defining appearance of the mobile terminal; and
a front metal part including an upper side surface and a front portion defining the appearance of the mobile terminal and coupled to the slide metal part,
wherein a contact member is disposed on a side surface of the front metal part to make the slide metal part and the front metal part brought into contact with each other,
antennas are disposed on the left side surface and the right side surface of the slide metal part, and a slot region is defined in a portion of a side surface of the slide metal part, the portion overlapping the front metal part, and
the contact member allows the slide metal part and the front metal part to be in contact with each other at a first position as a lower end of the slot region, in a first state in which a display region of the mobile terminal is retracted, so as to remove parasitic resonance due to the slot region, and
allows the slide metal part and the front metal part to be in contact with each other at a second position as an upper end of the slot region, in a second state in which a display region is expanded, so as to remove parasitic resonance due to the slot region.

2. The mobile terminal of claim 1, wherein parasitic resonance between the antenna and the slot region, which occurs due to a current generated along both sides of the slot region is removed as a path of the current is generated along one side by the contact member of the first position, and
the contact member is in ground-contact with a side portion of the slide metal part at the first position as the lower end of the slot region.

3. The mobile terminal of claim 2, wherein a path of the current generated along the both sides has a length corresponding to a half wavelength of a specific operating band of the antenna, such that the parasitic resonance is generated at the specific operating band of the antenna by the current generated along the both sides, and
the path of the current generated along the one side by the contact member of the first position as the lower end of the slot region has a length corresponding to a quarter (¼) wavelength of the specific operating band, such that the parasitic resonance is removed at the specific operating band of the antenna by the current generated long the one side.

4. The mobile terminal of claim 1, wherein parasitic resonance between the antenna and the slot region, which occurs due to a current generated along both sides of the slot region, is removed as a path of the current is generated along one side by the contact member of the second position, and the contact member is in ground-contact with a side portion of the slide metal part at the second position as the upper end of the slot region.

5. The mobile terminal of claim 4, wherein a path of the current generated along the both sides has a length corresponding to a half wavelength of a specific operating band of the antenna, such that the parasitic resonance is generated at the specific operating band of the antenna by the current generated along the both sides, and the path of the current generated along the one side by the contact member of the second position as the upper end of the slot region has a length corresponding to a quarter (¼) wavelength of the specific operating band, such that parasitic resonance is removed at the specific operating band of the antenna by the current generated long the one side.

6. The mobile terminal of claim 1, wherein a second slot region defined on a front portion of the slide metal part in the antennas of the left side surface and the right side surface of the slide metal part has a length corresponding to a quarter wavelength of a specific operating band of the antennas, lengths of the antennas are longer than the length of the second slot region, and the length of the second slot region is determined as a length from one end portion of the second slot region to one end portion of a slit formed in the slide metal part.

7. The mobile terminal of claim 1, wherein the slide metal part and the front metal part are in contact with each other through the contact member at the first position as the lower end of the slot region, in a first state in which the slide metal part moves in a first direction as an upward direction, so as to remove parasitic resonance due to the slot region, and the slide metal part and the front metal part are in contact with each other through the contact member at the second position as the upper end of the slot region, in a second state in which the slide metal part moves in a second direction as a downward direction, so as to remove parasitic resonance due to the slot region.

8. The mobile terminal of claim 1, further comprising a display including a first region that is exposed to a front surface in a retracted state of the mobile terminal, and a second region that is an expanded region exposed to the front surface in an expanded state of the mobile terminal, wherein the slide metal part and the front metal part are in contact with each other through the contact member at the first position as the lower end of the slot region, in a first state in which the first region of the display is exposed, so as to remove parasitic resonance due to the slot region, and the slide metal part and the front metal part are in contact with each other through the contact member at the second position as the upper end of the slot region, in a second state in which the first region and the second region of the display are exposed, so as to remove parasitic resonance due to the slot region.

9. The mobile terminal of claim 1, wherein the slide metal part comprises:

a first metal housing including a left side surface and a right side surface defining the appearance of the mobile terminal; and a second metal housing including a left side surface, a right side surface, and a bottom side surface defining the appearance, and the antennas are disposed on the left side surface and the right side surface of the first metal housing.

10. The mobile terminal of claim 9, wherein each of a first conductive member and a second conductive member of the second metal housing includes a first sub member disposed on the bottom side surface, a second sub member disposed on the left side surface or the right side surface, and a corner region defined between the first sub member and the second sub member, and the left side surface and the right side surface of the first metal housing and the second sub member of the second metal housing overlap each other, and the overlapped first metal housing is not exposed to the appearance while the second sub member is exposed to the appearance.

11. The mobile terminal of claim 10, wherein the first conductive member and the overlapped first metal housing operate as a first antenna, the second conductive member and the overlapped second metal housing operate as a second antenna, and a third conductive member is disposed between the first conductive member and the second conductive member, the antennas corresponding to a fourth conductive member and a fifth conductive member disposed on the left side surface and the right side surface of the first metal housing operate as a third antenna and a fourth antenna, respectively, and lower end antennas including the first antenna to the fourth antenna are disposed on the side surfaces of the slide metal part.

12. The mobile terminal of claim 11, further comprising:

a first printed circuit board (PCB) having a wireless communication unit;

a second PCB electrically connected to the first PCB and received in one side of the slide metal part;

a third PCB electrically connected to the second PCB and received in another side of the slide metal part; and a processor operably coupled to the wireless communication unit, and the processor determines whether the slide metal part is electrically connected to the front metal part through the contact member, in a third state other than the first state or the second state, and controls the wireless communication unit to measure quality of a signal received through the antenna when it is determined that the slide metal part is coupled in the third state, and the third state is a state in which the slide metal part is coupled to the front metal part at an arbitrary point between an upper end portion and a lower end portion of the slot region.

13. The mobile terminal of claim 12, wherein the processor controls the wireless communication unit to receive a signal not by using the antenna but by using an upper end antenna disposed on the upper side surface of the front metal part when the quality of the signal received through the antenna is less than a threshold value.

14. The mobile terminal of claim 13, wherein the processor controls the wireless communication unit to operate one of the fifth antenna and the sixth antenna disposed on an upper portion of the front metal part in the third state, and controls the wireless communication unit to operate one of the third antenna and the fourth antenna disposed on the left side surface and the right side surface of the slide metal part after switching to the second state when it is determined that qualities of signals received by the fifth antenna and the sixth antenna are less than the threshold value.

15. The mobile terminal of claim 12, wherein the processor controls the wireless communication unit to operate one of the first antenna and the second antenna disposed on a lower portion of the slide metal part in the first third state.

16. The mobile terminal of claim 1, wherein a fifth conductive member to a seventh conductive member disposed on the upper side surface of the front metal part and separated by slits operate as a fifth antenna to a seventh antenna,
- each of the fifth antenna and the seventh antenna includes a first sub member disposed on the upper side surface, a second sub member disposed on the left side surface or the right side surface, and a corner region defined between the first sub member and the second sub member, and
- upper end antennas including the fifth antenna to the seventh antenna are disposed on the upper side surface of the front metal part.

17. The mobile terminal of claim 16, wherein the fifth antenna is electrically connected to an upper printed circuit board (PCB) received in the front metal part through a feed part at a first point of the first sub member, and electrically connected to the upper PCB through an inductor at a second point, and
- an operating band of the fifth antenna is adjusted as the fifth antenna is electrically connected to the upper PCB through a switch at one point of a right side surface thereof.

18. The mobile terminal of claim 16, wherein the sixth antenna is electrically connected to the upper PCB received in the front metal part through a feed part and a ground part at both end portions of the sixth conductive member.

19. The mobile terminal of claim 16, wherein the seventh antenna is electrically connected to the upper PCB received in the front metal part through a feed part at one point of the first sub member, and electrically connected to a ground part at a second point of the corner region.

20. The mobile terminal of claim 19, wherein the upper end antenna further includes an eighth antenna disposed on the left side surface of the front metal part to be adjacent to the seventh antenna,
- the eighth antenna is electrically connected to the upper PCB through a feed part at one point of the second sub member, and electrically connected to the ground part at the second point of the corner region, and
- the seventh antenna and the eighth antenna have a common ground structure of being electrically connected to a ground at the same second point of the corner region.

* * * * *